(12) United States Patent
Va et al.

(10) Patent No.: US 11,821,977 B2
(45) Date of Patent: Nov. 21, 2023

(54) TARGET DETECTION AND TRACKING FOR FEATURE EXTRACTION

(71) Applicant: Samsung Electronics Co., Ltd., Suwon-si (KR)

(72) Inventors: Vutha Va, Plano, TX (US); Wenxun Qiu, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 16/946,878

(22) Filed: Jul. 9, 2020

(65) Prior Publication Data

US 2021/0011147 A1 Jan. 14, 2021

Related U.S. Application Data

(60) Provisional application No. 62/969,773, filed on Feb. 4, 2020, provisional application No. 62/912,349, filed on (Continued)

(51) Int. Cl.
*G01S 13/72* (2006.01)

(52) U.S. Cl.
CPC .................. *G01S 13/72* (2013.01)

(58) Field of Classification Search
CPC ...... G01S 13/89; G01S 13/582; G01S 13/584; G01S 13/72; G01S 13/90; G01S 13/18;
(Continued)

(56) References Cited

U.S. PATENT DOCUMENTS 3,339,198 A * 8/1967 Glegg .................... G01S 13/34
342/109
4,077,038 A * 2/1978 Heller ................... G01S 7/2922
342/159
(Continued)

FOREIGN PATENT DOCUMENTS

CN 109490882 A * 9/2010 ......... G01S 13/9029
EP 1735637 B1 1/2019
(Continued)

OTHER PUBLICATIONS

Radar Fundamentals, Prof. David Jenn Dept. of Electrical & Computer Engineering at Naval Postgraduate School. (Year: 2017).*
(Continued)

*Primary Examiner* — Timothy A Brainard
*Assistant Examiner* — Michael W Justice

(57) ABSTRACT

Methods and electronic devices for target detection and tracking operations are provided. A method of operating an electronic device includes identifying, based on signals received through a radar transceiver of the electronic device, a peak of the received signals in a current time slot, determining whether the peak in the current time slot corresponds to a tracked target based on comparing a location of the peak in the current time slot with a location of a peak corresponding to the tracked target in a previous time slot as a function of a movement speed threshold, and in response to a determination that the peak in the current time slot corresponds to the tracked target, updating tracking information for the tracked target associated with the peak in the current time slot.

20 Claims, 31 Drawing Sheets

Related U.S. Application Data on Oct. 8, 2019, provisional application No. 62/872,419, filed on Jul. 10, 2019.

(58) Field of Classification Search
CPC ...... G01S 13/53; G01S 13/532; G01S 13/534; G01S 13/449; G01S 13/524; G01S 13/5242; G01S 7/356; G01S 7/2883
USPC .................................. 342/107, 192, 195, 161
See application file for complete search history.

(56) References Cited

U.S. PATENT DOCUMENTS

| | | | | |
|---|---|---|---|---|
| 4,137,532 A * | 1/1979 | Taylor, Jr. | ........... | G01S 13/5248 342/137 |
| 4,150,379 A * | 4/1979 | Connors | ................. | G01S 7/414 342/425 |
| 5,150,125 A * | 9/1992 | Hager | ..................... | G01S 13/20 342/134 |
| 5,442,362 A * | 8/1995 | Zwarts | .................... | G01S 13/10 342/197 |
| 5,969,667 A * | 10/1999 | Farmer | ................... | G01S 7/038 342/194 |
| 6,011,507 A * | 1/2000 | Curran | ................... | G01S 13/931 342/70 |
| 6,191,727 B1 * | 2/2001 | Springer | ................. | G01S 7/285 342/195 |
| 6,271,787 B1 * | 8/2001 | Springer | ................. | G01S 7/288 342/195 |
| 6,275,183 B1 * | 8/2001 | Springer | ................. | G01S 7/288 342/195 |
| 6,646,589 B2 * | 11/2003 | Natsume | ................ | G01S 7/354 342/107 |
| 6,726,146 B2 * | 4/2004 | Li | ........................... | F42B 15/01 342/63 |
| 6,809,682 B1 * | 10/2004 | Madewell | ............... | G01S 13/24 342/159 |
| 6,833,807 B2 * | 12/2004 | Flacke | .................... | G01S 13/582 342/109 |
| 7,053,813 B1 * | 5/2006 | Hubbert | ................ | G01S 13/524 342/26 R |
| 7,126,526 B2 * | 10/2006 | Wasiewicz | ............. | G01S 7/023 342/134 |
| 7,148,835 B1 * | 12/2006 | Bricker | ................... | F41H 11/02 342/13 |
| 7,154,433 B1 * | 12/2006 | Madewell | ............... | G01S 13/24 342/160 |
| 7,199,752 B2 * | 4/2007 | Wasiewicz | ............ | G01S 7/0233 342/134 |
| 7,432,850 B2 * | 10/2008 | Falk | ..................... | G01S 13/0209 342/109 |
| 7,639,171 B2 * | 12/2009 | Alland | ..................... | H01Q 3/24 342/25 R |
| 7,639,176 B2 * | 12/2009 | Fehrenbach | ............ | G01F 25/20 342/124 |
| 7,652,618 B2 * | 1/2010 | Kearney | ................. | G01S 13/60 342/115 |
| 7,965,226 B2 * | 6/2011 | Krikorian | ................ | G01S 13/22 342/131 |
| 8,179,305 B2 * | 5/2012 | Torin | ....................... | G01S 7/285 342/174 |
| 8,772,730 B2 * | 7/2014 | Han | ............................ | G01T 1/29 250/363.04 |
| 9,081,085 B2 * | 7/2015 | Fukuda | ............... | G01S 13/0209 |
| 9,239,391 B2 * | 1/2016 | Han | ...................... | G01T 1/2928 |
| 9,551,755 B2 * | 1/2017 | Iisaka | ..................... | B60L 53/65 |
| 9,702,967 B2 * | 7/2017 | Luebbert | ............... | G01S 13/931 |
| 9,897,700 B2 * | 2/2018 | Wee | ........................ | G01S 17/87 |
| 9,971,027 B1 * | 5/2018 | Stockmann | ......... | G01S 13/5244 |
| 10,775,221 B2 * | 9/2020 | Blomberg | ............. | G01S 7/2922 |
| 10,809,368 B2 * | 10/2020 | Yamanouchi | ......... | G01S 13/584 |
| 10,884,102 B2 * | 1/2021 | Lindenfeld | ............. | G01S 13/28 |
| 11,125,869 B2 * | 9/2021 | Santra | ................... | G01S 13/449 |
| 11,150,122 B2 * | 10/2021 | Griessbaum | .......... | G01F 23/284 |
| 2003/0052813 A1 * | 3/2003 | Natsume | ............... | G01S 13/345 342/107 |
| 2004/0025679 A1 * | 2/2004 | Li | ........................... | F42B 15/01 244/3.1 |
| 2005/0046609 A1 * | 3/2005 | Wasiewicz | ............ | G01S 13/288 342/134 |
| 2006/0290560 A1 * | 12/2006 | Bricker | .................... | G01S 7/021 342/13 |
| 2007/0008214 A1 * | 1/2007 | Wasiewicz | ............ | G01S 7/0233 342/134 |
| 2007/0182621 A1 * | 8/2007 | Fehrenbach | .......... | G01F 23/284 342/124 |
| 2007/0247351 A1 * | 10/2007 | Falk | ....................... | G01S 13/532 342/109 |
| 2008/0106460 A1 * | 5/2008 | Kurtz | ...................... | G01S 13/34 342/99 |
| 2008/0272956 A1 | 11/2008 | Pedersen et al. | | |
| 2009/0085800 A1 * | 4/2009 | Alland | ..................... | G01S 7/034 342/25 R |
| 2009/0207069 A1 * | 8/2009 | Kearney | ................. | G01S 13/60 342/104 |
| 2010/0245162 A1 * | 9/2010 | Krikorian | ................ | G01S 7/28 342/202 |
| 2011/0025546 A1 * | 2/2011 | Cook | .................... | G01S 13/534 342/22 |
| 2011/0037643 A1 * | 2/2011 | Torin | ...................... | G01S 7/285 342/174 |
| 2012/0176266 A1 | 7/2012 | Lee et al. | | |
| 2012/0242972 A1 * | 9/2012 | Wee | ....................... | G01S 17/931 356/4.01 |
| 2013/0105701 A1 * | 5/2013 | Han | ........................ | G01T 1/366 250/336.1 |
| 2013/0314268 A1 * | 11/2013 | Fukuda | ................. | G01S 13/325 342/21 |
| 2014/0192622 A1 | 7/2014 | Rowe et al. | | |
| 2015/0054516 A1 * | 2/2015 | Iisaka | ..................... | B60L 53/14 324/418 |
| 2015/0331098 A1 * | 11/2015 | Luebbert | ................. | G01S 13/34 342/91 |
| 2018/0275263 A1 * | 9/2018 | Yamanouchi | ......... | G01S 13/584 |
| 2018/0372527 A1 * | 12/2018 | Griessbaum | .......... | G01F 23/284 |
| 2019/0101430 A1 * | 4/2019 | Blomberg | ............. | G01S 7/2922 |
| 2019/0178980 A1 * | 6/2019 | Zhang | ..................... | G01S 7/415 |
| 2019/0227143 A1 * | 7/2019 | Lindenfeld | ........... | G01S 13/582 |
| 2020/0116850 A1 * | 4/2020 | Santra | .................... | G01S 13/88 |

FOREIGN PATENT DOCUMENTS

| | | | | |
|---|---|---|---|---|
| JP | 2006085246 A * | 3/2006 | ............ | G01S 7/292 |
| KR | 10-2012-0081735 A | 7/2012 | | |
| KR | 10-1311393 B1 | 9/2013 | | |
| WO | 2008094172 A2 | 8/2008 | | |

OTHER PUBLICATIONS

International Search Report of the International Searching Authority in connection with International Application No. PCT/KR2020/009152 dated Oct. 15, 2020, 5 pages.

Extended European Search Report dated Jul. 1, 2022 regarding Application No. 20837524.6, 10 pages.

* cited by examiner

Mode 1: Low measurement rate

Mode 2: High measurement rate

TARGET DETECTION AND TRACKING FOR FEATURE EXTRACTION

CROSS-REFERENCE TO RELATED APPLICATION AND CLAIM OF PRIORITY

This application claims priority under 35 U.S.C. § 119(e) to:

U.S. Provisional Patent Application No. 62/872,419 filed on Jul. 10, 2019;

U.S. Provisional Patent Application No. 62/912,349 filed on Oct. 8, 2019; and

U.S. Provisional Patent Application No. 62/969,773 filed on Feb. 4, 2020.

The above-identified provisional patent applications are hereby incorporated by reference in its entirety.

TECHNICAL FIELD

This disclosure relates generally to radar based close-range detection. More specifically, this disclosure relates to detecting a moving target at an electronic device.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing. For example, certain electronic devices not only provide voice call services using a mobile communication network but can also offer radar capabilities. Radar can operate at various frequency bands including, but not limited to, 6-8 GHz, 28 GHz, 39 GHz, 60 GHz, and 77 GHz. Radar operates to localize targets in the radar field of view in terms of range and/or azimuth/elevation (angle) and/or velocity.

SUMMARY

This disclosure provides target detection and tracking operations to support, for example, gesture control and smart home applications.

In one embodiment, an electronic device is provided. The electronic device includes a radar transceiver and a processor operably connected to the radar transceiver. The processor is configured to identify, based on signals received through the radar transceiver, a peak of the received signals in a current time slot, determine whether the peak in the current time slot corresponds to a tracked target based on comparing a location of the peak in the current time slot with a location of a peak corresponding to the tracked target in a previous time slot as a function of a movement speed threshold, and in response to a determination that the peak in the current time slot corresponds to the tracked target, update tracking information for the tracked target associated with the peak in the current time slot.

In another embodiment, a method of operating an electronic device is provided. The method includes identifying, based on signals received through a radar transceiver of the electronic device, a peak of the received signals in a current time slot, determining whether the peak in the current time slot corresponds to a tracked target based on comparing a location of the peak in the current time slot with a location of a peak corresponding to the tracked target in a previous time slot as a function of a movement speed threshold, and in response to a determination that the peak in the current time slot corresponds to the tracked target, updating tracking information for the tracked target associated with the peak in the current time slot.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 44, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of the present disclosure, can include personal computers (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), portable multimedia players (PMPs), MP3 players, mobile medical devices, virtual reality headsets, portable game consoles, cameras, and wearable devices, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device. The electronic device as used herein can include a transceiver that can both transmit and receive radar signals.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Figure 1:
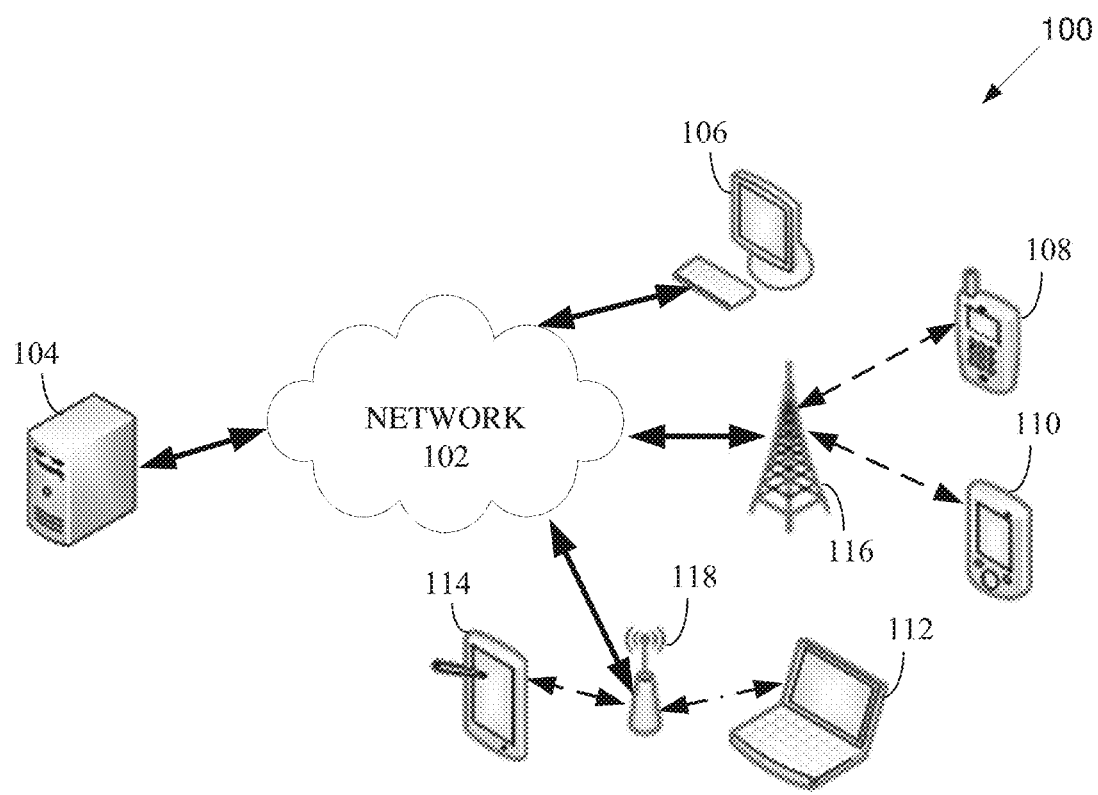
FIG. 1 illustrates an example communication system according to embodiments of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a radar transceiver.

In this example, some client devices 108 and 110-114 communicate indirectly with the network 102. For example, the mobile device 108 and PDA 110 communicate via one or more base stations 116, such as cellular base stations or eNodeBs (eNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
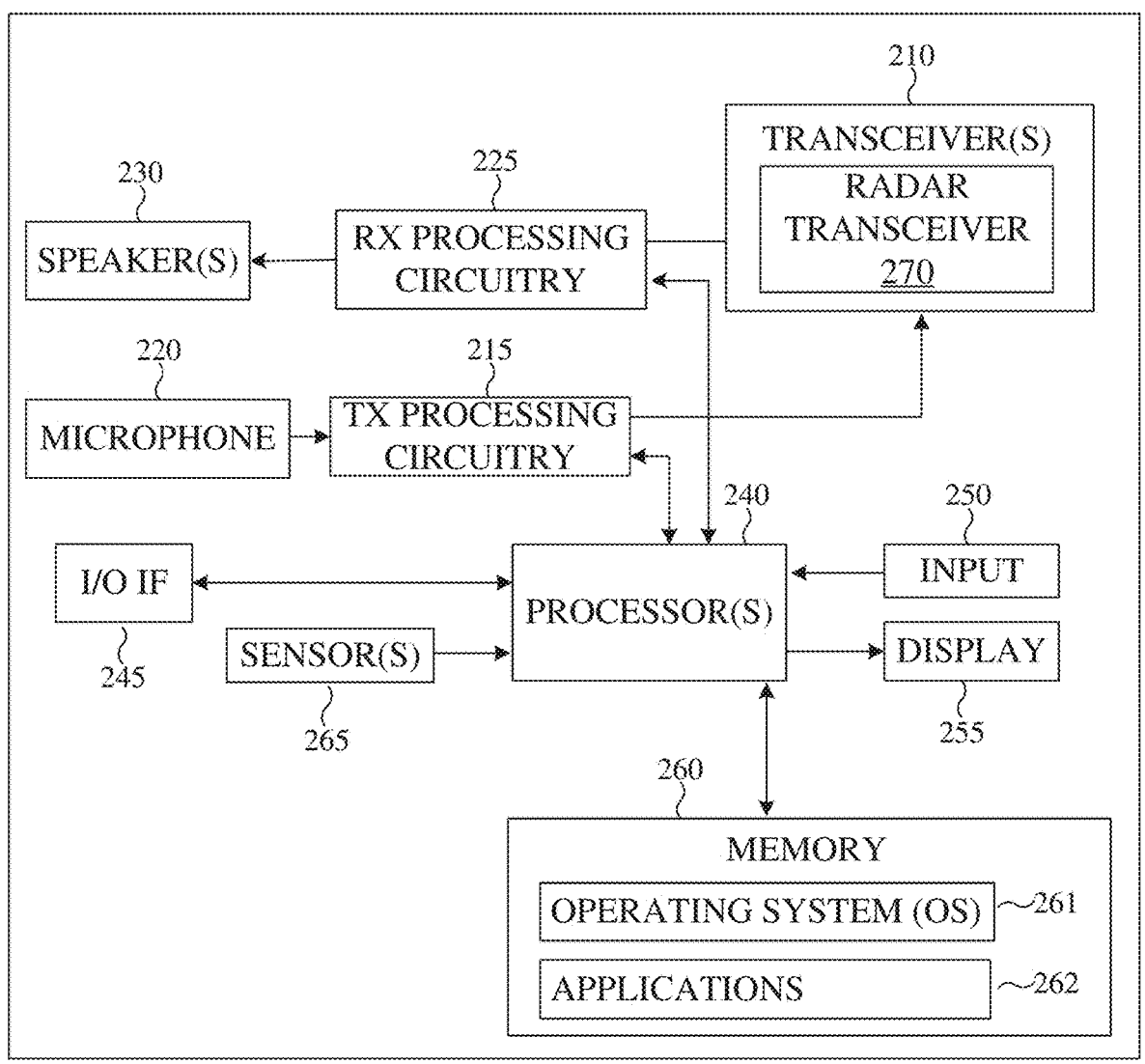
FIG. 2 illustrates an example electronic device according to embodiments of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type (s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the radar transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is a radar transceiver 270 that is configured to transmit and receive signals for detecting and ranging purposes. For example, the radar transceiver 270 may be any type of transceiver including, but not limited to a WiFi transceiver, for example, an 802.11ay transceiver. The radar transceiver 270 can operate both radar and communication signals concurrently. The radar transceiver 270 includes one or more antenna arrays, or antenna pairs, that each includes a transmitter (or transmitter antenna) and a receiver (or receiver antenna 159). The radar transceiver 270 can transmit signals at a various frequencies For example, the radar transceiver 270 can transmit signals at frequencies including, but not limited to, 6 GHz, 7 GHz, 8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 200.

In certain embodiments, the radar transceiver 270 is a monostatic radar as the transmitter of the radar signal and the receiver, for the delayed echo, are positioned at the same or similar location. For example, the transmitter and the receiver can use the same antenna or nearly-co-located while using separate, but adjacent antennas. Monostatic radars are assumed coherent, i.e. transmitter and receiver are synchronized via a common time reference. FIG. 3A, below, illustrates an example monostatic radar.

In certain embodiments, the radar transceiver 270 can include a transmitter and a receiver. The transmitter can transmit millimeter wave (mmWave) signals. The receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the objection by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3:
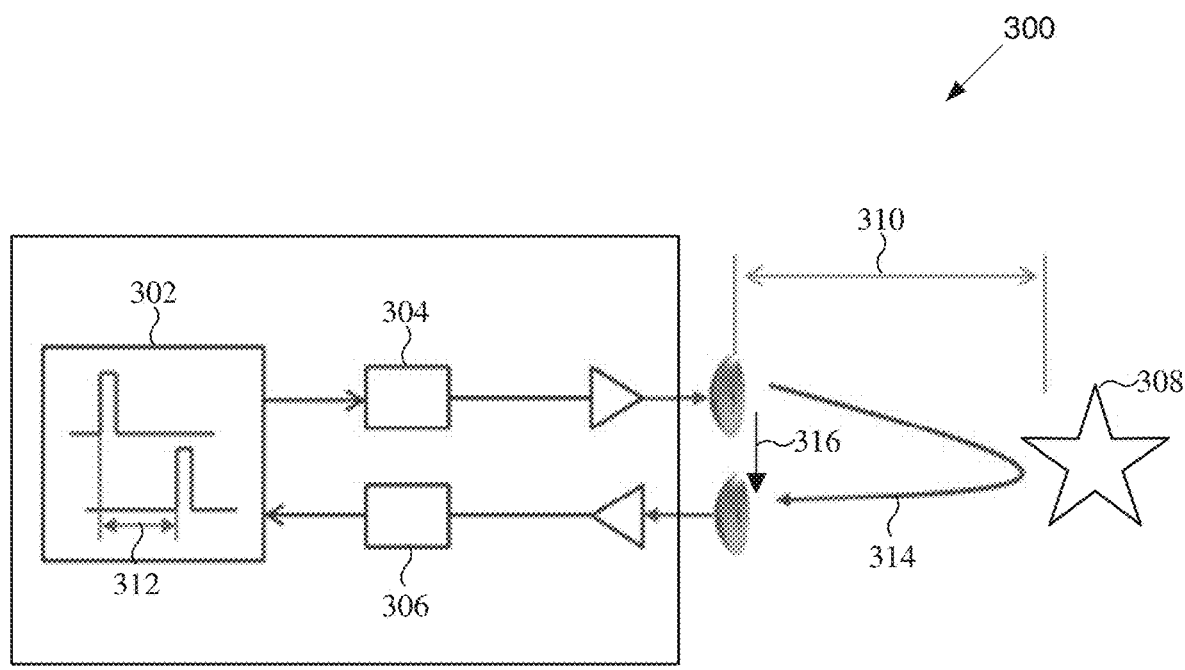
FIG. 3 illustrates an example architecture of a monostatic radar signal according to embodiments of this disclosure.

FIG. 3 illustrates an example architecture of a monostatic radar in an electronic device 300 in accordance with an embodiment of this disclosure. The embodiments of the architecture of the monostatic radar illustrated in FIG. 3 are for illustration only and other embodiments can be used without departing from the scope of the present disclosure.

FIGS. 3 illustrates an electronic device 300 that includes a processor 302, a transmitter 304, and a receiver 306. The electronic device 300 can be similar to any of the client devices 106-114 of FIG. 1, the server 104 of FIG. 1, or the electronic device 200 of FIG. 2. The processor 302 is similar to the processor 240 of FIG. 2. Additionally, the transmitter 304 and the receiver 306 can be included within the radar transceiver 270 of FIG. 2.

As illustrated in FIG. 3, the transmitter 304 transmits a signal 314 to the target object 308. The target object 308 is located a distance 310 from the electronic device 300. In certain embodiments, the target object 308 correspond to the objects that form the environment around the electronic device 300. For example, the transmitter 304 transmits a signal 314 via an antenna. The signal 314 is reflected off of the target object 308 and received by the receiver 306, via an antenna. The signal 314 represents one or many signals that can be transmitted from the transmitter 304 and reflected off of the target object 308. The processor 302 can identify the information associated with the target object 308 based on the receiver 306 receiving the multiple reflections of the signals.

As illustrated in FIG. 3, the leakage 316 represents radar signals that are transmitted from the antenna associated with transmitter 304 and are directly received by the antenna associated with the receiver 306 without being reflected off of the target object 308. Detection or range estimation is challenging and can be compromised due to the presence of the leakage 316. For example, the leakage 316 creates difficulty for close range radar detection, as the leakage 316 could mask the target object 308 which the electronic device 300 including monostatic radar is attempting to identify. Measuring the leakage 316 can be represented by a CIR.

The processor 302 analyzes a time difference 312 from when the signal 314 is transmitted by the transmitter 304 and received by the receiver 306. It is noted that the time difference 312 is also referred to as a delay, as it indicates a delay between the transmitter 304 transmitting the signal 314 and the receiver 306 receiving the signal after the signal is reflected or bounced off of the target object 308. Based on the time difference 312, the processor 302 derives the distance 310 between the electronic device 300, and the target object 308. It is noted that the distance 310 can change such as when the target object 308 moves, while electronic device 300 is stationary, the electronic device 300 moves while the target object 308 is stationary, or both the electronic device 300 and the target object 308 are both moving.

Monostatic radar is characterized for the delayed echo of the monostatic radar as the transmitter 304 of the radar signal and the receiver 306 of the radar signal essentially at the same location. In certain embodiments, the transmitter 304 and the receiver 306 are co-located either by using a common antenna or nearly co-located but use separate but adjacent antennas. Monostatic radars are assumed coherent such that the transmitter 304 and the receiver 306 are synchronized via a common time reference.

Pulse radar is generated as a realization of a desired radar waveform, modulated onto a radio carrier frequency, and transmitted through a power amplifier and antenna, such as a parabolic antenna. In certain embodiments, the antenna is omnidirectional. In other embodiments, the antenna is focused into a particular direction. When the target object 308 is within the field of view of the transmitted signal and within a distance 310 from the radar location, then the target object 308 may be illuminated by RF power density (W/m$^2$), $p_t$, for the duration of the transmission. Equation (1) describes the first order of the power density, $p_t$.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \qquad \text{Equation (1)}$$

Referring to Equation (1), $P_T$ is the transmit power (W). $G_T$ describes the transmit antenna gain (dBi) and $A_T$ is an effective aperture area (m$^2$). $\lambda$ corresponds to the wavelength of the radar signal RF carrier signal (m), and R corresponds to the distance 310 between the antenna and the target object 308. In certain embodiments, effects of atmospheric attenuation, multi-path propagation, antenna loss and the like are negligible, and therefore not addressed in Equation (1).

The transmit power density impinging onto the target object 308 surface can cause reflections depending on the material, composition, surface shape and dielectric behavior at the frequency of the radar signal. In certain embodiments, only direct reflections contribute to a detectable receive signal since off-direction scattered signals can be too weak to be received by at the radar receiver. The illuminated areas of the target with normal vectors pointing back at the receiver can act as transmit antenna apertures with directives (gains) in accordance with their effective aperture areas. Equation (2), below, describes the reflective back power.

$$P_{ref1} = p_t A_t G_t \sim p_t A_t r_t \frac{A_t}{\lambda^2/4\pi} = p_t RSC \quad \text{Equation (2)}$$

In Equation (2), $P_{ref1}$ describes the effective isotropic target-reflected power (W). The term, $A_t$ describes the effective target area normal to the radar direction (m$^2$). The term $r_t$ describes the reflectivity of the material and shape, which can range from [0, . . . , 1]. The term $G_t$ describes the corresponding aperture gain (dBi). RSC is the radar cross section (m$^2$) and is an equivalent area that scales proportional to the actual reflecting area-squared inversely proportional with the wavelength-squared and is reduced by various shape factors and the reflectivity of the material itself. Due to the material and shape dependency, it is difficult to deduce the actual physical area of a target from the reflected power, even if the distance 310 to the target object 308 is known.

The target reflected power at the receiver location results from the reflected power density at the reverse distance 310 collected over the receiver antenna aperture area. Equation (3), below, describes the received target reflected power. It is noted that $P_R$ is the received target reflected power (W) and $A_R$ is the receiver antenna effective aperture area (m$^2$).

$$P_R = \frac{P_{ref1}}{4\pi R^2} A_R = P_T \cdot RSC \frac{A_T A_R}{4\pi \lambda^2 R^4} \quad \text{Equation (3)}$$

A radar system can be used as long as the receiver signal exhibits sufficient signal-to-noise ratio (SNR). The value of SNR depends on the waveform and detection method. Equation (4), below, describes the SNR. It is noted that kT is the Boltzmann constant multiplied by the current temperature. B is the radar signal bandwidth (Hz). F is the receiver noise factor which is a degradation of the receive signal SNR due to noise contributions of the receiver circuit itself.

$$SNR = \frac{P_R}{kT \cdot B \cdot F} \quad \text{Equation (4)}$$

When the radar signal is a short pulse of duration or width, $T_p$, the delay or time difference 312 between the transmission and reception of the corresponding echo is described in Equation (5). τ corresponds to the delay between the transmission and reception of the corresponding echo and equal to Equation (5). c is the speed of light propagation in the air. When there are multiple targets at different distances, individual echoes can be distinguished only if the delays differ by at least one pulse width. As such, the range resolution of the radar is described in Equation (6). A rectangular pulse of a duration $T_P$ exhibits a power spectral density as described in Equation (7) and includes a first null at bandwidth as shown in Equation (8). The range resolution of a radar signal is connected with the bandwidth of the radar waveform is expressed in Equation (9).

$$\tau = 2R/c \quad \text{Equation (5)}$$

$$\Delta R = c\Delta\tau/2 = cT_P/2 \quad \text{Equation (6)}$$

$$P(f) \sim (\sin(\pi f T_P)/(\pi f T_P))^2 \quad \text{Equation (7)}$$

$$B = 1/T_P \quad \text{Equation (8)}$$

$$\Delta R = c/2B \quad \text{Equation (9)}$$

For certain devices, the wireless communication module (e.g., wireless communication interface) can also be used as a radar system in a time-sharing manner (i.e., using time division multiplexing). It is assumed that the radar and the wireless communication system use the same radio frequency band and the two systems may or may not share the same transceiver hardware.

For sensing applications that require an extended period of time, concurrent operations between a radar operation and a communication operation are desirable. Such extended radar sensing could be a gesture recognition application, a liveliness detection, a biometric sensing (e.g., heart-beat measurement), an activity detection (e.g., detecting human movement or other object's movement), etc. Such concurrent operations have to be compatible with the communication protocol while satisfying the sensing needs of the radar applications. In this disclosure, timing structure designs and controls that enable concurrent operations between radar and communication that share the same radio frequency band are provided.

Figure 4:
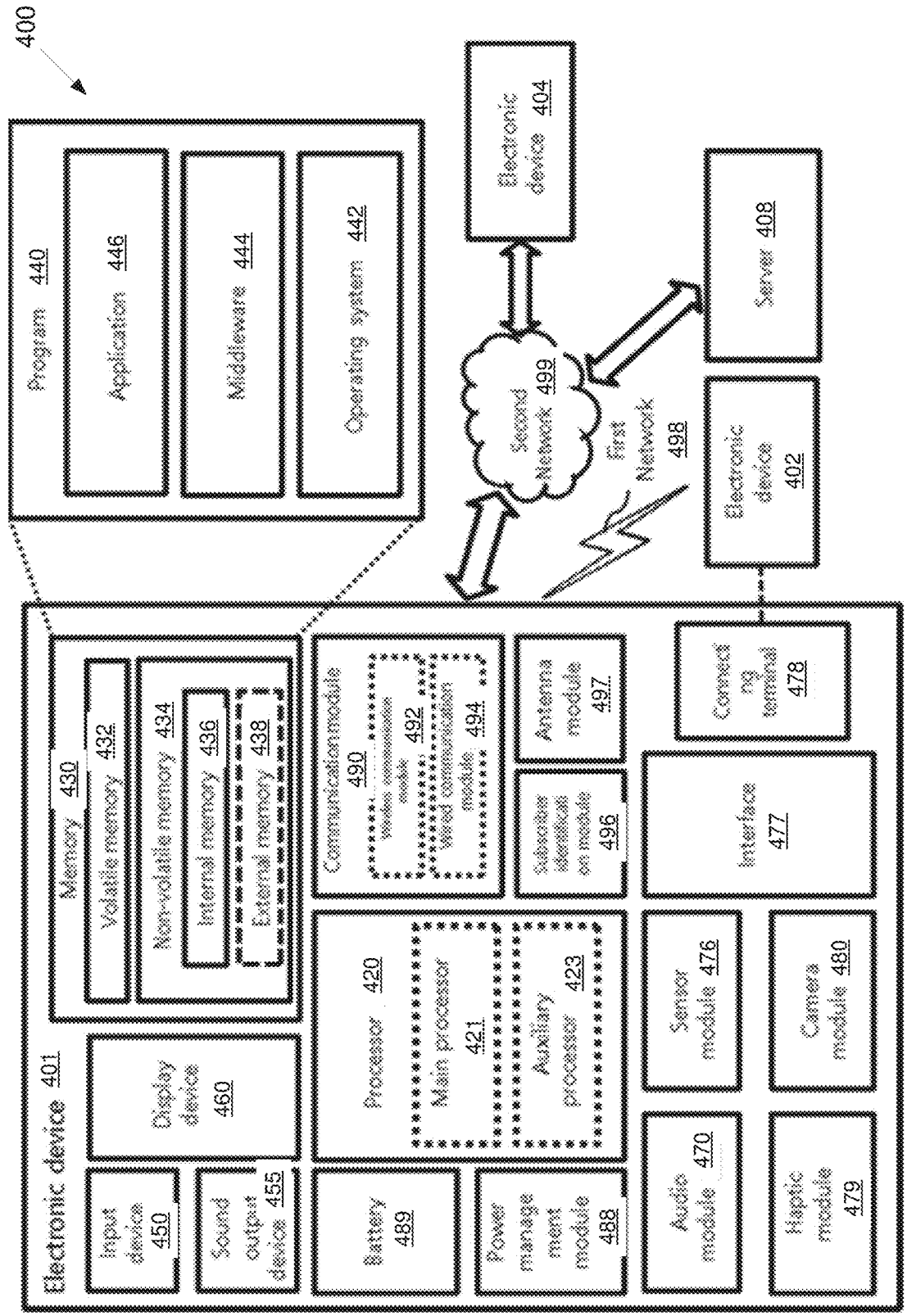
FIG. 4 illustrates an example electronic device and network according to embodiments of this disclosure.

FIG. 4 illustrates electronic device and network 400 according to embodiments of this disclosure. An embodiment of the electronic device and network 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 4, the electronic device 401 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408.

According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module(SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry.

For example, the sensor module 476 (e.g., a fingerprint sensor, an iris sensor, or an illuminance sensor) may be implemented as embedded in the display device 460 (e.g., a display). The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may load a command or data received from another component (e.g., the sensor module 476 or the communication module 490)

in volatile memory 432, process the command or the data stored in the volatile memory 432, and store resulting data in non-volatile memory 434.

According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally, or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thererto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other components (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the displays, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 201 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication.

According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN)

communication module or a power line communication (PLC) module). A corresponding one of these communication modules may communicate with the external electronic device via the first network 498 (e.g., a short-range communication network, such as Bluetooth™, wireless-fidelity (Wi-Fi) direct, Ultra-WideBand (UWB), or infrared data association (IrDA)) or the second network 499 (e.g., a long-range communication network, such as a cellular network, the Internet, or a computer network (e.g., LAN or wide area network (WAN)).

These various types of communication modules may be implemented as a single component (e.g., a single chip), or may be implemented as multi components (e.g., multi chips) separate from each other. The wireless communication module 492 may identify and authenticate the electronic device 201 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB).

According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna.

According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 may perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 5:
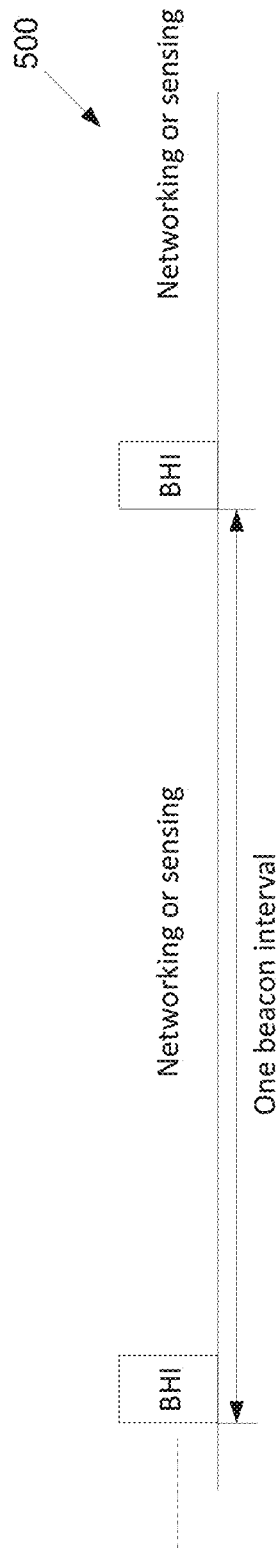
FIG. 5 illustrates an example timing structure of the communication system according to embodiments of this disclosure.

FIG. 5 illustrates an example timing structure of the communication system 500 according to embodiments of this disclosure. An embodiment of the timing structure of the communication system 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

It may start that several concepts are described for communication and radar systems. The time structure of the communication system is provided. The time in the communication system is assumed to be divided into blocks called the beacon intervals as shown in FIG. 5.

As illustrated in FIG. 5, at the beginning of each beacon interval, there is a beacon header interval (BHI) that is used for transmitting beacon packages. The beacons could be transmitted by an access point (AP) to inform devices in a coverage about the availability of services. The beacons could also be transmitted by a device to allow itself to be discovered by an AP or other devices (i.e., in a peer-to-peer network setting). The beacons could be transmitted in an omnidirectional or directional manner.

When using higher frequency bands such as the millimeter wave radio frequency bands, directionality can help increase the coverage range. In such a case, the directional beacon is repeated to cover all directions of interest. After the BHI, there could be some other optional time slots reserved for announcement or beamforming association or other signals for network management purposes.

For simplicity, only BHI block is shown in the figures, but it should be understood that BHI here is generalized to include other slots that are used for network control and maintenance as explained earlier. After that, there may be time available for the device's use, which could be networking (i.e., communication operation) or sensing (i.e., radar operation).

Figure 6:
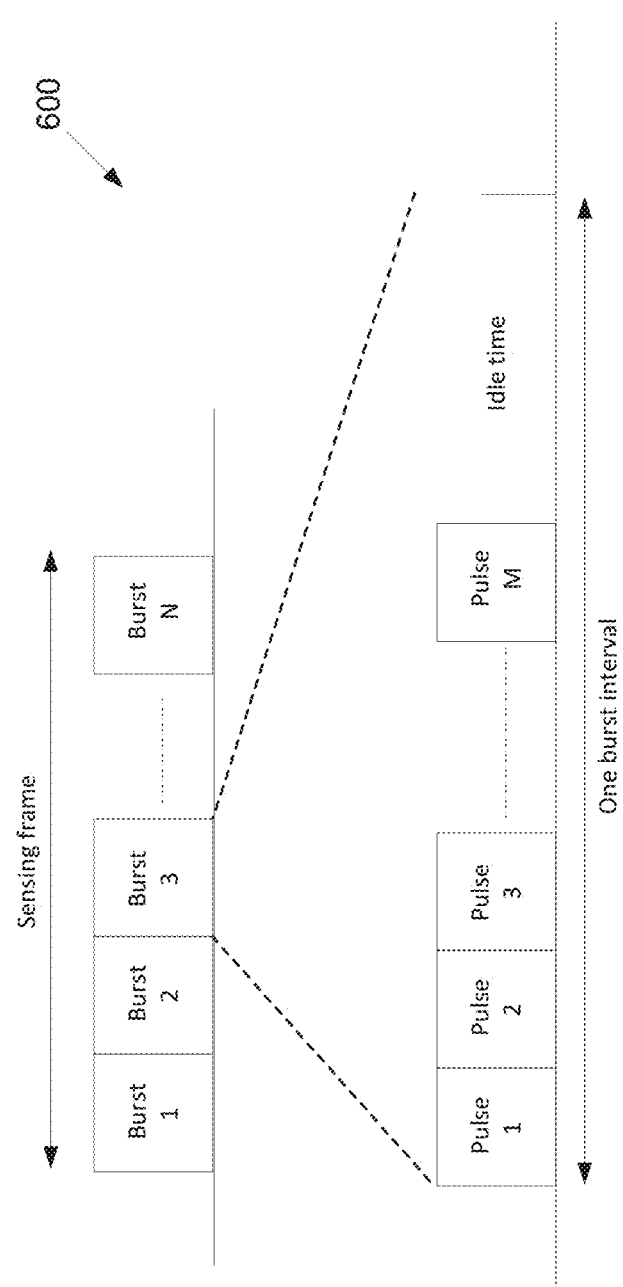
FIG. 6 illustrates example radar sensing timing structure according to embodiments of this disclosure.

FIG. 6 illustrates example radar sensing timing structure 600 according to embodiments of this disclosure. An embodiment of the radar sensing timing structure 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

The radar sensing timing structure is shown in FIG. 6. As illustrated in FIG. 6, N bursts are transmitted in the sensing frame and each burst contains M pulses. It may be noted that there could be some silence time at the end of each pulse transmission as well. At the end of the M-th pulse, there could be some idle time before the next burst. Note that the burst interval can be controlled to achieve certain sensing requirements such as the desired maximum Doppler of the target application.

As illustrated in FIG. 6, a time is divided into bursts. Each burst contains multiple pulses, where each pulse may use a different antenna configuration. In the example structure in FIG. 6, there are N bursts in the sensing frame, and each burst has M pulses. A frame could be a sliding window or non-overlapping window of time that contains N bursts. This frame can be considered as a unit of radar measurement data. One or more frames may be needed depending on the task.

For example, for a gesture recognition task, likely multiple frames of data may be needed since the gesture recognition task has to track the gesture movement for a certain amount of time. It notes that the transmitter does not necessarily transmit the whole time within the pulse duration. The actual transmission may occupy only a small fraction of the pulse duration. Such design choices may depend on the target application and the radar type. It also notes that the "burst" here is also known as the "slow time" domain in the radar literature.

In this disclosure, it may assume that the device is capable of communication and radar operation that happen in the same frequency band (this means the communication band and the radar band could be fully or partially overlap). The communication and radar operation coexist in a time division manner. The radar operation has to be aware of the networking activities.

Figure 7:
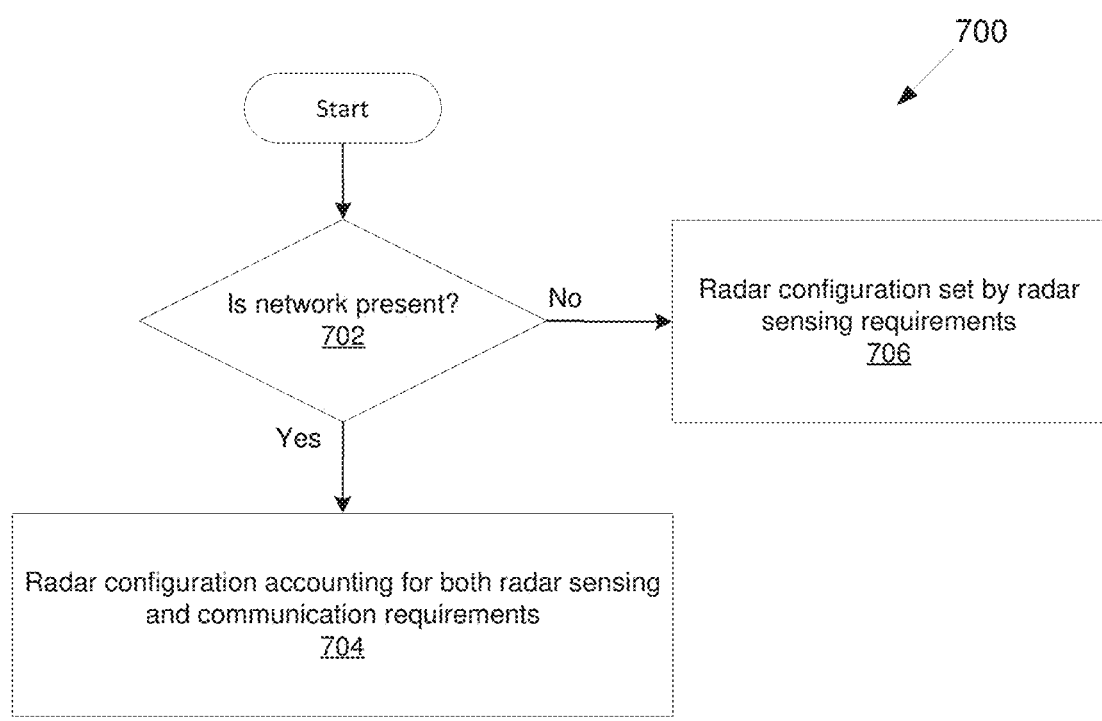
FIG. 7 illustrate a flowchart of a method for radar operations with network coexistence according to embodiments of this disclosure.

FIG. 7 illustrate a flowchart of a method 700 for radar operations with network coexistence according to embodiments of this disclosure. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

The purpose of FIG. 7 is to detect if there is a network in the device's surrounding or not. If none was detected, then the radar can operate without any constraint from the networking activities. In this case, the radar configuration may be chosen to optimize the radar sensing requirements. If a network was detected, then the communication timing structure (i.e., the beacon interval boundaries or equivalently the start of BHI) as well as the networking requirements may be taken into account on top of the radar sensing requirements when deciding the radar configuration. There are various ways to detect a network. One example is to listen for a beacon for a whole beacon interval. If no beacon was detected, it can be inferred that there is no network. If a beacon was detected, then the information in the beacon can be used to obtain the BHI timing.

As illustrated in FIG. 7, the method 700 begins at step 702. In step 702, the method determines whether a network present. In step 702, if the network presents, the method goes to step 704. In step 704, the method selects a radar configuration accounting for both radar sensing and communication requirements. In step 702, if not, the method goes to step 706. In step 706, the method 700 selects a radar configuration set by radar sensing requirements.

In the present disclosure, several embodiments of the timing structures are provided to allow concurrent radar and networking operation assuming a network was detected and the radar timing has to account for the existence of the beacon intervals. It is assumed that the radar sensing prefers uniform sampling in the burst domain (i.e., the slow time domain).

Figure 8:
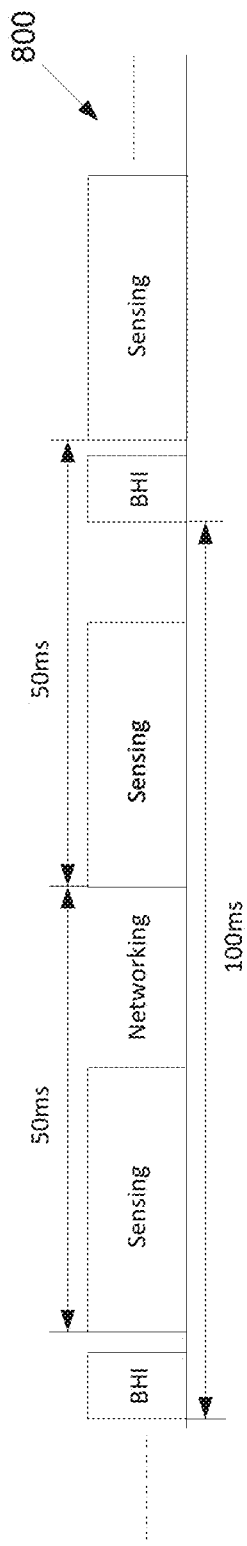
FIG. 8 illustrates an example sensing slots and a beacon interval according to embodiments of this disclosure.

FIG. 8 illustrates an example sensing slots and a beacon interval 800 according to embodiments of this disclosure. An embodiment of the sensing slots and a beacon interval 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

In one embodiment, for uniform sampling of radar measurements within the beacon intervals is shown in FIG. 8, it is assumed that the radar sensing is prioritized and the sensing slot can be placed anywhere within the time available for sensing and networking in a beacon interval.

To allow uniform sampling in the burst domain, it is desirable to place an integer number of sensing slots within the beacon interval to allow repeatability across multiple beacon intervals. For simplicity of illustration, concrete numbers are used for the time duration in this example, but this can be straightforwardly extended to arbitrary values. In FIG. 8, it is assumed that the beacon interval is 100 ms and the sensing slot is spaced by 50 ms. It is assumed that the sensing duration can fit within the 50 ms even when the later part has to accommodate the BHI for the next beacon interval. In this case, by collecting one burst in each sensing slot, it is now possible to achieve uniform sampling in the burst domain for the radar signals while also leaving some time for communication.

As illustrated in FIG. 8, two sensing slots are fitted into a beacon interval with repeatable patterns of sensing slots across beacon intervals. This ensures uniform sampling of the radar measurements.

Figure 9:
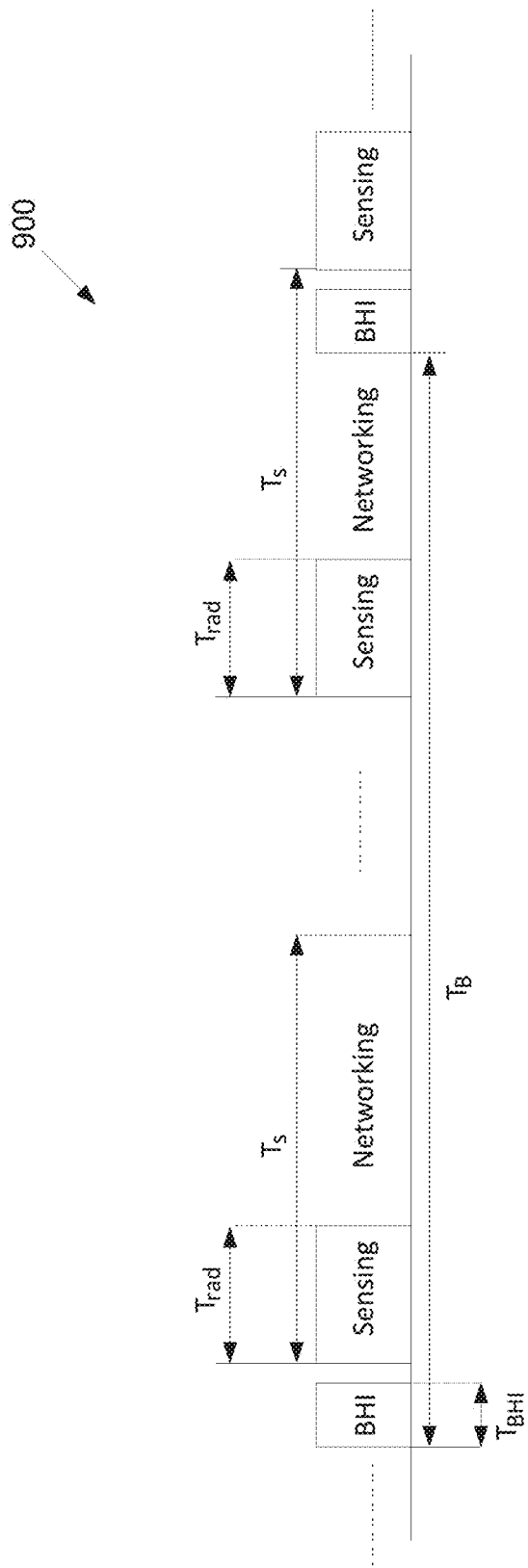
FIG. 9 illustrates an example timing structure to allow uniform sampling of radar measurements according to embodiments of this disclosure.

FIG. 9 illustrates an example timing structure 900 to allow uniform sampling of radar measurements according to embodiments of this disclosure. An embodiment of the timing structure 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

In one embodiment, embodiment illustrated in FIG. 8 is generalized. As illustrated in FIG. 9, similarly as in the aforementioned embodiment, the radar sensing operation is prioritized and it is assumed that the sensing slot can be placed at any time within the available time of the beacon interval, i.e., excluding the BHI. As already noted earlier, BHI here is assumed to not just include the time for transmitting the beacons, but the BHI also includes other slots (such as the announcement interval and beamforming association) used for the control and maintenance of the communication network.

Several time intervals are provided as follows. As illustrated in FIG. 9, $T_s$ is denoted as the sensing interval, which is the time duration between the start of two consecutive sensing slots. $T_{rad}$ is the time duration where the radar signal is transmitted, which may also include some other transmission and or reception required for the radar operation to coexist with the communication network operation (e.g., carrier sensing before transmitting radar pulses or sending announcement packages to declare the channel occupancy during the radar transmission). That is, within a sensing interval there could be $T_s-T_{rad}$ available for communication if it does not overlap with a BHI.

$T_B$ is defined as the beacon interval and $T_{BHI}$ is defined as the time duration for transmitting beacons and other network control and maintenance activities. In this case, the maximum number of sensing slots that could be fitted into a beacon interval is given by $[T_B/T_s]$, where [·] denotes the floor function (which outputs the integer part of a positive number) and $T_s$ must satisfy the condition $T_s \geq T_{BHI}+T_{rad}$. It may be noted that, depending on the protocol used, there can be some small gap time between packages and also the time for switching between sensing and networking functionality if it happens on the same device. Such gap times are assumed already included in the appropriate time intervals. Similarly as in the previous example embodiment, by collecting one burst of radar measurement in each $T_s$, a uniform radar sampling with a burst interval of $T_s$ is achieved while allowing some time for the communication network to operate concurrently.

As illustrated in FIG. 9, the timing structure is provided to allow uniform sampling of radar measurements when $T_s \geq T_{BHI}+T_{rad}$.

Figure 10:
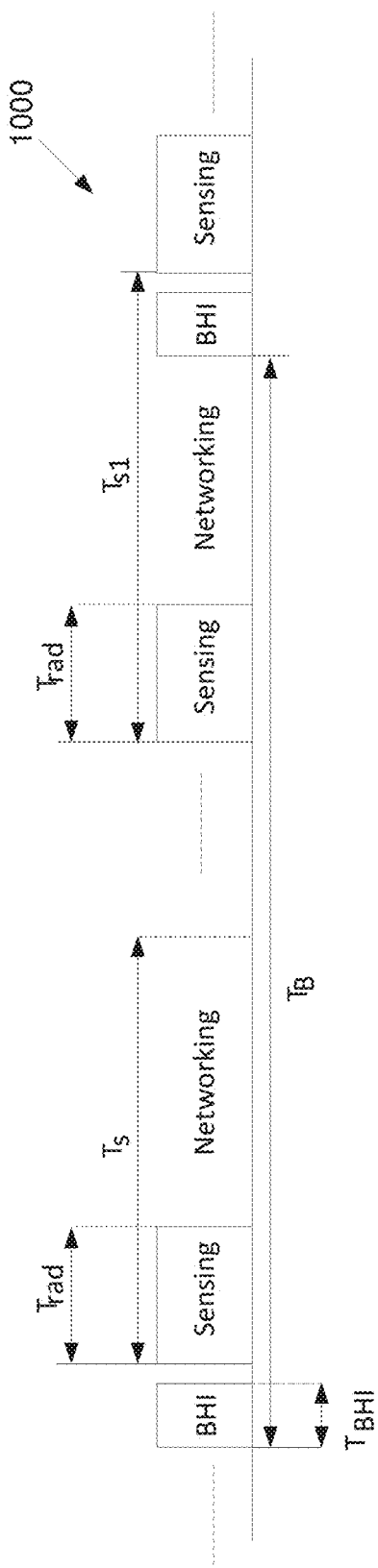
FIG. 10 illustrates an example timing structure to approximate uniform sampling of the radar signal according to embodiments of this disclosure.

FIG. 10 illustrates an example timing structure 1000 to approximate uniform sampling of the radar signal according to embodiments of this disclosure. An embodiment of the timing structure 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

In one embodiment, it may happen that the desired burst interval $T_s$ does not satisfy the condition that it is equal to or larger than $T_{BHI}+T_{rad}$. In this case, there are two examples.

In one example, as illustrated in FIG. 10, where among the sensing interval between sensing slots within the same beacon interval satisfies the desired burst interval (i.e., the sensing interval is set to $T_s$) and only the sensing interval (denoted $T_{s1}$, which is larger than $T_s$) between two sensing slots of two adjacent beacon intervals cannot meet the desired sensing interval.

As illustrated in FIG. 10, a timing structure is shown to approximate uniform sampling of the radar signal when $T_s<T_{BHI}T_{rad}$. In this design, only the sensing interval between beacon intervals is enlarged to $T_{s1}>T_s$, which cannot meet the desired sensing interval.

Figure 11:
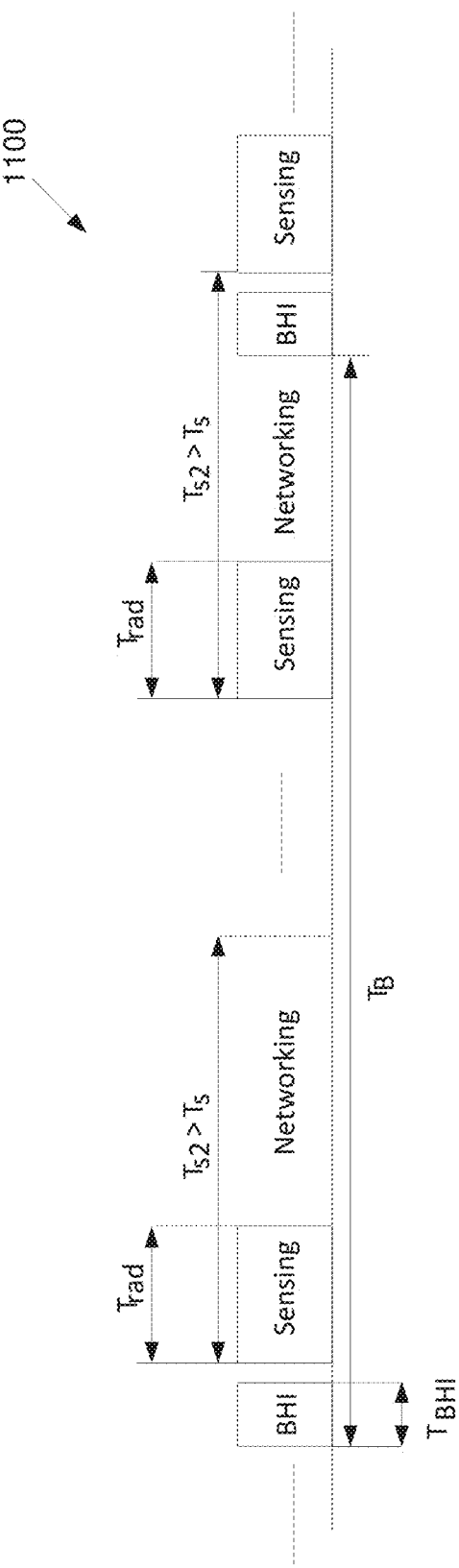
FIG. 11 illustrates another example timing structure to approximate uniform sampling of the radar signal according to embodiments of this disclosure.

FIG. 11 illustrates another example timing structure 1100 to approximate uniform sampling of the radar signal according to embodiments of this disclosure. An embodiment of the timing structure 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

In one example, as illustrated in FIG. 11, the sensing interval is enlarged from $T_s$ to $T_{s2}$ so that the sensing interval is larger than $T_{BHI}+T_{rad}$, and embodiment as illustrated in FIG. 9 is applied. That is, for this option all sensing intervals do not satisfy the desired burst interval but the deviation from the desired interval is spread equally among all the sensing slots rather than just concentrating on the slots at the boundaries of beacon intervals. This means, $T_{s2}<T_{s1}$. For both options, if the beacon interval can be freely chosen, a larger beacon interval may mitigate the impact of not meeting the desired burst interval.

As illustrated in FIG. 11, a timing structure is shown to approximate uniform sampling of the radar signal when $T_s<T_{BHI}+T_{rad}$. In this case, the sensing interval is enlarged to $T_{s2}$ such that the sensing interval satisfies $T_{s2} \geq T_{BHI}+T_{rad}$.

In one embodiment, the radar sensing is not the first priority and there could be interruption from the communication network operation. In this case, before radar transmission, carrier sensing is performed to check the availability of the radio channel, and if the channel is already occupied, radar transmission cannot be performed. In this case, all the timing structure for the radar sensing are still applied as explained earlier. The difference is that now during some sensing slots, the radio channel may not be available and the radar measurements during those sensing slots may not be available. Thus, while there are some missing measurements, the obtained measurements are still at the desired sampling points (or approximately so for those cases illustrated in FIG. 10 and FIG. 11).

Once the radar burst sequence is obtained, various approaches could be applied to mitigate the impact of the missing bursts. One example is to apply some interpolation method (e.g., the linear or spline interpolation) to fill in the missing bursts before inputting into subsequent processing. Another example is an indirect interpolation where the radar signals are passed through a low pass filter. This may get rid of the high frequency components (due to the sudden jumps created by the missing bursts) in the signals.

Another solution to deal with the interruption from the networking activity is to perform the radar measurements at the first available time after the networking activity ends to avoid missing samples. Since network activities may overlap with the sensing slot only partially, this approach can help reduce the number of missing samples especially when the network activity is not too long. This example is illustrated in FIG. 12.

Figure 12:
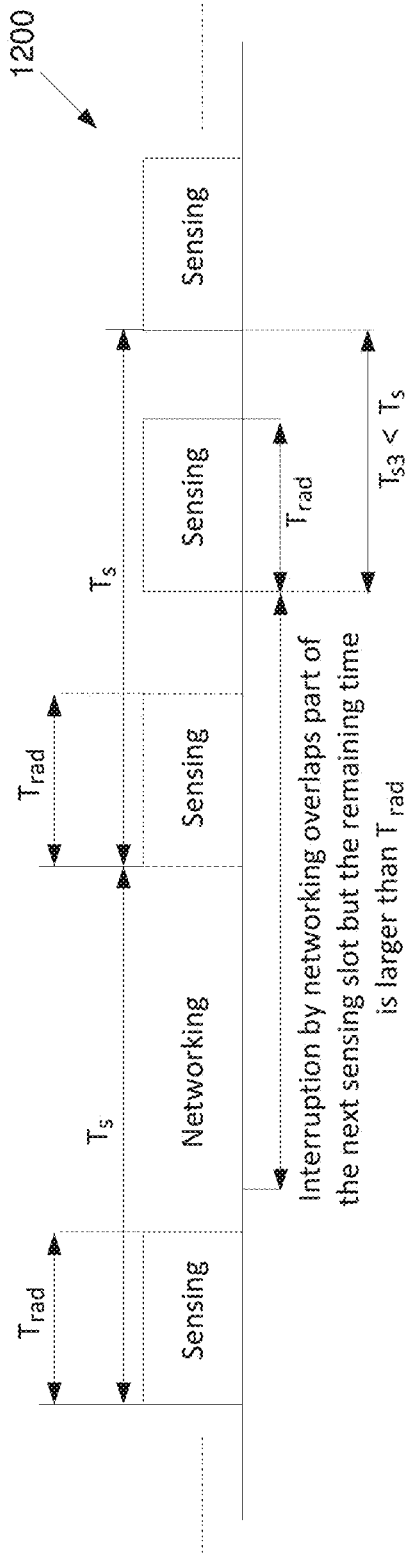
FIG. 12 illustrates an example avoiding missing radar burst measurement samples according to embodiments of this disclosure.

FIG. 12 illustrates an example avoiding missing radar burst measurement samples 1200 according to embodiments of this disclosure. An embodiment of the avoiding missing radar burst measurement samples 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 12, the network activity starts at some point in time during the available time between two sensing slots. The network activity continues for some time and the network activity overlaps with part of the next sensing slot. Because of this, the original sensing schedule according to the uniform sampling timing cannot be executed.

In this case, if the remaining time $T_{s3}>T_{rad}$, then there is still enough time to collect the radar measurements for that sensing slot. In some cases, it may not be meaningful to collect this sample if the remaining time is too close to the next sensing slot. Thus, rather than using the condition $T_{s3}>T_{rad}$, some margin $\Delta>0$ are introduced, and the sample in the interrupted sensing slot is collected only if $T_{s3}>T_{rad}+\Delta$. This approach violates the uniform sampling timing during the interruption, but this approach can reduce some missing samples. However, missing samples can still happen when the interruption by the networking overlaps a large portion of the sensing slot with remaining time less than $T_{rad}+\alpha$. Thus, the approach to deal with the missing samples as mentioned in the aforementioned embodiment and/or example can also be applied here.

In the aforementioned embodiment and/or example, a uniform radar burst sampling (or an approximation of that) is considered while ensuring concurrent operation of the communication system in the same radio frequency band. Besides the burst intervals, the arrangement of the pulses (including the choice of the antennas) can also impact the radar sensing performance. Thus, multiple radar configurations (that include the pulses arrangement and the burst intervals) could be defined and selected dynamically according to the demand in the networking side and the requirements for the radar sensing. Such an example structure is illustrated in FIG. 13.

Figure 13:
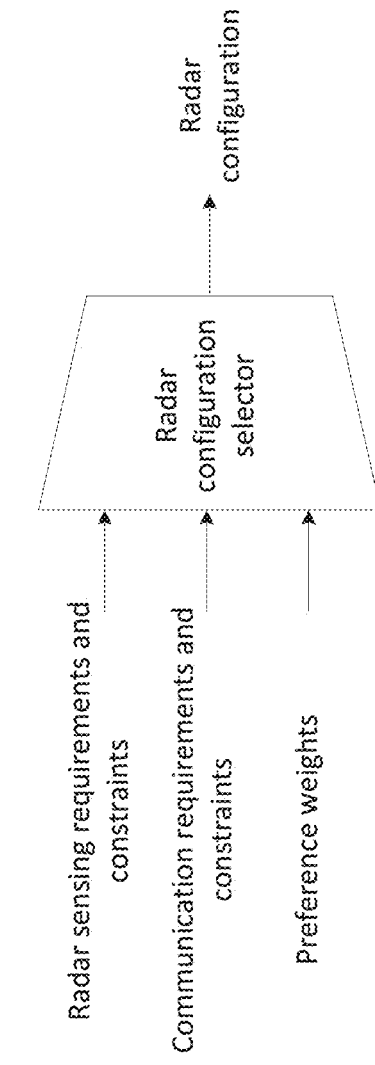
FIG. 13 illustrates an example dynamic radar configuration according to embodiments of this disclosure.

FIG. 13 illustrates an example dynamic radar configuration 1300 according to embodiments of this disclosure. An embodiment of the dynamic radar configuration 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 13, the radar sensing requirements can be derived from the target radar sensing applications. For example, if the targets of the sensing are hand gestures, then it is likely that the maximum speed of the gesture is less than a few meters per second. This determines the desired burst interval. Besides this, there are also the constraints on the radar signal strength. If the desired target distance from the radar can be far away (e.g., up to 1 m), then specific design of the pulses may be needed to boost the signal strength.

The communication requirements and constraints include the latency (which may limit the maximum allowable radar sensing duration, i.e., $T_{rad}$) and data rate (which can limit the maximum allowable duty cycle for the radar sensing), statistics of the packets (e.g., the typical packet length and distribution), and the interference level in the network. The preference weights can be used to bias the configuration in favor of the radar or the communication system.

As illustrated in FIG. 13, a dynamic radar configuration setting driven by the requirements and constraints of the radar and communication system is provided. The requirements and constraints can be derived from the target applications as well as system themselves (e.g., hardware or software or restrictions from some standards).

In one embodiment, several specific radar configuration designs are provided for the radar and communication requirements.

In one example, a configuration design is provided for a gesture recognition application with priority on the gesture recognition (i.e., the radar sensing) over the networking. One such design is illustrated in FIG. 14.

Figure 14:
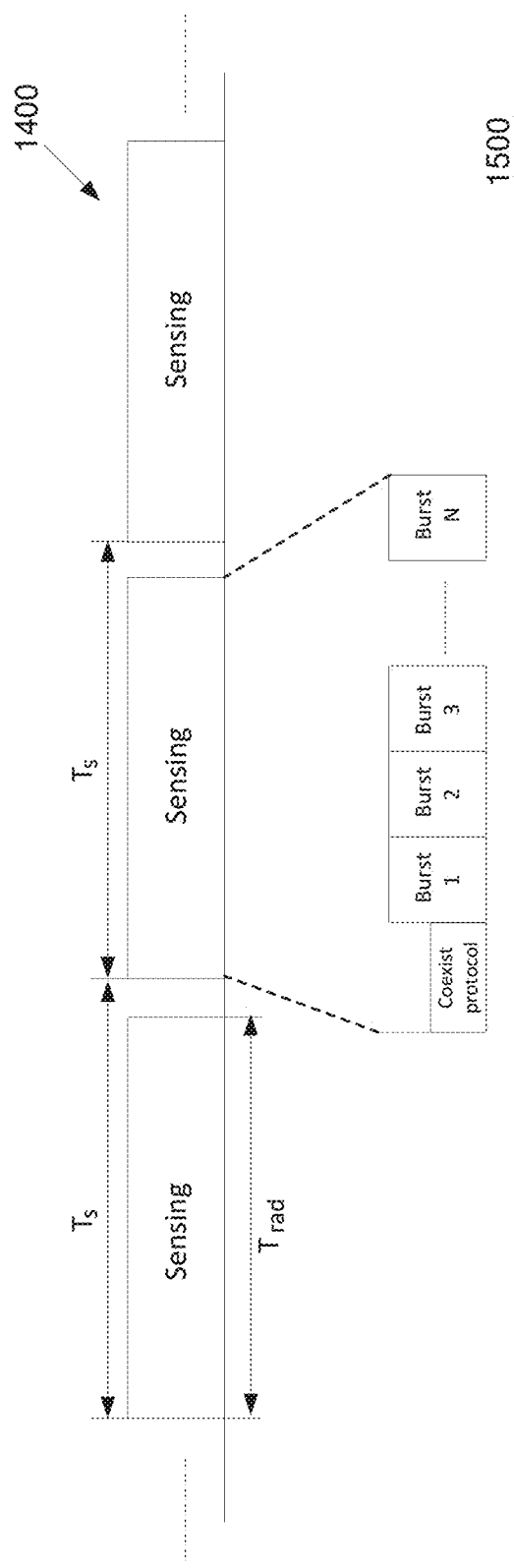
FIG. 14 illustrates an example structure of the radar bursts according to embodiments of this disclosure.

FIG. 14 illustrates an example structure of the radar bursts 1400 according to embodiments of this disclosure. An embodiment of the structure of the radar bursts 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 14, since the radar is prioritized, when the gesture recognition functionality is on, the radar may be configured to best support the gesture without the constraints from the networking besides the timing set by the BHI if a network exists in the vicinity of the device. For compliance with the networking protocol and/or regulation, the time may need to be used in chunks rather than in a continuous manner. Thus, while the sensing slots is packed back-to-back, there may be some small gap in between the sensing slot to allow compliance with the protocol and/or regulation.

As illustrated in FIG. 14, it may be required to first make some announcement transmission for every chuck of duration $T_s$, which is represented by the block "coexist protocol" in the figure. In this case, to mitigate the impact of the coexisting protocol, $T_s$ may be selected to the maximum number allowed and fit the maximum number of bursts possible into $T_s$ (i.e., as opposed to one burst per $T_s$ as described in earlier embodiments). E.g., as illustrated in FIG. 14, it is assumed that N bursts can be fitted in the a sensing slot of duration $T_s$. After the N-th burst, there may be another small gap before the start of the next sensing slot required for maintenance or protocol compliance.

As illustrated in FIG. 14, the structure of the radar bursts is shown when time has to be allocated in chunk and there is a requirement to reserve some at the beginning and end of each chuck for compliance by the rules for coexisting between radar and communication system.

In one embodiment, numerical examples showing the configuration explained earlier are provided. For some target gesture set, 500 micro-seconds burst interval is desirable. The maximum value allowed for $T_s$ is 8 ms. Also, the coexisting protocol and the gap at the end of the sensing slot combines to about 100 micro-seconds. Without the slots required by the coexisting protocol and the gap, 8 ms can fit 16 bursts nicely. Because 100 micro-seconds divided by 16 may result in a small change in the burst interval, it may be beneficial to slightly reduce the burst intervals so that it can still accommodate 16 bursts within the 8 ms. The maximum allowable burst interval is then $(8000-100)/16=493.75$ micro-seconds. Any values within the range 450 to 493 micro-seconds are acceptable and could be chosen for the convenience of the radar system (in terms of both software and hardware settings).

Figure 15:
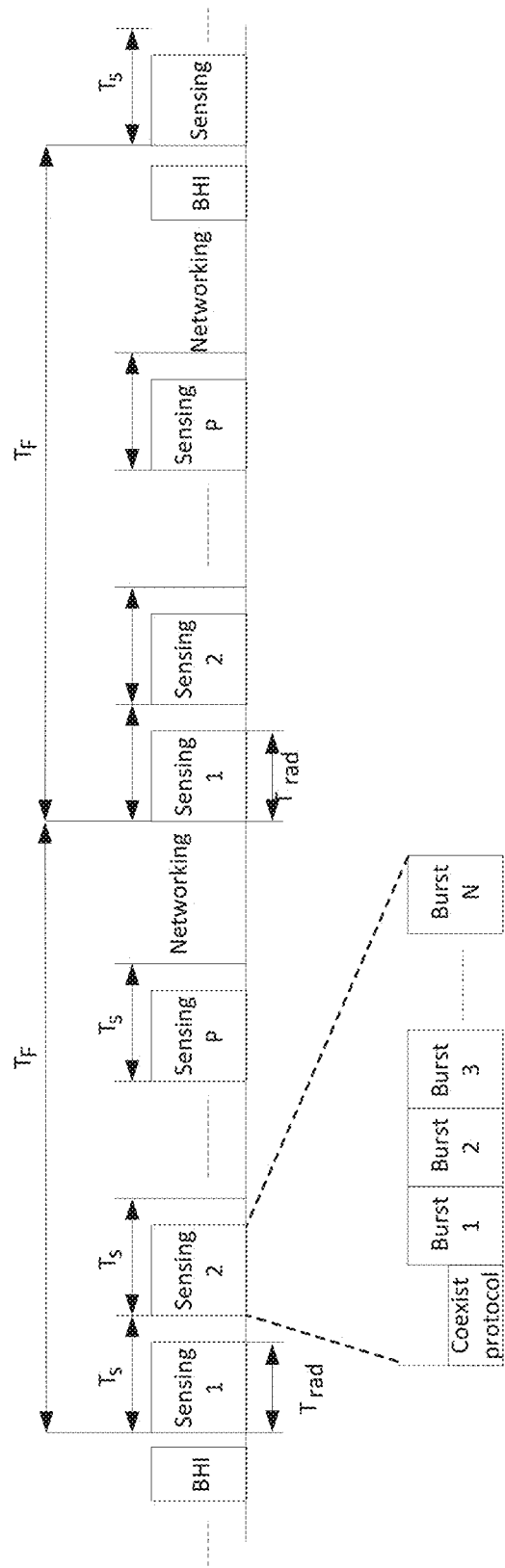
FIG. 15 illustrates another example structure of the radar bursts according to embodiments of this disclosure.

FIG. 15 illustrates another example structure of the radar bursts 1500 according to embodiments of this disclosure. An embodiment of the structure of the radar bursts 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

In one example, a gesture recognition but with coexistence by time-sharing within the beacon interval is considered. As illustrated in FIG. 15, a time can be allocated in chunks rather than in a continuous manner. Contrary to the previous embodiment, to allow concurrent networking operation, there must be some time allocated explicitly for networking. To allow this, one such design as shown in FIG. 15 is to introduce a sensing frame (of duration $T_F$) that consists of P sensing slots of $T_s$ seconds with N bursts per sensing slot.

In this case, there may be $T_F-PT_s$ seconds left for networking if the sensing frame does not overlap with a BHI. If it does, then the networking time may also exclude the BHI duration, i.e., $T_F-PT_s-T_{BHI}$. For simplicity of illustration, two sensing frames are shown in FIG. 15, but it should be understood that any number of sensing frames can fit within the beacon interval depending on the desired sensing frame duration $T_F$ and the beacon interval duration.

Note that in this design, there are two levels of sampling that are kept uniform: the first level is the sensing frame with the sampling duration $T_F$, and the burst level sampling. By packing P sensing slots together, NP bursts of radar signals are obtained, which are approximately uniformly sampled. The NP (approximately) uniformly sampled bursts can then be processed (e.g., by extracting the Doppler information such as in the form of a range-Doppler map). If the range-Doppler map is the processing procedure for the NP bursts, the uniform sampling of the sensing frames means that a uniform sampling of the range-Doppler maps is obtained in the time domain.

With this uniform sampling in the sensing frames, it can be ensured that no too-large duration of time during the gesture is missing. The gap between the sampled frames may be the duration of the networking which is at most $T_F-PT_s$. With this gap designed to be tolerable by the gesture recognition algorithm, a smooth coexisting between the radar sensing and the communication operation can be ensured. We also note that the approximately uniform sampling designs for $T_s$ as described in FIG. 9, FIG. 10, FIG. 11, and FIG. 12 are directly applicable for $T_F$ with $T_{rad}$ replaced by $P \cdot T_s$ and $T_s$ replaced by $T_F$.

As illustrated in FIG. 15, the structure of the radar bursts is shown when time has to be allocated in chunk and there is a requirement to reserve some at the beginning and end of each chuck for compliance by the rules for coexisting between radar and communication system. Besides this constraint of allocation of time in chucks, there is also the requirement of concurrent networking operation which is enabled by allocating some duration of time between sensing frames of duration $T_F$.

In one embodiment, a numerical example of the design is provided as illustrated in FIG. 15. The radar burst intervals may be set similarly as in the previous numerical example to about 500 micro-second and $T_s$ of 8 ms. For the sensing frame duration $T_F$, it may be selected according to the desired Doppler resolution and the networking requirement (i.e., the time duration needed by the networking operation). For certain type of gesture sets, it may be sufficient to use a time duration of about 30 ms. In this case, P=4, and the total duration of active radar sensing within a sensing frame is 8×4=32 ms. With 16 bursts per sensing slot as in the previous example, there are 64 bursts per sensing frame.

A related design may still target about 30 ms sensing frames but with a reduced number of bursts, for example to 32 bursts instead of 64. One way to do this is to increase the burst interval to around 1 ms instead of around 500 microseconds. The benefit of doing this includes the reduced duty cycle, which means less power consumption as well as interference to other devices. Also, if the network protocol allows (and with appropriate hardware and software support), it may also be possible to allocate the ~500 microseconds between the radar sensing bursts for communication as well. This way, there is further increase in the time duration for the networking operation.

Besides the burst interval, the pulses may be designed accordingly as well. For the gesture recognition, depending on the set of gestures, the recognition can be done from the range and Doppler information and no angular information is required. In such a case, the budget of time available within the burst duration may be used to boost the SNR so that gesture recognition applications can be used at a larger distance from the radar. With this in mind, the pulses could be structured as shown in FIG. 16.

Figure 16:
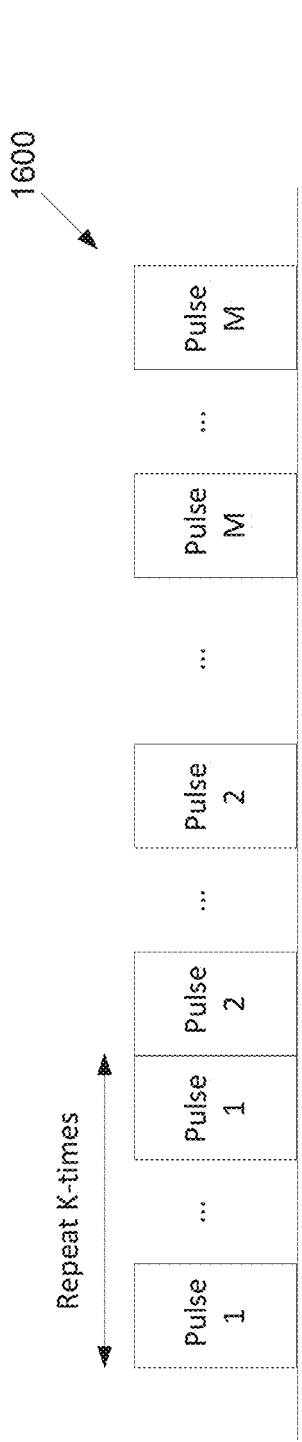
FIG. 16 illustrates an example pulse configuration according to embodiments of this disclosure.

FIG. 16 illustrates an example pulse configuration 1600 according to embodiments of this disclosure. An embodiment of the pulse configuration 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 16, each pulse of the same index (e.g., pulse 1) uses the same antenna setting, and each pulse is repeated K times each. Thus, as illustrated in FIG. 16, there are a total of MK pulses and with M different antenna configurations. With this pulse arrangement, the K pulses that use the same antenna configuration could be averaged to boost the signal strength.

The use of the different antenna configurations in this case may be to incorporate some diversity gains in the choice of the antennas. Also, it may be noted that K cannot be too large, because the target (gesture) is moving and thus averaging is valid only if the changes within the total duration of the K pulses is negligible. Back to the concrete numerical examples, if the burst interval is 490 microseconds, and a pulse is 10 micro-seconds, up to 49 pulses could be packed. One design choice may use 32 pulses with 4 unique antenna configurations. In this case, the repetition number K is 8. In another design, one could use 24 pulses with 3 unique antenna configurations, and again K is 8. In yet another design, 32 pulses with 8 unique antenna configurations and K=4 could be used.

As illustrated in FIG. 16, pulse configurations for boosting the radar signal strength is provided.

Another example application could be a radar proximity sensing that includes both range and bearing (i.e., the azimuth and elevation angles) estimation. Again, it is assumed that the radar sensing is prioritized. In this case, the constant burst duration is mainly helpful in coherently combining the multiple bursts, and thus there is some freedom in selecting the burst duration. In this case, the only constraint is that the intervals may roughly match the range of speed of the expected target so that the signal strength can be optimized.

Regarding the pulse configuration, since angles need to be estimated, it is desirable to use as many antennas as possible (thus improving the angular resolution). E.g., M distinct antenna configurations could be used with no repetition within a burst. As a concrete numerical example, consider the case when M=25 distinct antenna configurations are used with pulse duration of 10 micro-seconds. In this case, the total duration of $T_{rad}$ is 250 micro-seconds plus the time needed by the procedures for concurrent operation. Thus, by setting the sensing slot to be 2 ms there may be 2 ms-$T_{rad}$ available to allow concurrent networking operation.

In one embodiment, it may be beneficial to properly select where to place the first radar sensing slot in the beacon interval. In such embodiment, the first sensing slot means the first sensing slot from each time the sensing function is enabled or the first sensing slot after the system adjusts the transmission timing. It may be assumed that once the first sensing slot is allocated, the rest of the sensing slots may be allocated according to the period that it is set unless the system performs a timing adjustment. Several factors can impact this choice including the time drift (due to imperfect clock synchronization between the device and the device transmitting the beacons), and back-off operation in a random channel access protocol.

As described in the aforementioned embodiments and/or examples, it is desirable to avoid overlapping sensing slots with BHIs because the sensing slots can interfere each other leading to degradation in the performance of both the communication and radar systems. If the first radar sensing slot is placed too close to the BHI, over time, the clock drift could cause the radar sensing slot to overlap with a BHI. Therefore, the start of the first radar sensing slot may have some margin from the BHI to account for the possible time drift from the start to the stop of the sensing.

For example, if a typical sensing duration would last on the order of 100s of seconds and the time drift is expected to be 5 ms (assuming 25 ppm oscillator in both devices, e.g., a STA (station) and an AP (access point)) or less, then a margin of 5 ms from the BHI may be selected. This first sensing slot location selection is illustrated in FIG. 17.

Figure 17:
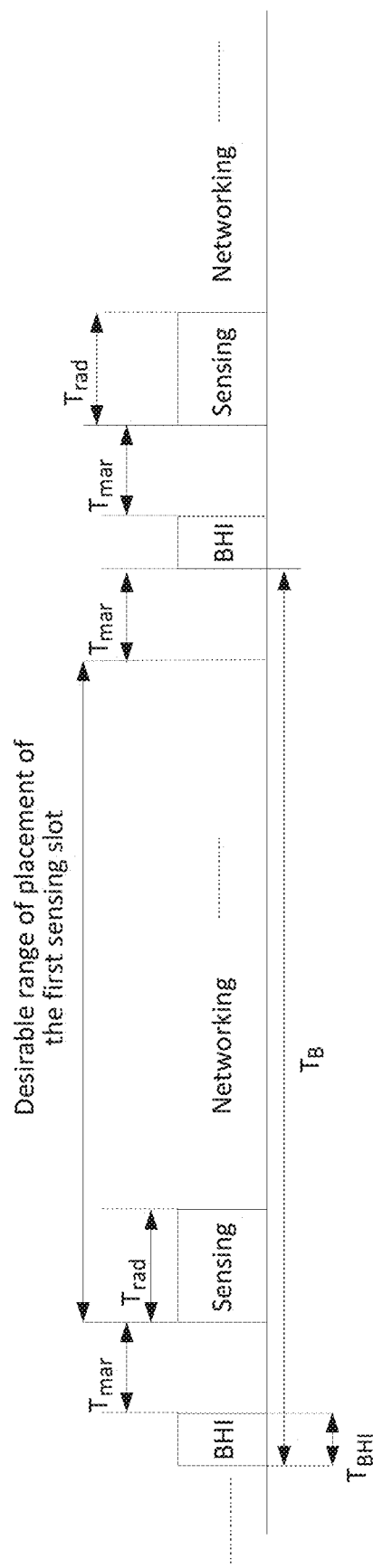
FIG. 17 illustrates an example selection of the location of the first radar sensing slot according to embodiments of this disclosure.

FIG. 17 illustrates an example selection of the location of the first radar sensing slot 1700 according to embodiments of this disclosure. An embodiment of the selection of the location of the first radar sensing slot 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 17, $T_{mar}$ is the margin for accommodating the time drift, and thus $T_{mar}$ may be set to be a value larger than the maximum expected time drift (5 ms in the previous example) for the whole radar sensing duration. In this case, the prefer location of the first sensing slot would be at $T_{mar}$ from the end of the BHI. A similar argument can be applied at the end of a beacon interval because the time drift can shift to the left or the right. Thus, the desirable placement for the first sensing slot is somewhere between $T_{mar}$ after the end of the BHI of the current beacon interval and $T_{mar}$ before the start of the BHI of the next beacon interval. In the case of the sensing frame structure in FIG. 15, all the sensing slots in the first beacon interval (BI) is desired to be allocated in the desirable range of placement in FIG. 17. This applies to the following embodiments as well.

As illustrated in FIG. 17, a selection of the location of the first radar sensing slot is provided when considering only time drift.

In another embodiment, not only the time drift but other factors may also be considered for deciding where to place the first sensing slot. For example, the back-off due to the contention for the channel. With that consideration, the margin before the start of the next BHI may be large enough to accommodate the time drift and the expected wait time due to the back-off. That is even if a back-off event happens, it may be ensured that the sensing may not overlap with a BHI for the whole sensing duration. This is shown in FIG. 18.

Figure 18:
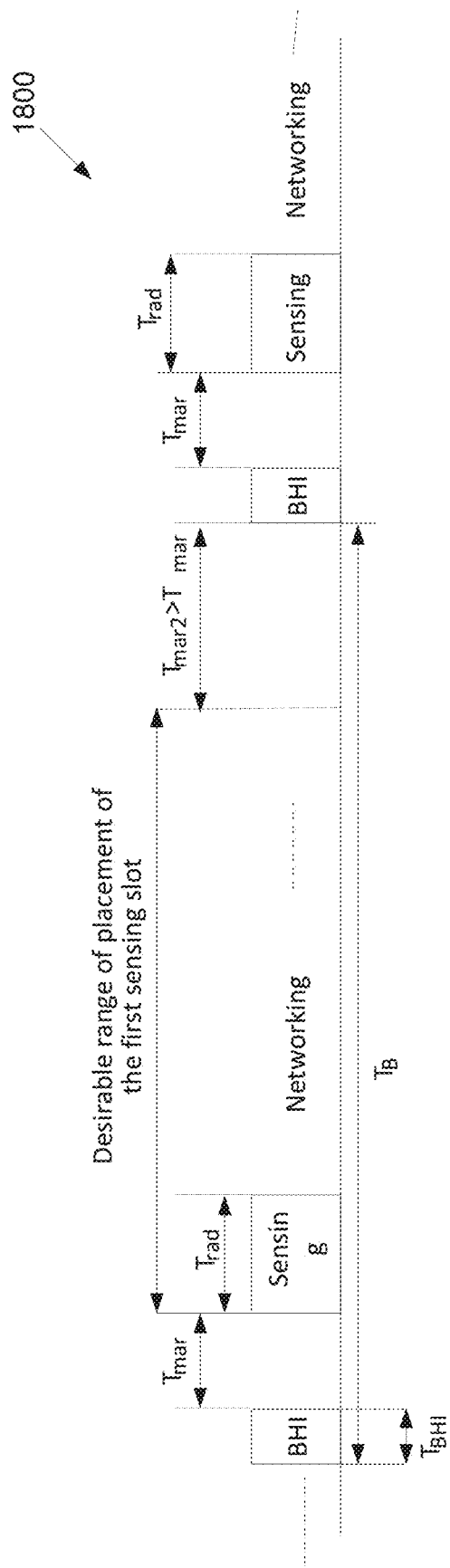
FIG. 18 illustrates another example selection of the location of the first radar sensing slot according to embodiments of this disclosure.

FIG. 18 illustrates another example selection of the location of the first radar sensing slot 1800 according to embodiments of this disclosure. An embodiment of the selection of the location of the first radar sensing slot 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 18, the location of the first sensing slot is somewhere between $T_{mar}$ after the end of the BHI (this $T_{mar}$ is the same as the one in FIG. 17) and $T_{mar2} > T_{mar}$ before the start of the next BHI. $T_{mar2}$ needs to be set large enough to account for the possible time drift and the wait time before it is allowed to send the first sensing slot. As the back-off duration cannot be perfectly predicted, if the sensing slot still overlaps with a BHI due to back-off or other reason, the sensing slot timing needs to be adjusted. The new allocated time slot may be in the desirable range in FIG. 18 as well. In the case of sensing frame structure in FIG. 15, once a BHI overlaps with one of the sensing slots or in the middle of several consecutive sensing slots, the sensing slot timing needs to be adjusted. And the new allocated time slots for all the sensing slots in the first beacon interval after the adjustment may fit in the desirable range in FIG. 18 as well.

As illustrated in FIG. 18, an election of the location of the first radar sensing slot is provided when considering time drift and other factors such as the back-off time due to channel contention.

In another embodiment, the radar could run for an indefinite time so that the maximum expected time drift cannot be pre-calculated. In this case, the margin for the time drift $T_{mar}$ may be selected according to some desired time duration, for example, if a typical duration can be assumed, a typical sensing duration can be used to select $T_{mar}$. Now, in this case of indefinite sensing duration the time drift could eventually exceed the margin time and thus overlapping with the BHI can happen.

Figure 19:
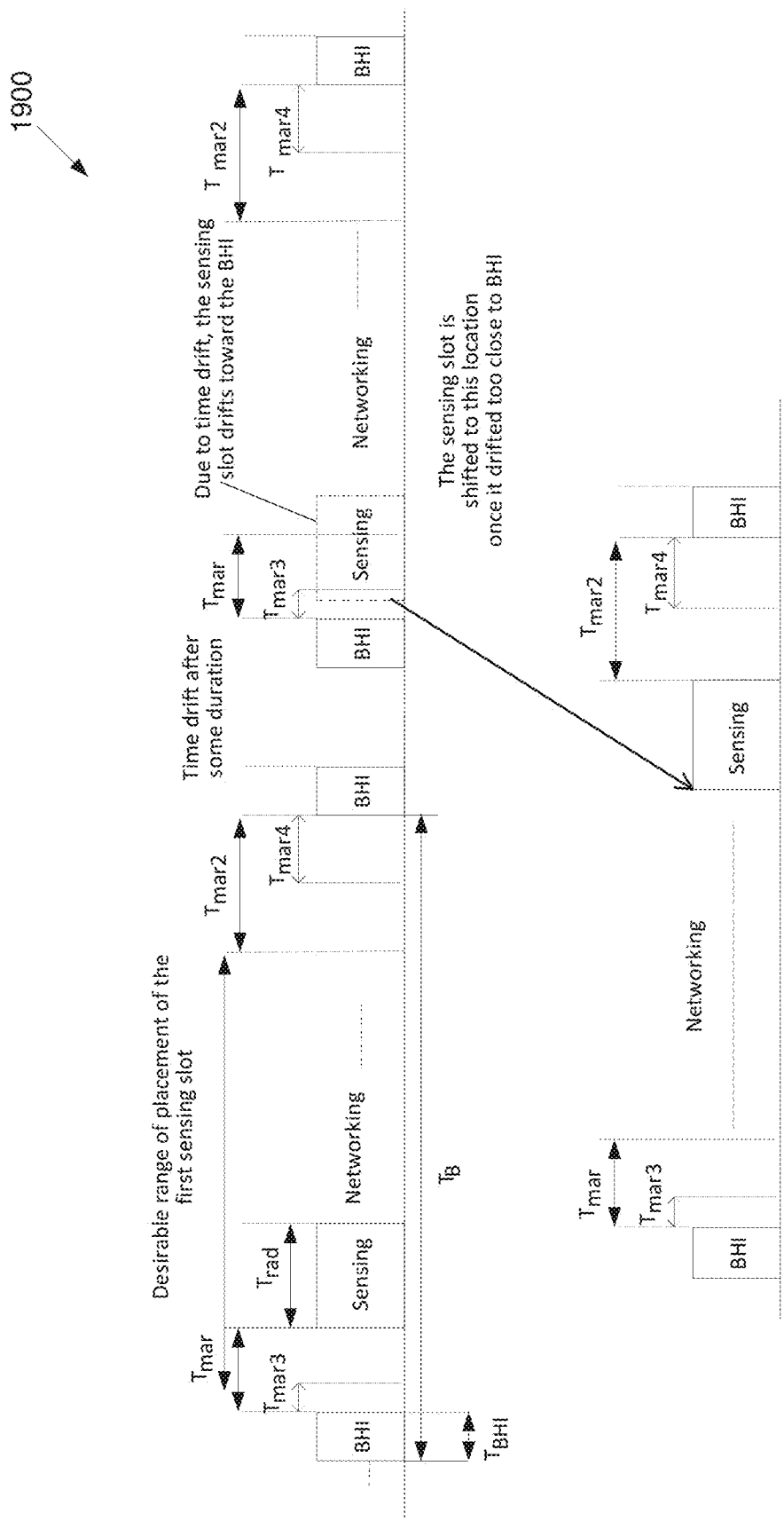
FIG. 19 illustrates an example sensing slot location adjustment according to embodiments of this disclosure.

FIG. 19 illustrates an example sensing slot location adjustment 1900 according to embodiments of this disclosure. An embodiment of the sensing slot location adjustment 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

Figure 20:
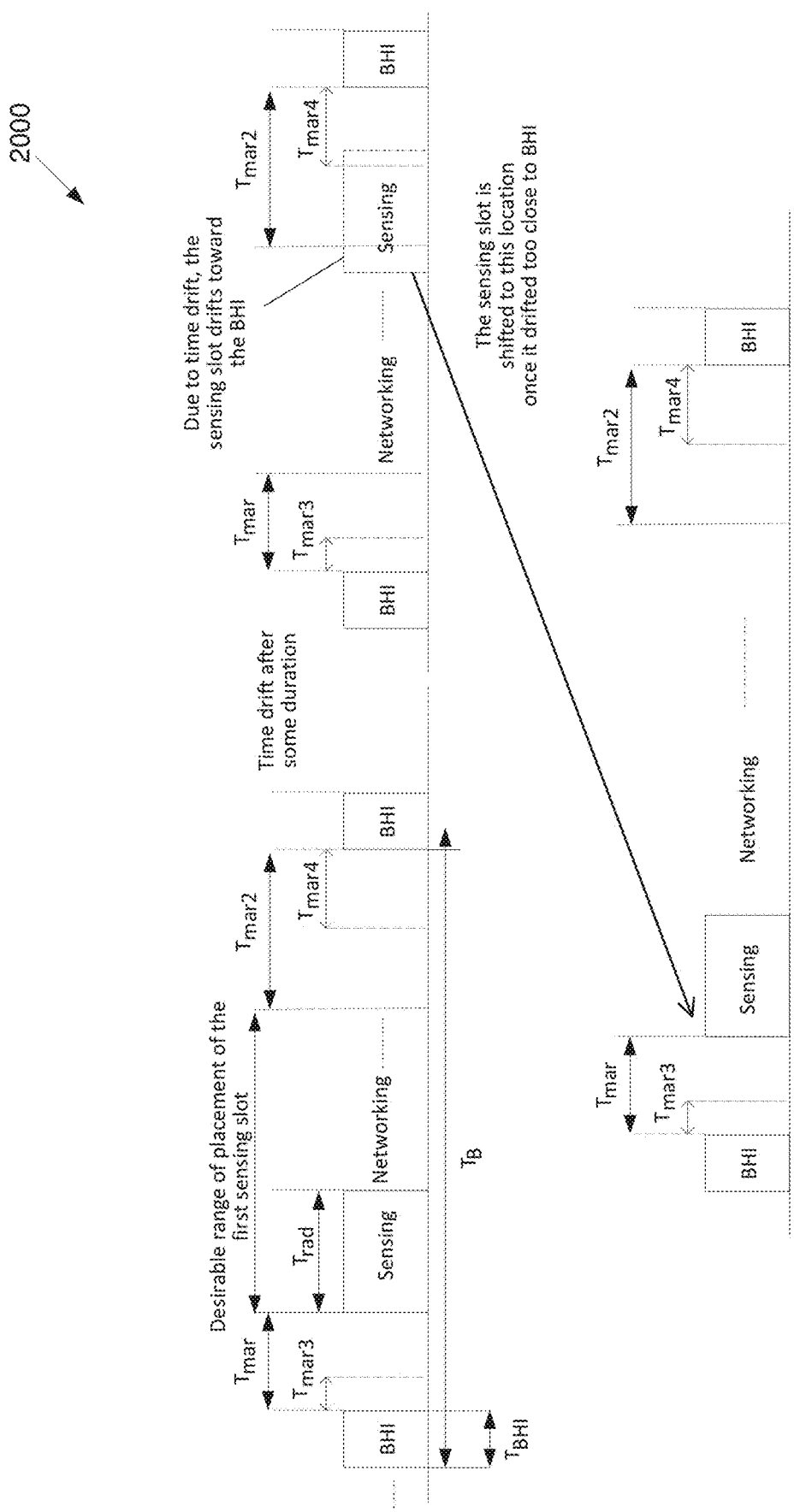
FIG. 20 illustrates another example sensing slot location adjustment according to embodiments of this disclosure.

FIG. 20 illustrates another example sensing slot location adjustment 2000 according to embodiments of this disclosure. An embodiment of the sensing slot location adjustment 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

In one embodiment as illustrated in FIG. 19 and FIG. 20, depending on the direction of the time drift, it is possible to select a replace location for the sensing slot such that the frequency of the adjustment of the sensing slots can be minimized.

As illustrated in FIG. 19 where the sensing slot is drifting to the left, once the sensing slot exceeds the margin $T_{mar3}$, readjustment of the slot may be executed. In this case, since the drift is toward the left, the slot may be set as shown in the bottom part of FIG. 19 near the end of the beacon interval so that the time to the next adjustment can be maximized.

As illustrated in FIG. 20 where the sensing slot is drifting to the right, once the sensing slot exceeds the margin $T_{mar4}$, the readjustment can be done as shown in the bottom part of FIG. 20. Note that $T_{mar4}$ may be set to account not only for the time drift but also for other factors such as the back-off time to avoid overlapping with the next BHI. In the case of FIG. 20, because the drift is toward the right, to maximize the time duration before the next readjustment is needed, the desired slot location is at the beginning of the beacon interval near the BHI.

As illustrated in FIG. 19, a sensing slot location adjustment for case 1 is provided where the time drift is toward the left.

As illustrated in FIG. 20, a sensing slot location adjustment for case 2 is provided where the time drift is toward the right.

In one embodiment, a predefined location could be selected for any adjustment by the system, e.g., adjustment when the time drift exceeds the margins or when the back-off duration is too long and it is no longer possible to fit the sensing slot in the current beacon interval. In this case, regardless of the drift direction, the adjustment procedure may readjust the sensing slot location to some predefined location within the beacon interval, which is placed at $T_{pre}$ from the end of the BHI as shown in FIG. 21 and FIG. 22.

Figure 21:
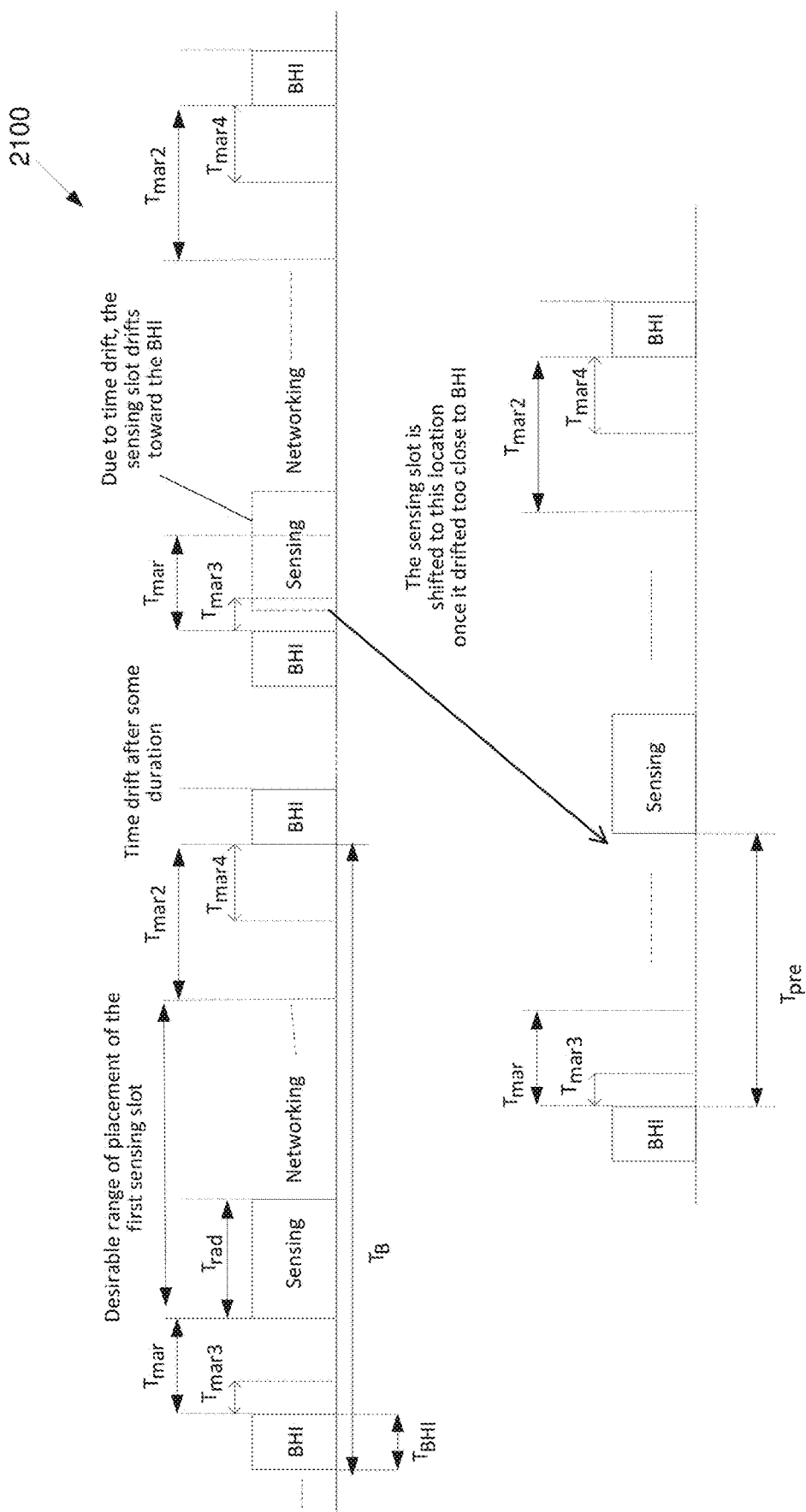
FIG. 21 illustrates yet another example sensing slot location adjustment according to embodiments of this disclosure.

FIG. 21 illustrates yet another example sensing slot location adjustment 2100 according to embodiments of this disclosure. An embodiment of the sensing slot location adjustment 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

Figure 22:
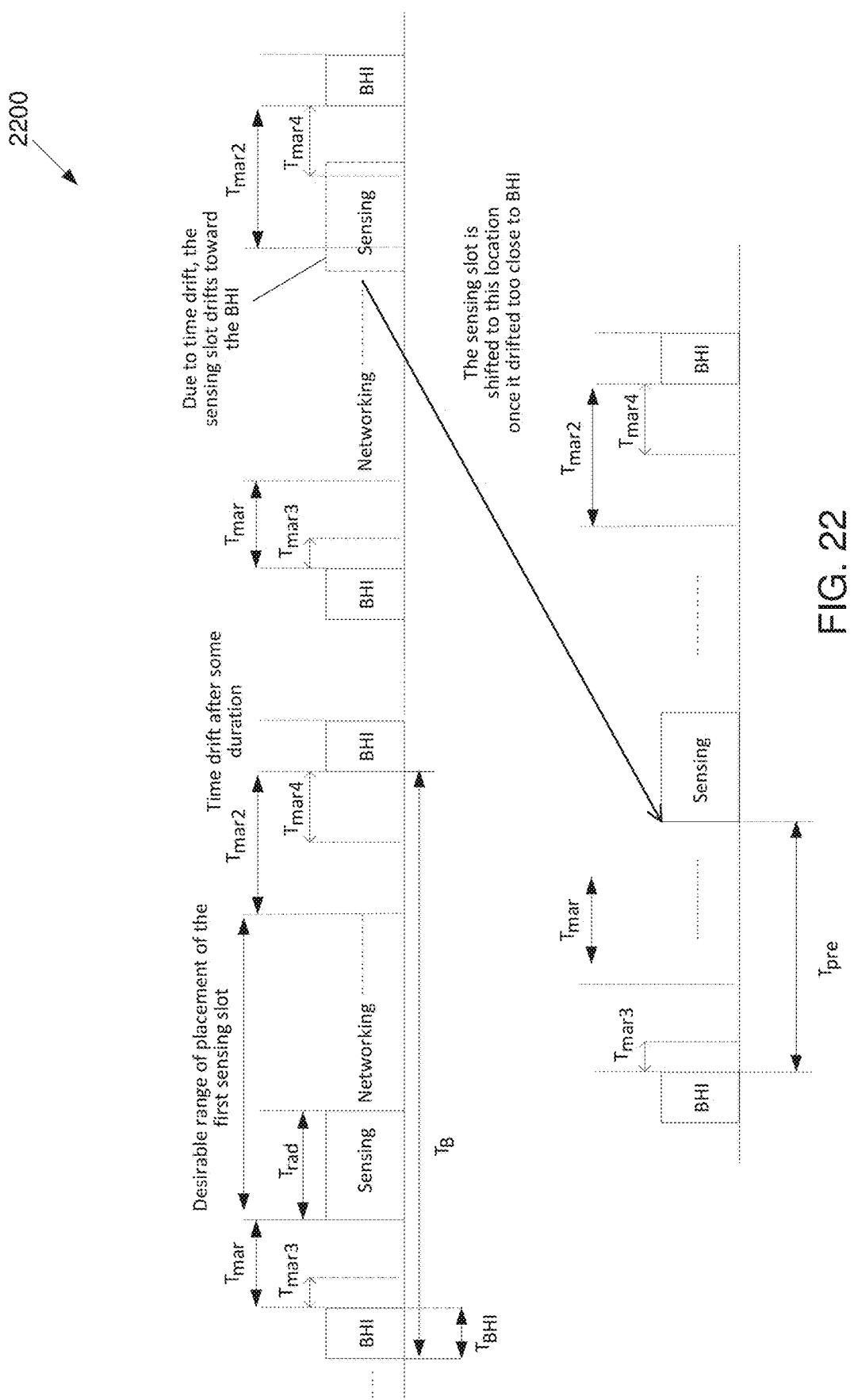
FIG. 22 illustrates yet another example sensing slot location adjustment according to embodiments of this disclosure.

FIG. 22 illustrates yet another example sensing slot location adjustment 2200 according to embodiments of this disclosure. An embodiment of the sensing slot location adjustment 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 21 and FIG. 22, $T_{pre}$ can be selected using different criteria. One example is to set $T_{pre}$ such that the sensing slot starts in the middle of the beacon interval. In another example, $T_{pre}$ could be selected anywhere within some margin $T_{mar5}$ from the end of the BHI and to the start of the next BHI as shown in FIG. 23.

Figure 23:
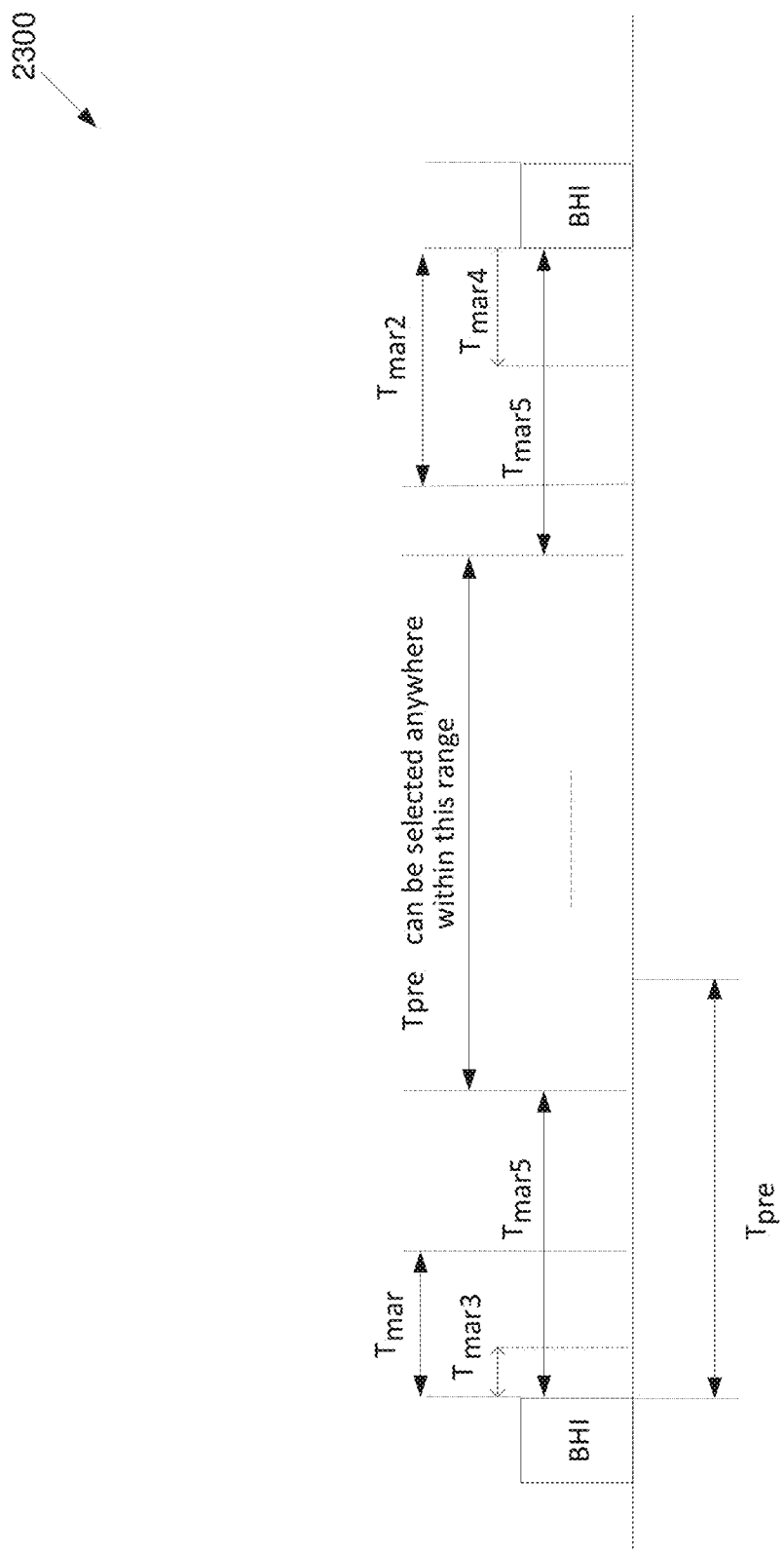
FIG. 23 illustrates an example interval for selecting $T_{pre}$ according to embodiments of this disclosure.

FIG. 23 illustrates an example interval for selecting $T_{pre}$ 2300 according to embodiments of this disclosure. An embodiment of the interval for selecting $T_{pre}$ 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

In one example, $T_{pre}$ can be selected randomly within this interval shown in FIG. 23 when a readjustment is needed. This way, even if two devices need to make adjustment in the same beacon interval, their readjusted sensing location may unlikely overlap. In FIG. 23, $T_{mar5}$ is used for both sides, but different values could also be used if asymmetry for the start and end of the beacon interval is desirable. In the case of sensing frame structure in FIG. 15, once a BHI overlaps with one of the sensing slots or is in the middle of several consecutive sensing slots, the sensing slot timing needs to be adjusted. The new allocated time slots for all the sensing slots in the first beacon interval after adjustment may be in the predefined location in FIG. 21 as well.

As illustrated in FIG. 21, a sensing slot adjustment to a predefined location is provided when the time drift is toward the left.

As illustrated in FIG. 22, a sensing slot adjustment to a predefined location is provided when the time drift is toward the right.

As shown in the aforementioned embodiments and/or examples, the timing structures to enable concurrent networking operation and radar operation are provided. The disclosed designs cover various conditions regarding radar transmission interval, the duration between radar transmission interval (i.e., the sensing slot), and the beacon header transmission (and other time slots used for networking operation) intervals.

As shown in the aforementioned embodiments and/or examples, how to deal with the case is provided where the radar sensing is not the highest priority and there could be interruption from the communication systems. The described methods are designed to approximate the uniform radar sensing as much as possible.

As shown in the aforementioned embodiments and/or examples, the structure of a reconfigurable radar system is provided according to application requirements. The requirements are obtained from both the radar sensing requirements as well as the communication requirements.

As shown in the aforementioned embodiments and/or examples, the radar sensing timing designs are provided under the constraints of typical communication systems where time cannot be allocated in a continuous manner but rather in chucks of a certain duration. Both the case when the radar sensing is prioritized and when concurrent operation in a time-shared manner were described. In addition to the generalized description, several concrete numerical examples were also described.

As shown in the aforementioned embodiments and/or examples, the timing structure of radar pulses (which is a radar transmission under a certain antenna configuration) is provided. The described pulse structure allows the tradeoff between the number of pulse repetitions (e.g., for boosting the radar signal strength) and the number of distinct antenna configurations (e.g., for increasing the angular resolution).

As shown in the aforementioned embodiments and/or examples, deciding where to place the first sensing slot in the beacon interval and adjusting the sensing slot to account for the time drift and other factors affecting the transmission time such as the back-off operation are provided.

For the target detection and tracking in the context of the present disclosure such as gesture and human/pet tracking in a home environment, the following properties are provided.

In one example, the target is the nearest moving object. In such example, this can be easily seen for the tracking of the hand for a gesture recognition problem. In typical use cases, a user would perform some gesture in the vicinity of the radar and this is typically the closest moving object to the radar. There are special cases where there could be some other movement at closer proximity (will be discussed later), it is generally true that the target of interest is the closest moving object. For the human/pet tracking case, it may be seen that this property is true when the human/pet is the only one in the home. It may be noted that while there could be a moving machine (such as a vacuum cleaner robot) inside the home, it may not be desirable to operate the robot while the human/pet is around due to noise or safety concern.

In one example, the maximum speed of the target can be reasonably assumed. In such example, for both the hand gesture and the human/pet inside the home, a certain maximum speed is provided in which the target can move.

In one embodiment, designs exploit the aforementioned properties to provide efficient and robust solutions with low complexity. Main features of the provided solutions include the followings.

In one example, the solution is modular and easily customizable for the various applications.

In one example, since the target is moving, preprocessing for detection can be done with low complexity. This is especially critical for sensors such as radars. By exploiting the Doppler domain, moving targets can be separated from non-moving targets, which greatly simplifies the desired target detection. The fact that only the target can move with higher speeds is also useful for noise floor estimation (used for target detection).

In one example, simple target identification is provided. In such example, the target is identified as the closest moving object, which can be simply identified by checking if the estimated Doppler at the detected target is greater than a threshold.

In one example, simple and robust tracking are provided. The tracking rules are to check consistencies of the detected target in the previous time slot and the current time slot against the maximum speed assumed. Certain details could be customized for different applications. It may be noted that this tracking method is robust since it makes few assumptions. Also, unlike a traditional tracking method (e.g., the Kalman filter) which could require continuous space (e.g., estimated the distance and not just using the delay tap index), the tap index is directly used. Another advantage is that traditional approaches usually require some prior knowledge (e.g., noise covariance and/or transition statistics) and the traditional approaches may also need some ramp-up time for the tracking filter to stabilize.

The requirement on ramp-up time may not work well for short tracking such as for gesture recognition where the number of measurements during the gesture is small. Another main aspect of the tracking solution is that the tracking solution can work with low measurement sampling rate.

For ease of description, an exemplary raw radar measurement timing structure is described based on a pulse compression radar. It may start with an exemplary timing diagram of a radar measurement as shown in FIG. 24.

Figure 24:
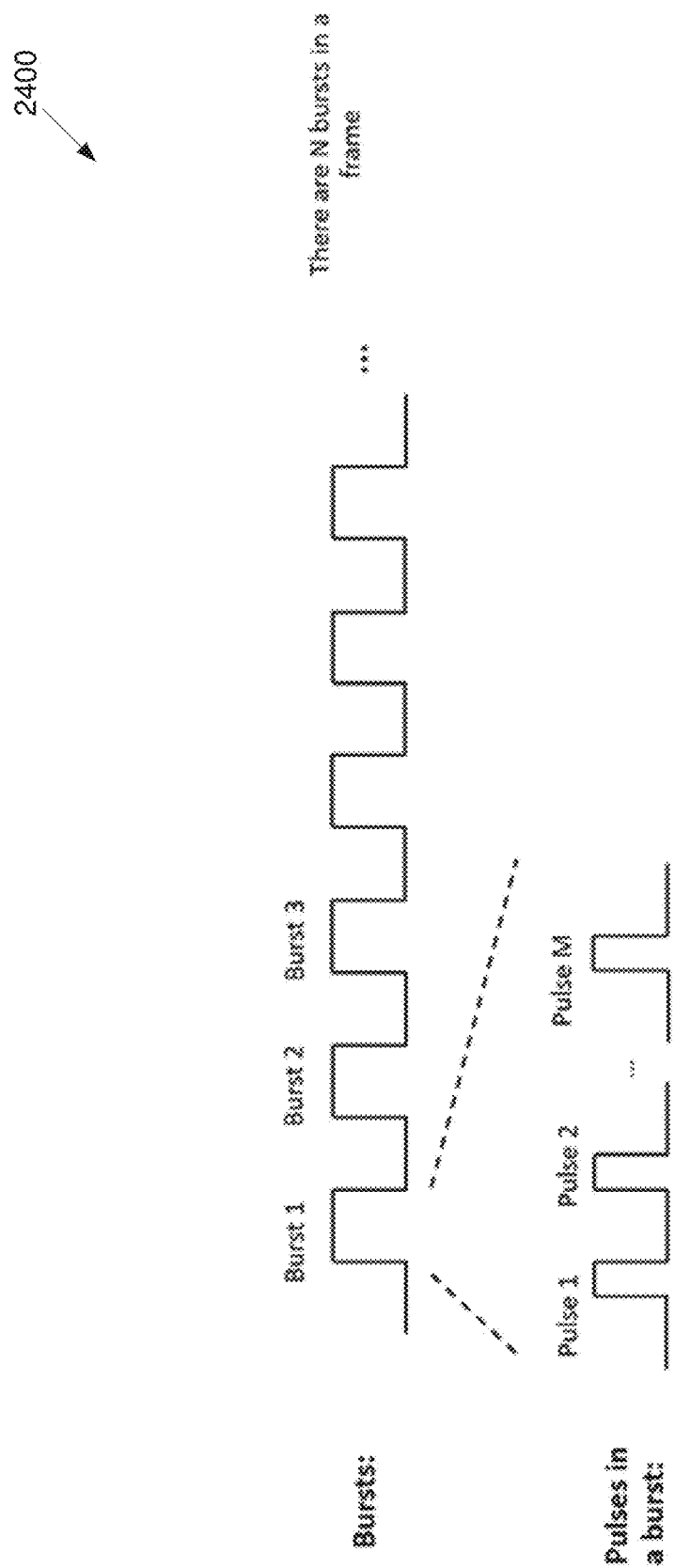
FIG. 24 illustrates an example radar measurement timing diagram according to embodiments of this disclosure.

FIG. 24 illustrates an example radar measurement timing diagram 2400 according to embodiments of this disclosure. An embodiment of the radar measurement timing diagram 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

Time is divided into frames. In the present disclosure, a frame and a time slot are interchangeably used. A frame is further divided into bursts. Several short pulses are transmitted by the radar transmitter in each burst. Each pulse and/or burst may have a different transmit/receive antenna configuration, that is the active set of antenna elements and corresponding beamforming weights. As a more specific example, each of the M pulses in a burst may have a different transmit and receive antenna pair that allows a spatial scan of the environment (e.g., using beamforming), and each of the N bursts may all repeat the same pulses.

In one example, N burst may include all M pulses using the same antenna configuration which could help boost the signal strength by averaging the M pulses, and the N bursts may all repeat the same pulses. In both these examples, the burst domain is typically referred to as the slow time domain in the radar literature. The burst or slow time domain captures the temporal variation of the radar signals, which can be processed to obtain Doppler (or speed) information. Note that while uniform spacing between pulses and bursts is used in the illustration in FIG. 24, this is not necessary and any choices of the spacing can be used.

An exemplary radar measurement may be a 3-dimensional complex impulse response (CIR) matrix. The first dimension may correspond to the burst index, the second dimension may correspond to the pulse index and the third dimension may correspond to the delay tap index (which can be translated to the measurement of range or equivalently the time of flight of the received signal). Note that the above specifications of the timing diagram and nature of the input radar measurement from the baseband radar module to the processor are not necessary assumptions for the ideas of this disclosure but are provided for simple explanation of some of the exemplary procedures that follow.

Figure 25:
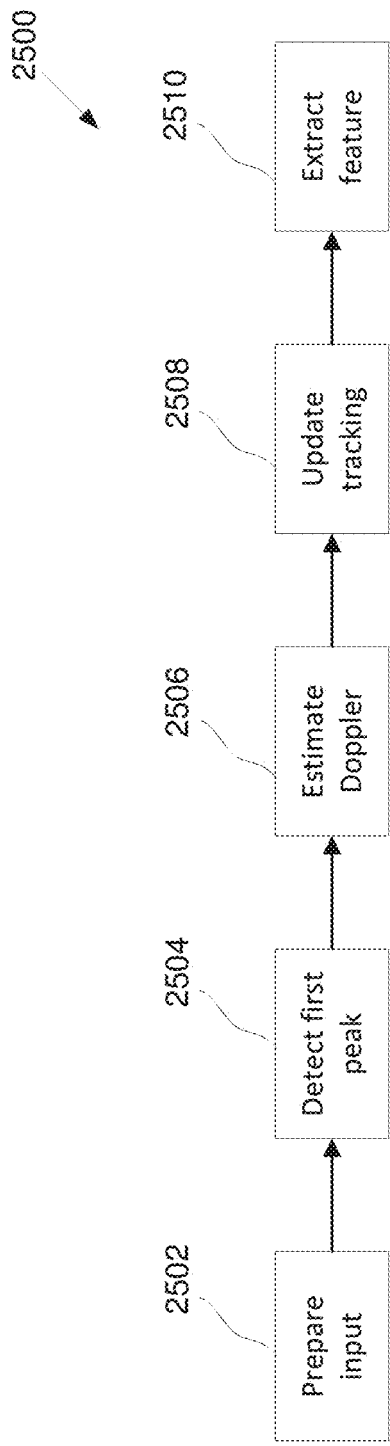
FIG. 25 illustrates an example general structure to detect moving target according to embodiments of this disclosure.

FIG. 25 illustrates an example general structure 2500 to detect moving target according to embodiments of this disclosure. An embodiment of the general structure 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

In one embodiment, the solution can be broken down into five components as shown in FIG. 25. First, the raw radar measurements are preprocessed to produce a suitable input form for further processing at step 2502. The main purpose of this step is to transform the radar measurements into an appropriate format, getting rid of undesired artifact (e.g., due to hardware imperfection) and canceling the background/clutter. The second step at step 2504 is to detect the target, which comes down to detecting the first peak by the property that the desired target is generally the closest moving target. Once the target location is detected, the speed (i.e., Doppler) of the target is estimated at step 2506. The fourth step, update tracking, uses both the first peak detection result and the Doppler estimate. It determines when to start tracking (i.e., that a valid target has been detected), perform an update on the tracking (if a valid target is already identified) at step 2508, and decides when to stop tracking (i.e., the tracked target has disappeared). At the end of step 4 (e.g., step 2508), the target location has been detected and tracked. Depending on the application, the tracked location and/or speed may be used to extract information from the radar measurements at step 2510.

It may describe more detailed solutions of each of the steps briefly described above in the context of extracting features from radar measurements for a gesture recognition application. In this embodiment, the case, where the user performs some hand gesture in the vicinity of the radar, is provided. As mentioned earlier for typical use cases, it can be expected that the hand may be the closest moving target to the radar.

Figure 26:
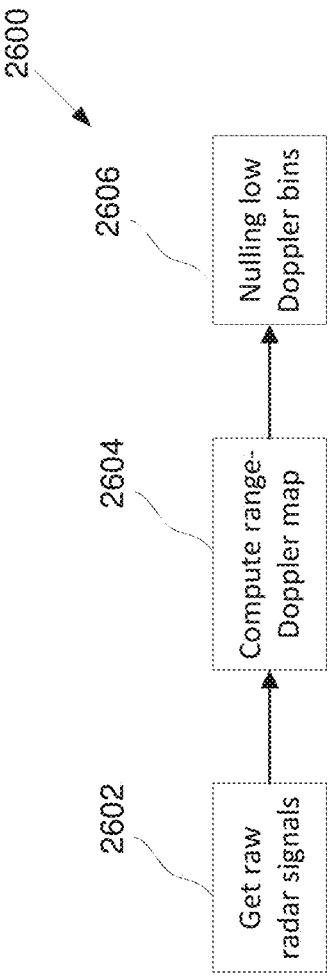
FIG. 26 illustrates an example radar measurement to prepare input for the gesture recognition application according to embodiments of this disclosure.

FIG. 26 illustrates an example radar measurement 2600 to prepare input for the gesture recognition application according to embodiments of this disclosure. An embodiment of the radar measurement 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

The details of Step 1 (as illustrated in FIG. 25) is shown in FIG. 26. First, the raw radar signals at the appropriate range are obtained. The appropriate range may depend on the applications. E.g., the maximum distance allowed could be set to be 50 cm or less for a gesture recognition on a mobile device. Another aspect to consider is the very close range. Depending on the hardware, there could be significant power in the direct link between the radar transmitter and receiver. The direct link signal is typically strong and could cause misdetection. Thus, one approach is to ignore very close-range signals near the radar. It is noted that, depending on the radar types, the selection of the appropriate range can be at the very beginning or other locations in the processing chain. E.g., for a pulse compression radar, the range corresponds to the delay tap indices and thus, the selection can be done at the raw radar signal level.

Note that this can be more desirable than doing the selection later on, as it saves some computation by reducing a number of signals to be processed at an early stage. Once, the raw radar signals are obtained, the raw radar signals are shaped into an appropriate shape and are used to compute a range Doppler map. E.g., referring back to FIG. 24, considering an example where the radar transmits M pulses using the same antenna configuration within a burst, and all the N bursts within the radar frame repeat the same pulses. In this case, first the 3D CIR may first be averaged along the pulse domain to obtain a 2D measurements matrix, where one dimension is the delay tap index and the other corresponds to the burst or slow time domain.

A range Doppler map is obtained by computing the Fourier transform (e.g., using the Fast Fourier Transform, FFT, algorithm) along the slow time domain of the radar signal. The range Doppler map is a rendering of the raw radar signals into a 2D map with the distance to the radar (range) in one dimension and the speed (Doppler) in the other dimension. In the application here, most of the background reflections (everything else beside the hand) can be expected to have low Doppler. Thus, one simple way to get rid of all these background signals is to null out low Doppler bins (e.g., the zero Doppler bin or, the zero Doppler bin and ±1 Doppler bins) in the range Doppler map.

It is noted that the Doppler interval to be nulled out depends on a few factors including the environment and whether a window function is applied when computing the FFT. The output from this step is the range Doppler map after removing the background reflections (i.e., those with low Doppler).

As illustrated in FIG. 26, Step 1 processes radar measurements to prepare input for the gesture recognition application.

In one embodiment of Step 1, it is implicitly assumed that there is no significant artifact due to imperfection of the hardware that needs to be compensated for to provide satisfactory performance. In reality such an artifact is not uncommon. E.g., it could happen that the RF (radio frequency) circuit experiences significant changes in the temperature during the radar transmission frame. Because the circuit response may change due to temperature changes, this can cause a periodic change in the radar signals. If not compensated, such a periodic change may cause a static object (e.g., the background) to appear as if the static object possesses some non-zero Doppler when computing the FFT. If not compensated, such artifacts could make false detection more likely.

Figure 27A:
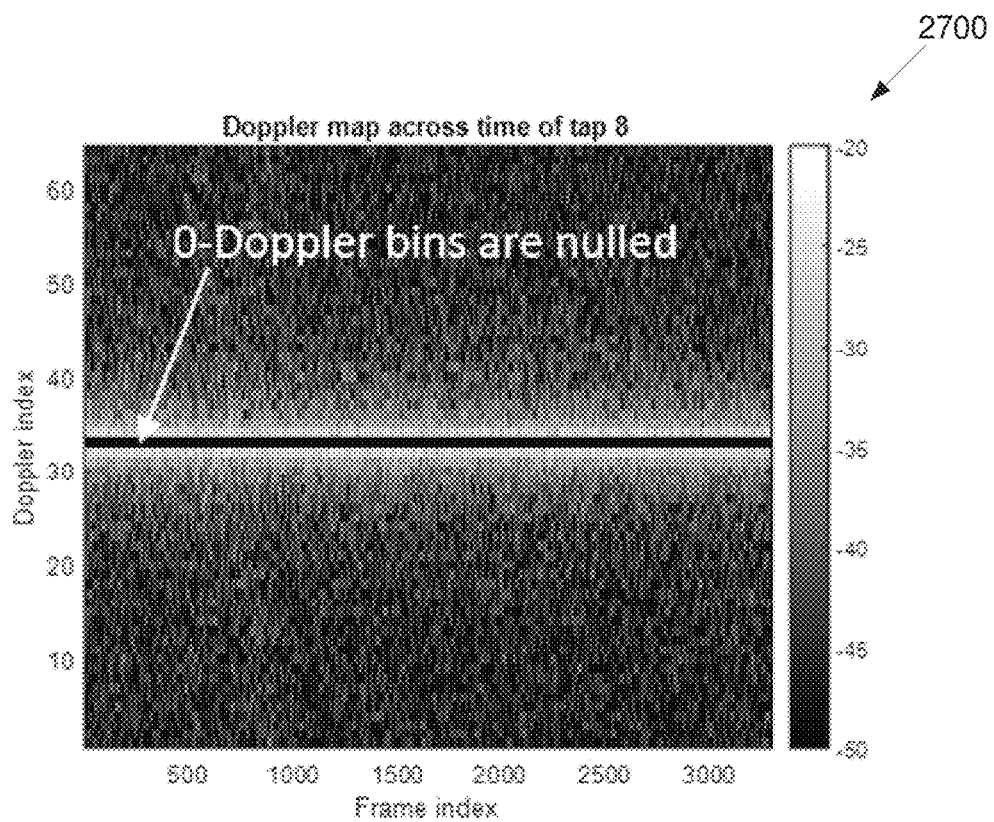
FIG. 27A illustrates an example measurement result of Doppler maps according to embodiments of this disclosure.

FIG. 27A illustrates an example measurement result of Doppler maps 2700 according to embodiments of this disclosure. An embodiment of the measurement result of Doppler maps 2700 shown in FIG. 27A is for illustration only. One or more of the components illustrated in FIG. 27A can be implemented in specialized circuitry configured to perform the noted functions or one or more of the components can be implemented by one or more processors executing instructions to perform the noted functions. Other embodiments are used without departing from the scope of the present disclosure.

Figure 27B:
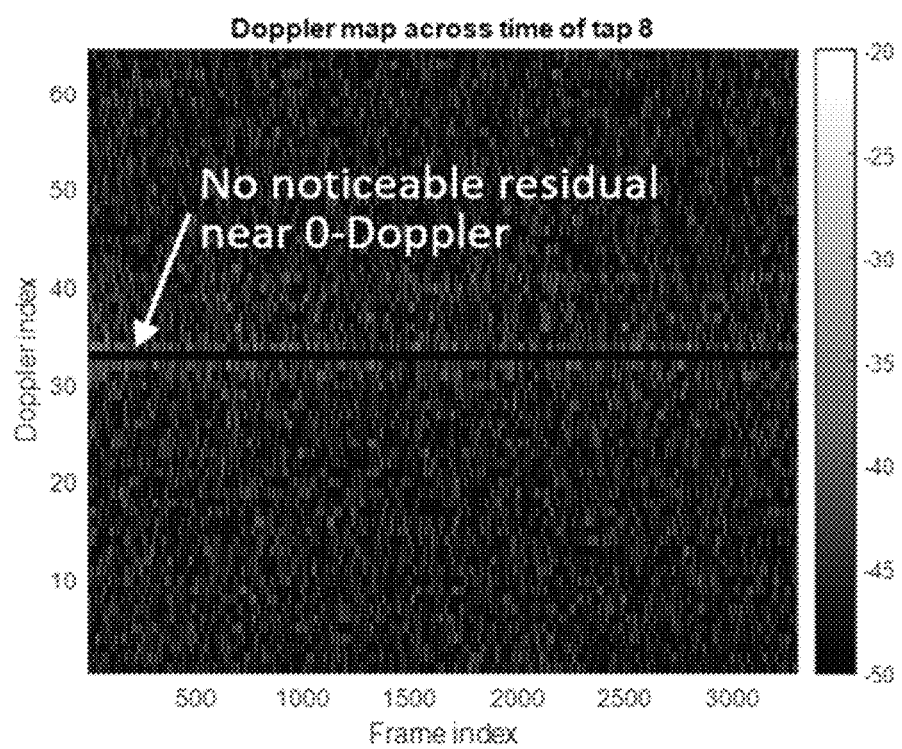
FIG. 27B illustrates another example measurement result of Doppler maps according to embodiments of this disclosure.

FIG. 27B illustrates an example measurement result of Doppler maps 2750 according to embodiments of this disclosure. An embodiment of the measurement result of Doppler maps 2750 shown in FIG. 27B is for illustration only. One or more of the components illustrated in FIG. 27B can be implemented in specialized circuitry configured to perform the noted functions or one or more of the components can be implemented by one or more processors executing instructions to perform the noted functions. Other embodiments are used without departing from the scope of the present disclosure.

FIG. 27A and FIG. 27B illustrate an example measurement of a static environment with and without applying a periodic compensation (after nulling out the 0-Doppler bins). The plots show the energy (encoded in the color map in unit of dB) in the Doppler domain for a given delay tap across time in the horizontal axis. It may be seen that without the compensation, even if there is no moving object in the environment, there is a strong energy response near the 0-Doppler bin. When applying the periodic compensation, such artifacts can be mitigated resulting in a clean Doppler map with just noise after removing the 0-Doppler. A modified embodiment is shown in FIG. 28, where a signal artifact compensation block is inserted before computing the range Doppler map.

Figure 28:
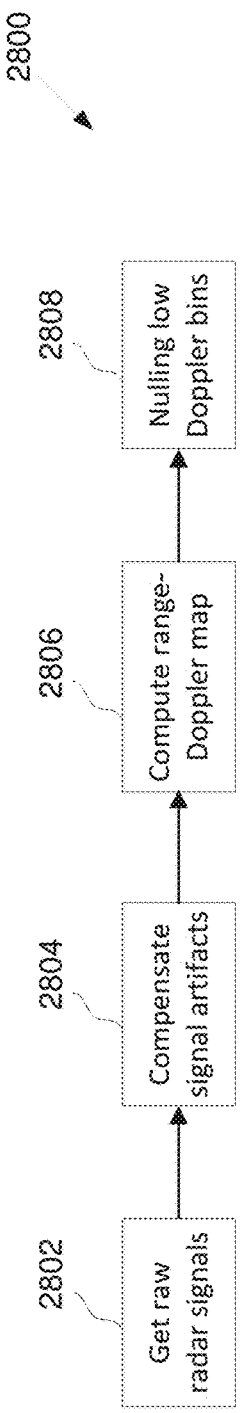
FIG. 28 illustrates an example processing with signal artifact compensation according to embodiments of this disclosure.

FIG. 28 illustrates an example processing with signal artifact compensation 2800 according to embodiments of this disclosure. An embodiment of the processing with signal artifact compensation 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 27A and FIG. 27B, measurement results of Doppler maps at a given delay tap (i.e., at a given range) with and without applying periodic compensation are provided. FIG. 27A illustrates a measurement result without compensation and FIG. 27B illustrates a measurement result when a periodic compensation is applied.

As illustrated in FIG. 28, Step 1 processing with signal artifact compensation block is provided to mitigate the impact of hardware imperfection.

As illustrated in FIG. 28, in step 2802, an electronic device (as illustrated in FIG. 1 and FIG. 4) gets raw radar signal. In step 2804, the electronic device compensates the signal artifacts. In step 2806, the range-Doppler map is computed. In step 2808, the electronic device nulls low Doppler bins.

In one embodiment, compensating a periodic variation behavior, which may be caused by temperature change during the radar transmission frame for example, is provided. Because such a periodic variation is due to the device's response changes, the periodic variation affects the CIR for all delay taps. Thus, one way to compensate for the periodic variation is to use one delay tap to estimate the variation (e.g., a compensation coefficient), and then use the periodic variation to compensate for all other delay taps. Note that the variation considered in the present disclosure is the variation in the burst or slow time domain, and thus the compensation coefficients are computed for each burst.

For such applications such as a gesture recognition one, in typical use cases, the moving target (the user's hand) can be expected not to be too close to the radar. This means that the shortest path corresponding to the direct link between the transmitter and receiver (e.g., the leakage), may not be influenced by the moving target. Thus, the leakage tap is a good candidate for estimating the compensation coefficient. However, care must be taken to avoid incorrect compensation when, e.g., the moving target is too close to the radar and the leakage is affected by that target. Fortunately, such periodic variation follows similar patterns for each radar transmission frame, and thus the typical level of variation can be known from previous measurements or experience.

For example, the compensation coefficients over 64 bursts can vary less than 1 dB in amplitude and less than 10 deg. in phase in the tested embodiment. Therefore, in this case if the compensation coefficients changes by more than these normal levels of variations, it can be considered abnormal and the compensation is likely not correct. Another consideration is to avoid saturation cases where the signal becomes too strong, and the non-linearity may cause the compensation coefficient to not work properly. With all these considerations, an example embodiment for the compensation is shown in FIG. 29.

Figure 29:
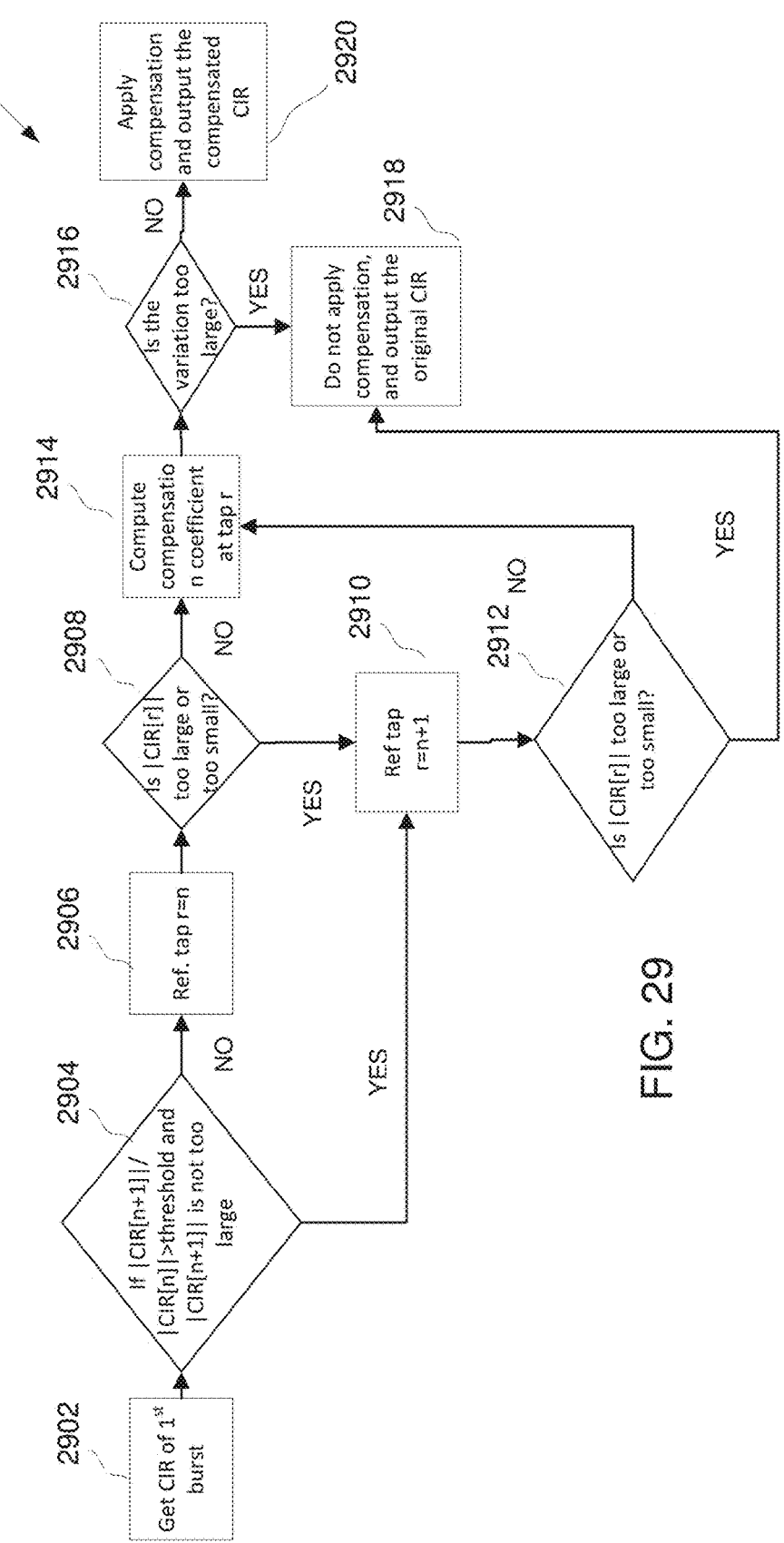
FIG. 29 illustrates a flow chart of a method for compensating for periodic variation according to embodiments of this disclosure.

FIG. 29 illustrates a flow chart of a method 2900 for compensating for periodic variation according to embodiments of this disclosure. An embodiment of the method 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 29, first the CIR of the first burst is checked to compare the amplitude of the leakage tap and an adjacent tap. The purpose is to use the tap with largest signal strength (but not too large that may cause saturation) so that the compensation coefficient estimation is accurate (i.e., less affected by noise). The leakage tap index is denoted by n. If the CIR amplitude at tap n+1, |CIR[n+1]|, is larger than the leakage tap amplitude, |CIR[n]| by some threshold (e.g., could be set to 3 dB), and that |CIR[n+1]| is not too large, then the reference tap for computing the compensation coefficient is set to n+1.

Otherwise, the leakage tap index n is used as the reference tap. Next, the CIR amplitude at the reference tap is checked to avoid too large or too small case. If it is not, then the compensation coefficients are computed, and their range of variation across all the bursts is verified. If the variation does not exceed the threshold, the compensation may be applied and the compensated CIR may be output. Otherwise, the compensation is likely not correct and thus it is not applied and the original CIR without compensation may be output.

As illustrated in FIG. 29, compensating for periodic variation is provided in the CIR due to temperature changes during the radar transmission for example. We denote n the leakage tap index.

As illustrated in FIG. 29, an electronic device in step 2902 gets CIR of $1^{st}$ burst. In step 2904, the electronic device determines whether a condition is met. In step 2904, if the condition is met, the electronic device performs step 2910. In step 2910, the electronic device identifies Ref. tap r=n+1. In step 2912, the electronic device determines a condition is met. If the condition is met in step 2912, the electronic device performs step 2918. In step 2918, the electronic device does not apply compensation and output the original CIR. In step 2904, if the condition is not met, the electronic device performs step 2906. In step 2906, the electronic device identifies Ref. tap r=n. In step 2908, the electronic device determines a condition is met. In step 2908, the condition is met, the electronic device performs step 2910. In step 2908, the condition is not met, the electronic device performs step 2914. In step 2914, the electronic device computes compensation coefficient at tap r and performs step 2916. In step 2916, the electronic device determines whether the variation is too large. In step 2916, if the condition is met, the electronic device performs step 2918. In step 2916, if the condition is not met, the electronic device performs step 2920. In step 2920, the electronic device applies compensation and output the compensated CIR. In step 2912, if the condition is not met, the electronic device performs step 2914.

In one example, how to estimate the compensation coefficients is provided once the reference tap has been decided and how to apply them. Assume the number of bursts to be N, and denote $CIR_b[r]$ the CIR of the b-th burst at the reference tap r. Then, the compensation coefficient for the b-th burst can be estimated as $$\alpha_b = \frac{CIR_1[r]}{CIR_b[r]}$$

for all b =1,2, . . . , N.

That is, here the first burst is used as the anchor. This is just an example, any other anchor position maybe used such as the middle burst at index [N/2] for example. Once, $\alpha_b$ is obtained, the application of the compensation is simply by multiplication with $\alpha_b$. In particular, to apply the compensation to the CIR at tap n, the following formula is used as given by $CIR_{comp,b}[n]=\alpha_b CIR_b[n]$, where $CIR_{comp,b}[n]$ denote the compensated CIR of the b-th burst at tap n. This compensation is applied to all taps of interest.

Figure 30:
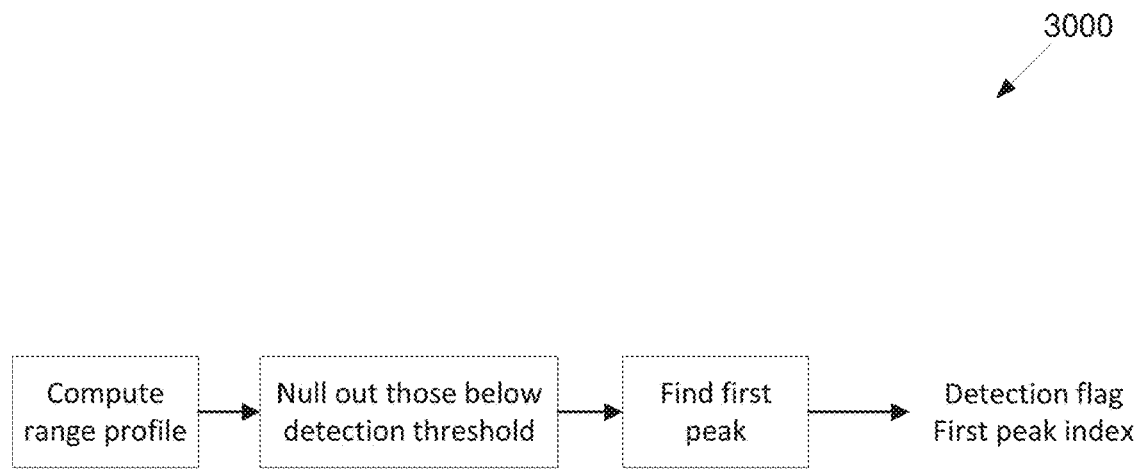
FIG. 30 illustrates an example detecting the first non-noise peak according to embodiments of this disclosure.

FIG. 30 illustrates an example detecting the first non-noise peak 3000 according to embodiments of this disclosure. An embodiment of the detecting the first non-noise peak 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 30, the processing in Step 2 (e.g., 2504 as illustrated in FIG. 25) is illustrated. While it is also possible to detect the target directly in the 2D range Doppler map from Step 1 (e.g., 2502 as illustrated in FIG. 25), a detection is conducted using the 1D signal (e.g., a range profile) to reduce the complexity. The range profile is obtained by computing the average of the 2D range Doppler map along the Doppler domain so that a 1D signal may be obtained in the range Domain.

To perform the detection, an adaptive detection threshold is used. The detection threshold is determined based on the estimated noise floor. There are different approaches to estimate the noise floor, for example it can be computed using the median in the range Doppler map. This approach can be effective when most of the bins in the range Doppler map are noise bins and only a small fraction of all bins contains signals.

Figure 31:
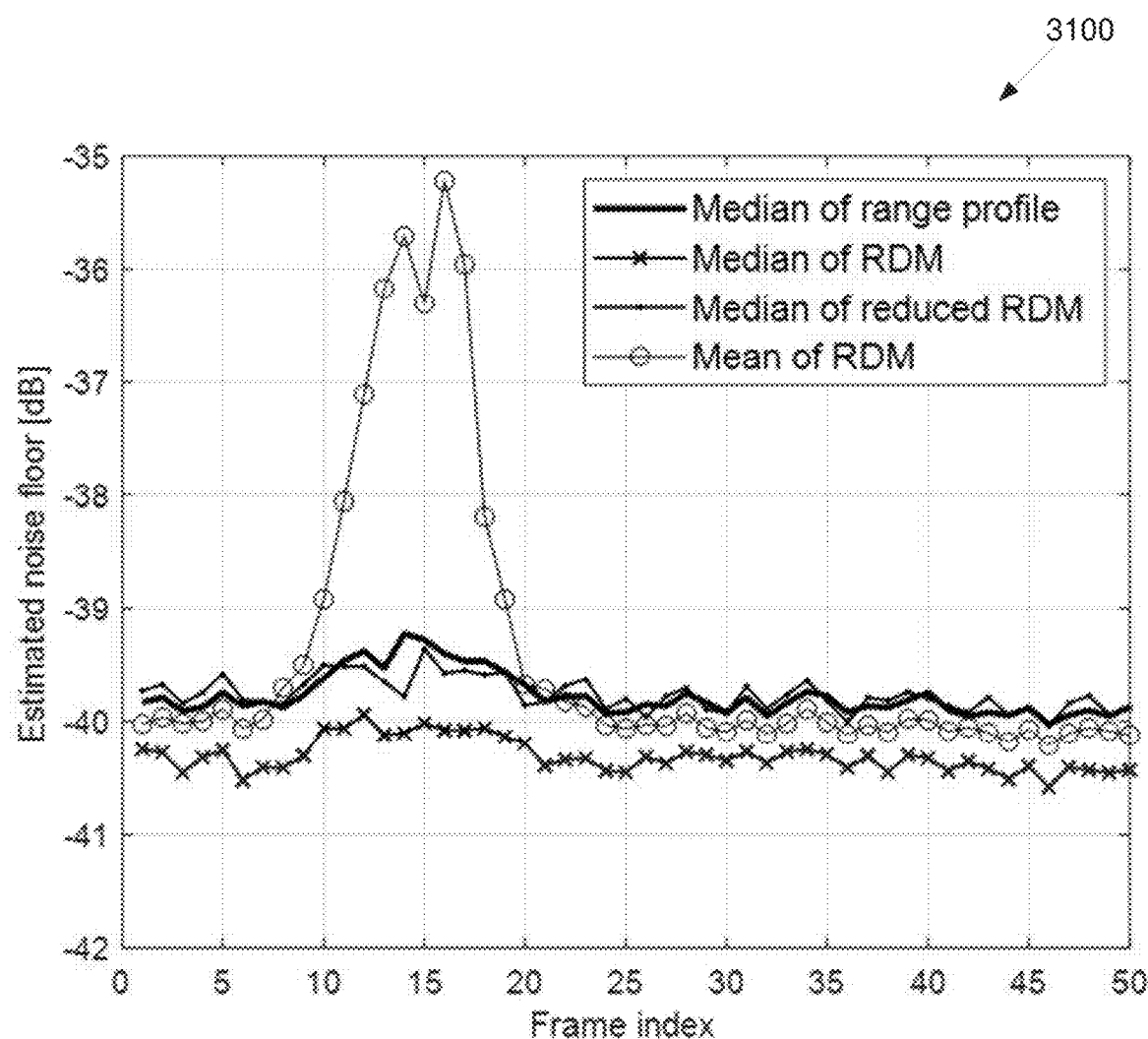
FIG. 31 illustrates an example noise floor estimation according to embodiments of this disclosure.

FIG. 31 illustrates an example noise floor estimation 3100 according to embodiments of this disclosure. An embodiment of the noise floor estimation 3100 shown in FIG. 31 is for illustration only. One or more of the components illustrated in FIG. 31 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 31, the gesture was in progress starting from around frame index 7 to around frame index 20. It can be seen that estimation method using the mean shows large fluctuations in the estimated value during the gesture, while the method based on the median is very stable. Thus, using a mean operation to estimate the energy would require separation between the contributions from the desired target and the noise. By computing the median, the observed property is exploited where most bins in the range Doppler map are noise, and it is possible to estimate the noise floor without the need to explicitly separate the desired target from the noise.

It may be further noted that the noise estimation complexity can further be reduced. One approach is to reduce the dimension of the range Doppler map by, for example, grouping multiple bins together and replacing them by their average.

Figure 32:
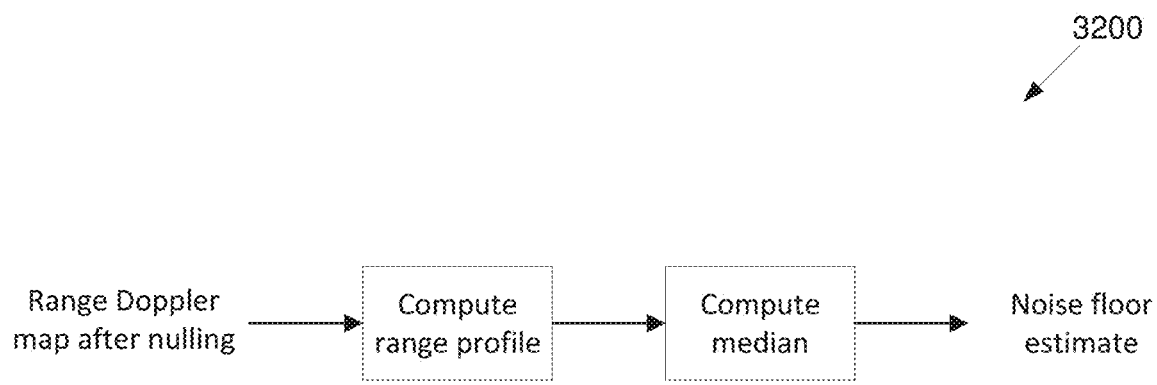
FIG. 32 illustrates an example low complexity noise floor estimation according to embodiments of this disclosure.

Another approach is by computing the median on the range profile (1D signal) instead of the range Doppler map as shown in FIG. 32.

FIG. 32 illustrates an example low complexity noise floor estimation 3200 according to embodiments of this disclosure. An embodiment of the low complexity noise floor estimation 3200 shown in FIG. 32 is for illustration only. One or more of the components illustrated in FIG. 32 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 31, taking the median in the 1D range profile provides very close estimates as when computing the median on the range Doppler map directly, with the exception of a slight bias (less than 0.5 dB). For the purpose of the detection, the bias can be incorporated in the detection threshold and thus this bias presents no limitation to the application. We observed empirically that using the range profile works well with enough number of range taps (e.g., around 20 or more).

Once the noise floor is known, the detection threshold can be selected based on the desired false detection rate. One way to do this is to set the threshold to be a certain number of standard deviations of the noise from the noise floor. Note that when assuming each bin in the range Doppler map to be Chi-squared distributed (i.e., assuming the noise is complex Gaussian), it can be shown that the standard deviation of the noise floor is just the noise floor scaled by the square root of the number of Doppler bins (or FFT size). Thus, having the noise floor estimate provides complete information for deciding the threshold for a desired misdetection/false detection tradeoff.

To use the threshold to detect the first peak, null out firstly taps in the range profile that are below the threshold, and then the first peak is found on the remaining range profile taps. Any search method can be used. E.g., one way is to just compute the difference between tap t and tap t−1. The first peak may be the first negative difference. Note for those taps that are nulled, the taps can be set to some small value and thus the difference of two consecutive noise taps may be 0. The output from this step contains 2 pieces of information: one is the detection flag (i.e., if a non-noise peak was detected in the range profile) and the index of the detected first peak.

As illustrated in FIG. 30, Step 2 (e.g., 2504 as illustrated in FIG. 25) detects the first non-noise peak, which is a candidate target (i.e., the hand in this case).

FIG. 31 illustrates an example of noise floor estimation using the median. RDM stands for range Doppler map.

FIG. 32 illustrates low complexity noise floor estimation by finding the median of the range profile.

The next step is to estimate the Doppler of the detected first peak. A simple method to do this is to estimate the Doppler as the Doppler index of the bin with the higher power in the range Doppler map at the detected first peak tap index as shown in FIG. 33.

Figure 33:
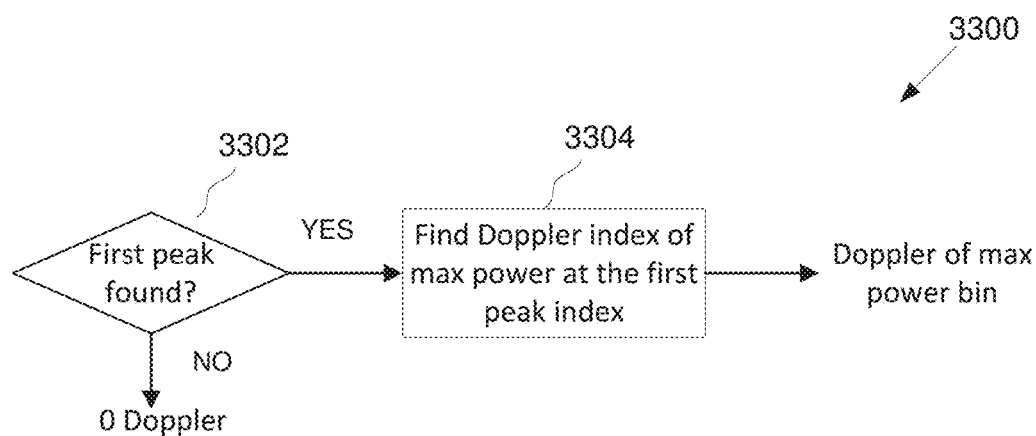
FIG. 33 illustrates an example estimating the Doppler of the detected peak according to embodiments of this disclosure.

FIG. 33 illustrates an example estimating the Doppler of the detected peak 3300 according to embodiments of this disclosure. An embodiment of the estimating the Doppler of the detected peak 3300 shown in FIG. 33 is for illustration only. One or more of the components illustrated in FIG. 33 can be implemented in specialized circuitry configured to perform the noted functions or one or more of the components can be implemented by one or more processors executing instructions to perform the noted functions. Other embodiments are used without departing from the scope of the present disclosure.

Other variations could also be used. E.g., instead of the max power bin, one can find the maximum Doppler (in absolute value) for all non-noise bin, where non-noise can be determined by comparing with a threshold based on the noise floor. Yet, other variations can allow Doppler estimate to use not just the tap corresponding to the detected first peak, but also use adjacent taps (e.g., n taps before and m taps after the detected peak).

As illustrated in FIG. 33, an electronic device determines whether find a first peak in step 3302. In step 3302, if found, the electronic device performs step 3304. In step 3304, the electronic device finds Doppler index of max power at the detected first peak index. In step 3302, if not found, the electronic device identifies zero Doppler.

Figure 34:
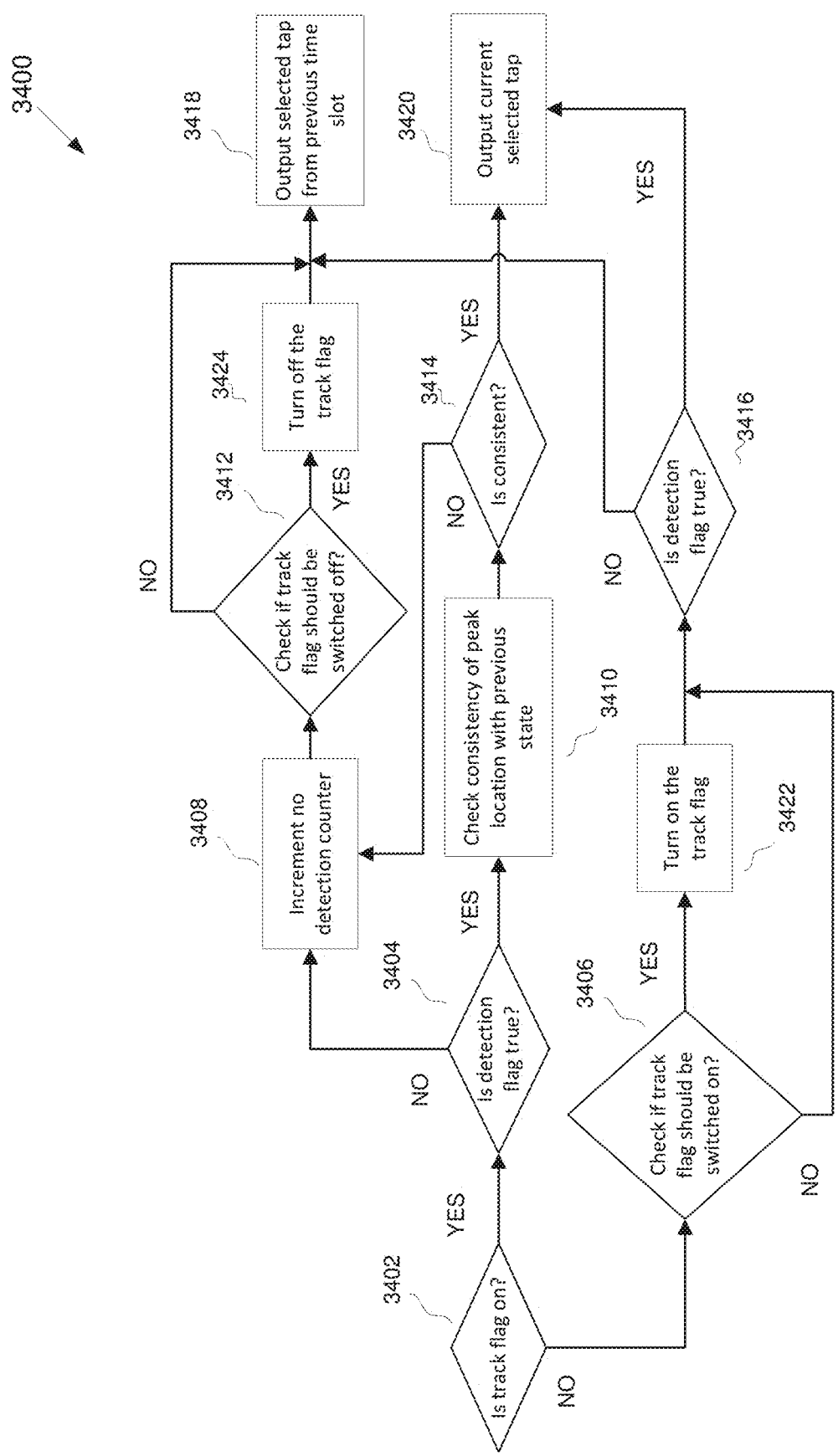
FIG. 34 illustrates a flow chart of a method for updating the tracking state according to embodiments of this disclosure.

FIG. 34 illustrates a flow chart of a method 3400 for updating the tracking state according to embodiments of this disclosure. An embodiment of the method 3400 shown in FIG. 34 is for illustration only. One or more of the components illustrated in FIG. 34 can be implemented in specialized circuitry configured to perform the noted functions or one or more of the components can be implemented by one or more processors executing instructions to perform the noted functions. Other embodiments are used without departing from the scope of the present disclosure.

After detecting the peak and estimating the Doppler, the procedure may update the tracking status as shown in FIG. 34. The tracking step may use both the current detection result (including the detection flag, the detected tap, and the Doppler) and the tracking state that the tracking procedure maintains. In this example, the tracking state includes the track flag, the counter for no-detection, and the previous detected tap. The track flag is used to signify if a valid target has been detected and tracked. The counter of no-detection counts the number of consecutive frames (or time slots) where the tracked target was not detected.

In the whole procedure, it may be assumed that both the current detection result and the previous state are accessible by all blocks. The first step is to check if the track flag is on or not. If not, it means there was no target being tracked at the moment, and there is no need to apply the tracking. In this case, the procedure may check if the current detection result is a valid target that may be tracked. For the application of gesture recognition, one simple criterion is to check if the detected tap shows a large enough energy and the estimated Doppler is larger than some threshold.

It is noted that the detection threshold could be the same as the one used for detecting the first peak (in which case the detection flag can just be used), or it could be set to a larger threshold. The reason is that it may be desirable to put a stricter criterion here to avoid tracking a false target. If it is determined that the track flag may be on, the flag may be updated and the procedure outputs the currently selected tap. If not, the procedure would output the detected first peak if the detection flag is true, otherwise the tap selected in the previous time slot or a random tap or some default dummy value (such as −1) could be output. If the track flag is on in step 3402, the electronic device could then check if the detection flag is true or not in step 3404. If the flag is false in step 3404, it means that the target being tracked was not detected in the current time slot or frame. In this case, the procedure, as performed by the electronic device, may increment the counter of the no-detection slots in step 3408, then check if the track flag may be turned off in step 3412. In step 3412, if yes, the procedure performs step 3424. In step 3424, the procedure turns off the track flag. And then the electronic device performs step 3418. In step 3418 the electronic device outputs selected tap from previous time slot. In step 3412, if no, the procedure performs step 3418.

One simple condition to determine if the track flag should be turned off is to check if the no-detection counter is larger than some value. If it determines that the track flag may be off in step 3412, the track flag can be updated and the no-detection counter can be reset, otherwise it may maintain the same on-state. In this case, the procedure could output the tap selected in the previous time slot. If the track flag is on in step 3404, the procedure could check the consistency with the detection state of the previous time slot in step 3410. That is, the goal is to determine if the currently detected target is the same target that is being tracked. One simple rule is to check against the maximum speed considering the location of the target in the previous slot. This comes down to simply checking the difference in the tap index of the previous and current detected tap indices. If the absolute difference is larger than some threshold, the procedure may declare inconsistency and the procedure follows the same steps as in the case when the detection flag is false. If it is consistent in step 3414, then this is likely the tracked target and the procedure may reset the no detection flag and output the currently selected tap in step 3420.

In step 3402, if the track flag is not on, the procedure, as may be performed by the electronic device, checks if the track flag may be switched on in step 3406. In step 3406, if yes, the procedure performs step 3422. In step 3422, the procedure turns on the track flag. And then the procedure performs step 3416. In step 3416, if the detection flag is true, the procedures performs step 3420. In step 3416, if the detection flag is not true (e.g., false), the procedures performs step 3418. In step 3406, if no, the procedure performs step 3416.

FIG. 34 illustrates that Step 4 (e.g., 2508 as illustrated in FIG. 25) updates the tracking state of the target and makes the final selection of the target tap.

Note that it is implicitly assumed that the consistency rule applies equally to both directions of the displacement (toward or away from the radar) between frames. The symmetry, however, is not always desirable. For example, as described earlier, the desired target tends to be the closest moving object to the radar. This would give us more confidence in the detection closer to the radar to be the desired target than one that is far away. As such, it may be desirable to apply a less strict rule on the consistency for jumping toward the radar than the jump away from the radar.

For a more concrete example when this is helpful, consider a case where there is a person walking by close to the user who is about to perform a gesture. Initially, the walking-by person may be detected, but when the user starts the gesture, the user's hand becomes the closest moving target. By introducing this asymmetry, the solution would be able to start tracking the desired target. When using this kind of asymmetric consistency rule, it may be helpful to turn off the tracking when the jump toward the radar is larger than some threshold. This mechanism could help in case this jump toward the radar was actually a false target. The mechanism can help prevent the tracking to be stuck at the false target location until the tracking off condition is met (which could require waiting for a certain number of frames).

The final part of the solution is the feature extraction in Step 5 as illustrated in FIG. 25 (e.g., 2510). Various information could be obtained about the target depending on the radar capability. In all cases, the Doppler information of the target may be obtained, and if the radar can provide beam-forming options, the angular information can also be obtained. It may focus on the Doppler but a similar idea can be straightforwardly applied to other domains as well. A simple approach is just to output the whole Doppler column from the Doppler map corresponding to the selected tap output from Step 4 as illustrated in FIG. 25 (e.g., 2508).

In one example, the selected tap and adjacent taps are combined. The reason is that depending on the radar, the target response in the range Doppler map may actually span over several delay taps. Thus, using only the selected tap may result in some information loss. One way to do this is to take the maximum across the adjacent taps for each Doppler index, but this could increase some noise. A more elaborate method could be to take the maximum only among the non-noise bins. If at some Doppler index, all the bins are noise bins, then the bin at the detected tap may be output. Yet another modification is to compute the maximum only among the bins with large enough Doppler only. E.g., when the absolute Doppler is larger than some threshold. This could be beneficial for applications such as gesture recognition where the low absolute Doppler contains little information for the gesture, and those low Doppler bins are prone to residual from the environment/background.

An alternative embodiment could introduce a more elaborate first peak detection to provide the robust detection for accurate tracking. Specifically, as mentioned above one important property of the targeted applications is that the desired target is the closest moving object. While this is true in most cases, the level of movement may differ, i.e., there could be an undesired target with low movement (but not static) at a closer range than the desired target with a larger Doppler than what can be generally assumed to be due to the environment/background. To give a more concrete example, consider the case of a gesture recognition application, where the device is placed on a table and the user is standing by the table performing a gesture.

If the device is near the edge of the table and the person is also standing next to the table, then the user's torso could be closer to the device than the hand performing the gesture. Note that in this case while not intentionally moving, the torso may possess some small movement as a side-effect of performing the gesture. The severity of the movement may depend on the gesture.

The details of this alternative and more robust first peak detection is provided when there are undesired targets at a closer range than the desired target with a larger Doppler than that of the undesired target. It may be noted that this change is only to Step 2 as illustrated in FIG. 25 (e.g., 2504), and all other steps as presented in the aforementioned embodiments and/or examples could be kept. This shows the flexibility of the solution. The robust first peak detection is illustrated in FIG. 35.

Figure 35:
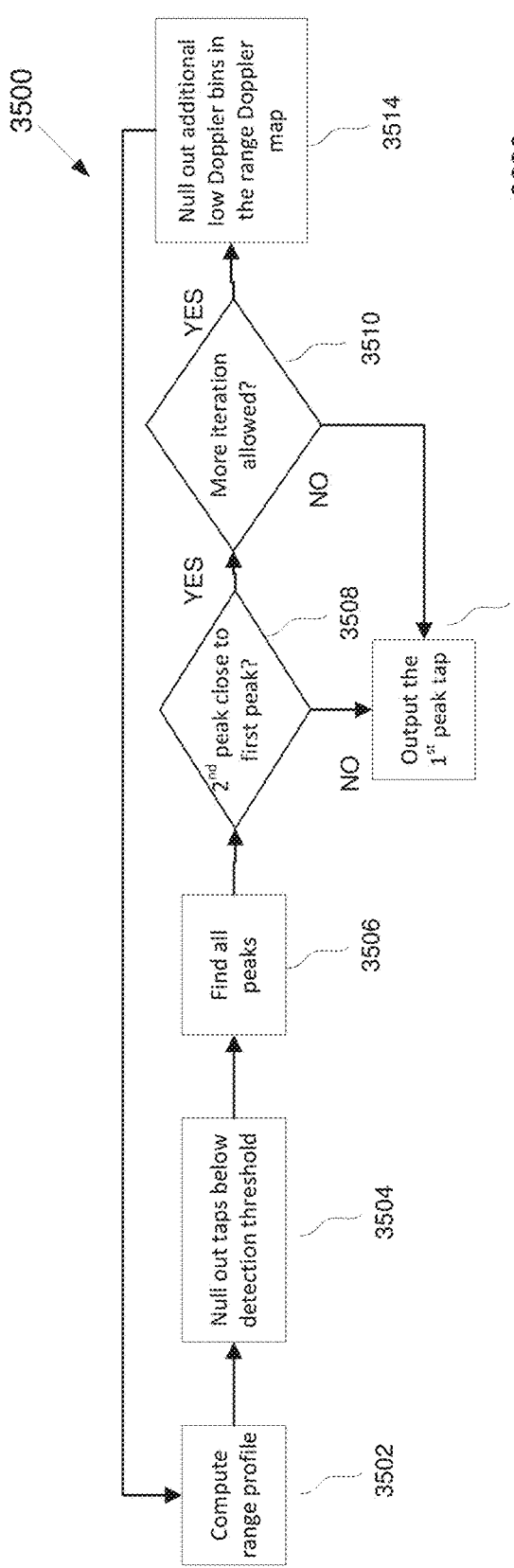
FIG. 35 illustrates a flow chart of a method for robust first peak detection according to embodiments of this disclosure.

FIG. 35 illustrates a flow chart of a method 3500 for robust first peak detection according to embodiments of this disclosure. An embodiment of the method 3500 shown in FIG. 35 is for illustration only. One or more of the components illustrated in FIG. 35 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 35, the main idea is the iterative first peak detection by eliminating low Doppler contributions. The procedure starts in the same manner as in the previously described first peak detection embodiment. Recall that this is after the radar measurements processing in Step 1 as illustrated in FIG. 25 (e.g., 2502), which computes the range Doppler map and nulls out some low Doppler bins.

The procedure, as may be performed by an electronic device, first computes the range profile in step 3502. In step 3504, the procedure nulls out taps below detection threshold. And then the procedure finds all peaks (instead of just the first peak as in the previous embodiment) in step 3506. The procedure determines if there is a second peak close to the first peak in step 3508. Closeness can be defined in terms of the number of taps separating the two peaks, e.g., if the second peak is less than N taps (e.g., N=5) away from the first peak, it can be considered as close. If such a case is detected, then it may try to redo the peak detection after nulling out additional Doppler bins in the range Doppler map in step 3514. In step 3508, if the $2^{nd}$ peak is close to the first peak, the procedures determines if more iteration is allowed in step 3510. In step 3510, if allowed, the procedure performs step 3514. In step 3510, if not allowed, the procedure performs step 3512. In step 3508, if the $2^{nd}$ peak is not close to the first peak, the procedure performs step 3512.

The purpose of this iterative process is to adapt the background cancellation to suppressed undesired targets (and at lower Doppler) but closer to the radar. To give a more concrete example, assuming that in Step 1, only the 0 Doppler bins were nulled. If a second peak within N taps from the first peak was detected, then the procedure may perform an iteration to detect the peaks again. In this case, it may first null the ±1Doppler bins (in addition to the 0-Doppler bins already nulled out), then checks the peaks again. If the second peak within N taps is still detected, it may continue another iteration by further nulling out ±2Doppler bins and redo the peak detection.

This procedure may continue until there is no second peak within N taps detected or the maximum number of iterations has been met. This is because this iterative process may not be done too many times; eliminating too many Doppler bins could result in unreliable target detection. When there is no close second peak or when the maximum number of iterations has been done, the procedure may output the currently detected first peak as the detected peak.

Note that in this concrete example, it may be assumed that a step of 1 Doppler bin in the positive and negative Doppler is provided for the additional nulling at each iteration, a more aggressive nulling step (e.g., 2, 3 or even larger in the positive and negative Doppler) could be used depending on the Doppler resolution as well as the applications at hand.

As illustrated in FIG. 35, the objective is to eliminate low speed unwanted targets, which is suitable for a gesture recognition problem as described above. In other applications, the unwanted target may have higher Doppler than the desired target. E.g., consider a human/pet tracking in a home environment. In this case, the body is the main target to be tracked.

The body generally does not possess high Doppler compared to the limbs or other household appliances such as a fan. Thus, in this case, it makes more sense to iteratively remove the high Doppler first. Particularly, assuming the highest Doppler index be D−1 and the lowest negative Doppler (absolute Doppler is the highest) index be −D; i.e., the FFT size in this case is 2D. Note that the asymmetry here is because when computing the discrete Fourier transform (e.g., using the FFT algorithm), a power of 2 number of samples (i.e., even) is used and there may be one index offset between the positive and negative index. In this example, after the first iteration, Doppler bins D−1 and −D may be nulled out, and in the next iteration, D−2 and −(D−1) may be nulled out, and so on until the detected peak met the desirable property, e.g., as described in the aforementioned embodiments and/or examples, or until the maximum number of iterations has been reached.

It may be noted that that for detecting the body while rejecting the limb movements, the same condition (two close-by peaks) may be used directly, except for the direction of nulling out the Doppler bins. For a more general body tracking in a household environment, the condition may be changed to detect only one peak as shown in FIG. 36.

Figure 36:
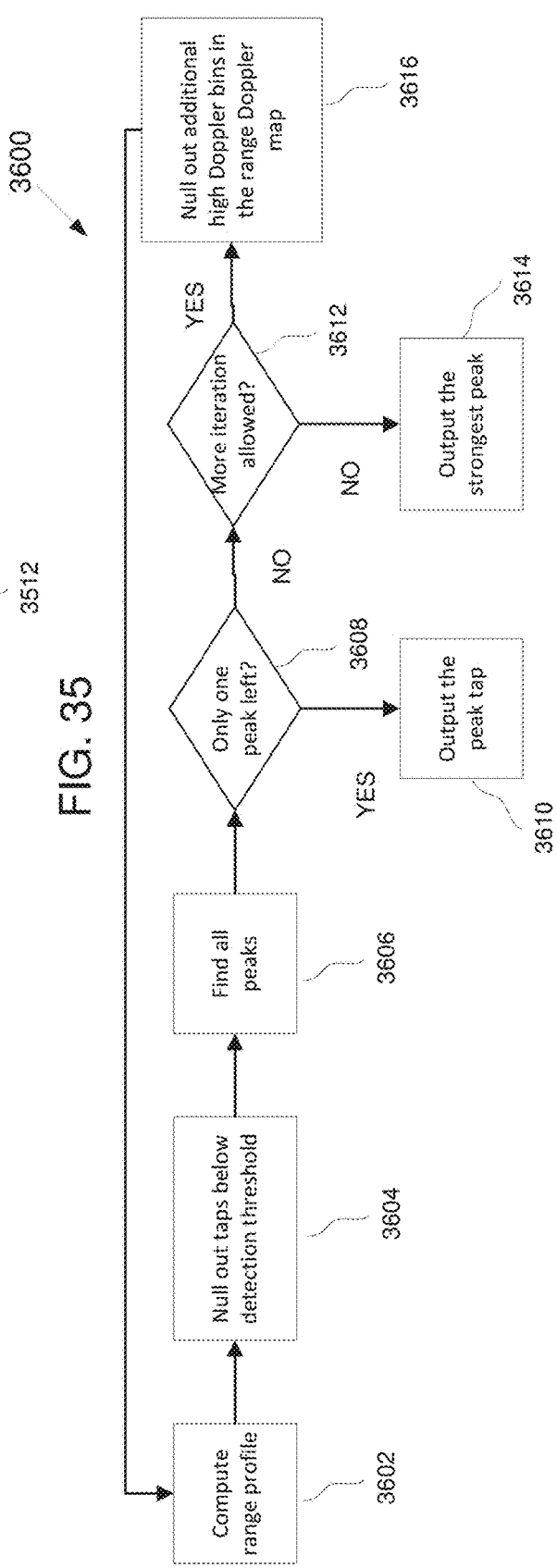
FIG. 36 illustrates another flow chart of a method for robust first peak detection according to embodiments of this disclosure.

FIG. 36 illustrates another flow chart of a method 3600 for robust first peak detection according to embodiments of this disclosure. An embodiment of the method 3600 shown in FIG. 36 is for illustration only. One or more of the components illustrated in FIG. 36 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 36, when the maximum number of iterations has been done and there are still more than one peaks, the strongest peak is chosen. Other conditions such as the first peak criterion as in the previous embodiment or other more elaborate conditions combining with the previously detected peaks earlier frames may also be used depending on the application scenarios.

As illustrated in FIG. 36, the procedure, as may be performed by an electronic device, computes a range profile in step 3602. In step 3604, the procedure nulls out taps below detection threshold. In step 3606, the procedure finds all peaks. In step 3608, the procedure determines whether if only one peak is left. In step 3608, if left, the procedure outputs the peak tap. In step 3608, if one peak is not left, the procedure performs step 3612. In step 3612, the procedure determines whether more iteration is allowed. In step 3612, if allowed, the procedure performs the 3616. In step 3616, the procedure nulls out additional high Doppler bins in the range Doppler map, and then performs step 3602. In step 3612, if not allowed, the procedure output the strongest peak in step 3614.

For certain applications, there could be some additional property of the target to be tracked that could be exploited for a more robust and accurate detection than using the first peak criterion. For example, consider a gesture recognition application, where a fast waving is the gesture of interest. For example, this gesture could be used as a switch triggering mechanism (e.g., turn on or off the device screen or it could be a trigger for other actions). In this case, since that target of the tracking can be expected to have high Doppler, the peak with the highest Doppler rather than the first peak may be selected as shown in FIG. 37.

Figure 37:
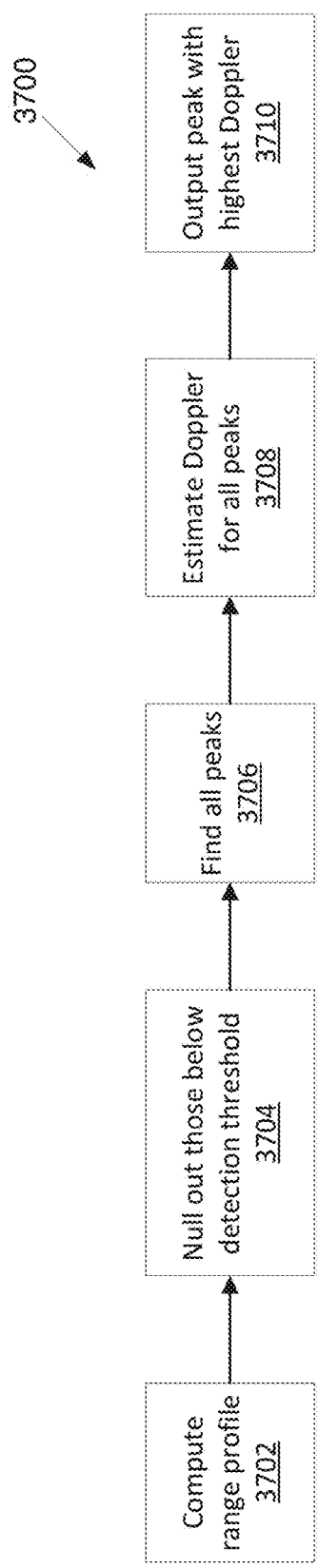
FIG. 37 illustrates an example peak detection using Doppler according to embodiments of this disclosure.

FIG. 37 illustrates an example peak detection using Doppler 3700 according to embodiments of this disclosure. An embodiment of the peak detection using Doppler 3700 shown in FIG. 37 is for illustration only. One or more of the components illustrated in FIG. 37 can be implemented in specialized circuitry configured to perform the noted functions or one or more of the components can be implemented by one or more processors executing instructions to perform the noted functions. Other embodiments are used without departing from the scope of the present disclosure.

Note that since the Doppler has to be estimated as part of the peak detection, this embodiment combines Step 2 and 3 as described in FIG. 25. The output here can be directly input into the update tracking step. By peak selection using Doppler as the criterion, the solution is more robust to residual such as the leakage or strong reflecting object near the radar. Such residuals can be due to various reason such as the vibration of the device (if it has such functionality) or due to the imperfection of the hardware as described earlier (e.g., due to temperature changes).

FIG. 37 illustrates embodiment using highest Doppler as the criterion for peak detection instead of the first peak.

As illustrated in FIG. 37, the procedure, as may be performed by an electronic device, computes a range profile in step 3702. In step 3704, the procedure nulls out those taps in the range profile below detection threshold. In step 3706, the procedure finds all peaks. In step 3708, the procedure estimates Doppler at all the detected peaks. In step 3710, the procedure outputs peak with highest Doppler.

In another embodiment, several customizations for user/pet tracking in a smart home environment are provided. First, the exact location information is also useful (for the gesture application described so far, this is less important), and thus it is desirable to also estimate the exact range and not just finding the tap indices. This means that for Step 2 (e.g., 2504 as illustrated in FIG. 25) in a tracking processing chain, there may be another task to estimate the range after finding the first peak (i.e., the target). To estimate the range, various methods could be used such as an interpolation-based method, where fractional index is estimated at the detected peak in the range profile.

Figure 38A:
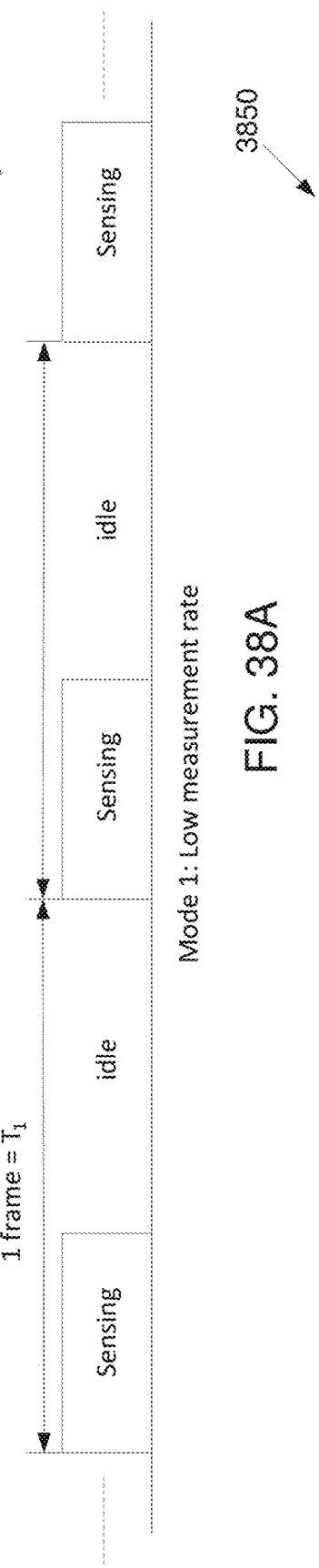
FIG. 38A illustrates an example low measurement rate according to embodiments of this disclosure.

FIG. 38A illustrates an example low measurement rate 3800 according to embodiments of this disclosure. An embodiment of the low measurement rate 3800 shown in FIG. 38A is for illustration only. One or more of the components illustrated in FIG. 38A can be implemented in specialized circuitry configured to perform the noted functions or one or more of the components can be implemented by one or more processors executing instructions to perform the noted functions. Other embodiments are used without departing from the scope of the present disclosure.

Figure 38B:
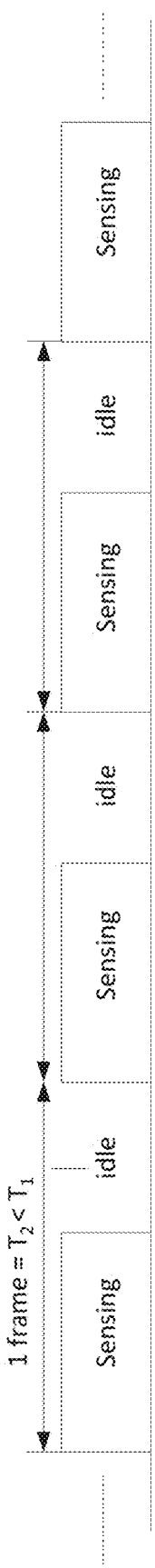
FIG. 38B illustrates an example low measurement rate according to embodiments of this disclosure.

FIG. 38B illustrates an example low measurement rate 3850 according to embodiments of this disclosure. An embodiment of the low measurement rate 3850 shown in FIG. 38B is for illustration only. One or more of the components illustrated in FIG. 38B can be implemented in specialized circuitry configured to perform the noted functions or one or more of the components can be implemented by one or more processors executing instructions to perform the noted functions. Other embodiments are used without departing from the scope of the present disclosure.

Second, for the tracking part, a 2-mode operation is desirable: one uses a low measurement rate (e.g., mode 1 as illustrated in FIG. 38A) and the other uses a high measurement rate (e.g., mode 2 as illustrated in FIG. 38B). An exemplary design of such a 2-mode radar is shown in FIG. 38A and FIG. 38B, respectively.

This 2-mode operation could provide better efficiency (less power and less processing) because for this application, only the information during the movement of the target is useful. Thus, mode 1 is used only for the detection of the movement, and mode 2 is the mode for obtaining the useful information for further applications. Note the saving here comes from the fact that for tracking a person in the home (especially a senior person), the fraction of time when the user is moving would be small since many activities in the home involve staying at one location (e.g., watching TV or eating at a table). Thus, by using mode 1 with low sampling rate (and thus low power) may result in better efficiency.

Figure 39:
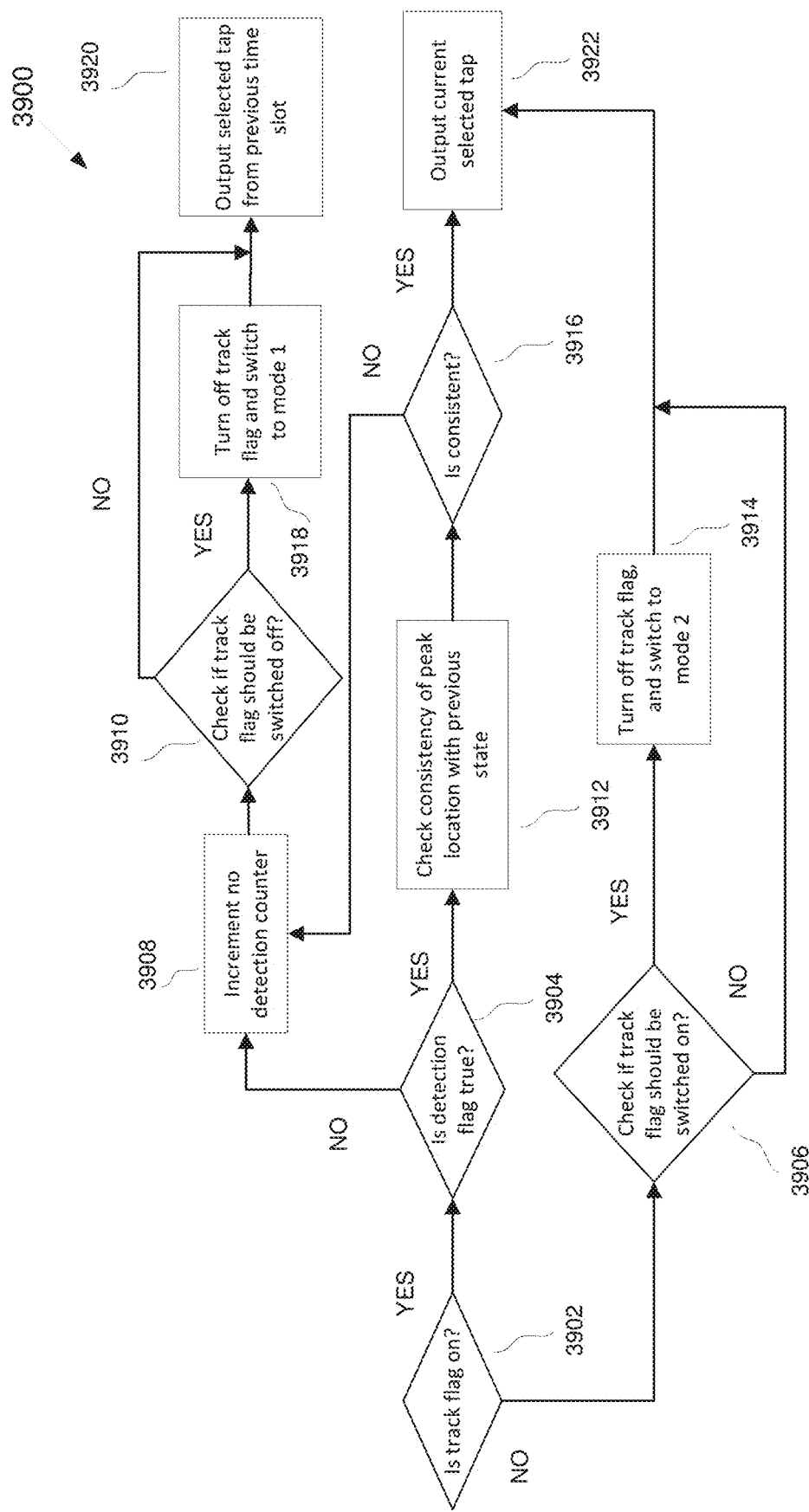
FIG. 39 illustrates a flow chart of a method for two-mode target tracking procedures according to embodiments of this disclosure.

FIG. 39 illustrates a flow chart of a method 3900 for two-mode target tracking procedures according to embodiments of this disclosure. An embodiment of the method 3900 shown in FIG. 39 is for illustration only. One or more of the components illustrated in FIG. 39 can be implemented in specialized circuitry configured to perform the noted functions or one or more of the components can be implemented by one or more processors executing instructions to perform the noted functions. Other embodiments are used without departing from the scope of the present disclosure.

The tracking procedure can follow a similar sequence as described earlier but it needs to incorporate the mode switching in this case. One way to do this is to use the track flag as shown in FIG. 39. That is, here, the track flag may be turned on only when significant enough movement is detected. After such a detection, the radar could operate in mode 2 to get fine measurements of the tracked target. It may be noted that fine-grain measurements may be necessary for some application such as a fall event detection. A fall can happen in a short period of time and thus a high measurement rate is needed to get enough number of measurements during the fall for reliable detection.

Third, with fine grain measurements in mode 2 and the estimated range in step 2, there are new options for checking the consistency for the tracking. Of course, the tracking approach as discussed earlier is still applicable. Here, rather than using the assumption on the maximum speed, the speed estimate itself can be used. That is, the consistency condition is now adaptive. Instead of using a fix number of taps (which is equivalent to distance), the estimated speed is used to compute this threshold. Note that one main point for this to work is the high measurement sampling rate, in which case the constant speed between measurements assumption becomes more reasonable. Because this translation of the estimated speed to the target displacement is an approximation (i.e., containing some error), some margin could be introduced.

Finally, for this application, besides the speed, the angular information is also desirable as the user's location inside the home can be tracked. To allow this, once the range (or equivalently the tap index) is selected at the end of Step 4, a beam forming procedure can be applied to the radar signals corresponding to that detected range. Then, an angle estimation method could be used to find the angle of the tracked target.

FIG. 38A and FIG. 38B the high and low measurement rate modes. As illustrated in FIG. 38A and 38B, the radar transmission structure is the same for the two modes. That is the pulses and the bursts contents as well as their spacing are the same. The difference is in the frame duration. The low measurement rate mode, mode 1, has a larger frame interval. This means mode 1 may use less power and it also occupies the wireless channel for a smaller duration of time allowing other usage of the wireless medium.

FIG. 39 illustrates two-mode target tracking procedure. As illustrated in FIG. 39, mode 1 uses a lower measurement sampling rate for conserving power and computation. mode 2 with a high measurement sampling rate is used when movement is detected.

As illustrated in FIG. 39, the procedure, as may be performed by an electronic device, determines in step 3902 whether track flag is on. In step 3902, if no, the procedure checks if track flag may be switched on in step 3906 and then performs step 3914. In step 3914, the procedure turns off track flag and switches to mode 2. In step 3922, the procedure outputs current selected tap. In step 3902, if yes, the procedure determines whether the detection flag is true in step 3904. In step 3904, if true, the procedure checks consistency of peak location with previous state in step 3912. In step 3916, if it is consistent, the procedure performs step 3922. In step 3916, if not consistent, the procedure performs step 3908. In step 3908, the procedure increments no detection counter. In step 3910, the procedure checks if the track flag should be switched off. In step 3910, if yes, the procedure turns off the track flag and switched to mode 1 in step 3918. In step 3910, if no, the procedure performs step 3920. The procedure in step 3920 outputs selected tap from previous time slot. In step 3904, if the detection flag is not true (e.g., false), the procedure performs step 3908.

In another embodiment, it may be desirable to limit the range of acceptable target. E.g., for a gesture recognition application for a mobile device, it may be desirable to limit the acceptable range to below 50 cm. One simple way is to just process the signal with the delay taps corresponding to the distance below 50 cm. This can be done with minimal processing in Step 1 (e.g., 2502 as illustrated in FIG. 25), by just keeping only those delay taps within the desired range. Using such a hard limit, however, may not be desirable from a user experience consideration. E.g., even if the user starts a gesture within the desired range, the hand could be falling outside the range during the gesture. If using such a hard limit, the gesture signal would be lost during the outside range duration and could lead to inaccurate recognition.

To avoid cutting off in the gesture, one option is to apply the range limitation only for the beginning of the gesture only. Once a gesture is tracked, it may be followed until the gesture ends regardless of whether the gesture falls out of range during the gesture. One idea to do this is to apply the range limitation only on the first detected peak at the start of the gesture. The start of a gesture may be detected using the track flag. Particularly, it could be defined as the first frame where the track flag is turned on. This condition for the detection could be added as a block right after the update tracking of Step 4 (e.g., 2508) and before Step 5 (e.g., 2510) as illustrated in FIG. 25.

Figures 40, 41:
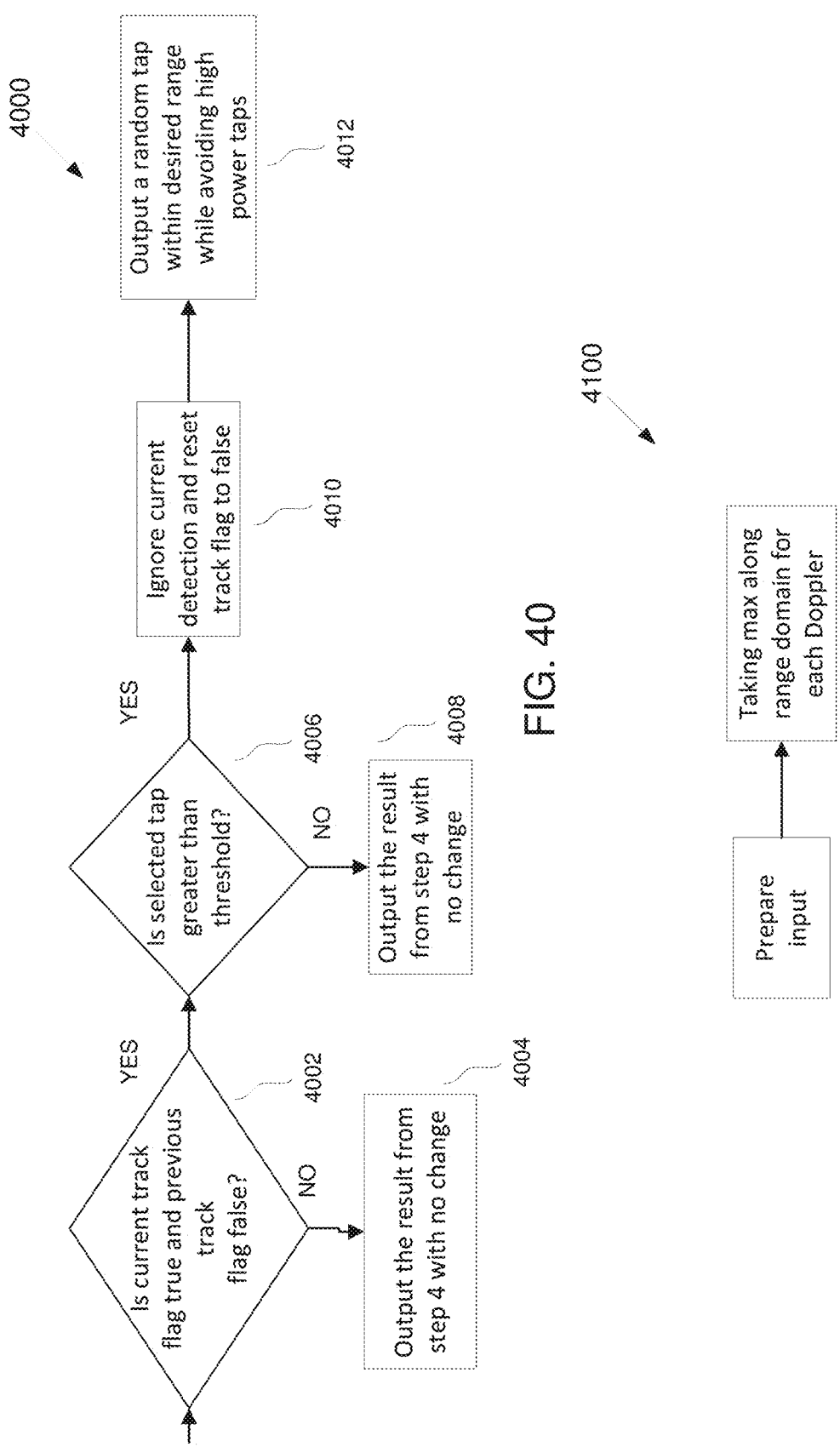
FIG. 40 illustrates a flow chart of a method for limiting the desired range of the target tracking according to embodiments of this disclosure.
FIG. 41 illustrates an example extracting features from the range Doppler map according to embodiments of this disclosure.

FIG. 40 illustrates a flow chart of a method 4000 for limiting the desired range of the target tracking according to embodiments of this disclosure. An embodiment of the method 4000 shown in FIG. 40 is for illustration only. One or more of the components illustrated in FIG. 40 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 40, if the current detection is not determined to be the start of the gesture or that it is but the selected tap is within the desired range, the detection result from Step 4 (e.g., 2508 as illustrated in FIG. 25) could be output directly with no changes. If it is determined to be the start of the gesture and that the selected tap is farther than the desired range, then this detection violates the condition for the desired range and may be ignored.

Note that, care must be taken to maintain a consistent state of the detection by resetting relevant parameters accordingly, such as the track flag. Then, a randomly selected tap could be output. Note that since this is not a valid target, it is desirable to avoid any tap that may have strong response (e.g., higher than the noise level). Another option is to output some predefined value to indicate an invalid selection.

As illustrated in FIG. 40, the procedure, as may be performed by an electronic device, determines whether the current track flag is true and the precious track flag is false in step 4002. In step 4002, if no, the procedure outputs the result from Step 4 (e.g., 2508 as illustrated in FIG. 25) with no change. In step 4002, if yes, the procedure determines whether the selected tap is greater than a threshold in step 4006. In step 4006, if no, the procedure outputs the result from Step 4 (e.g., 2508 as illustrated in FIG. 25) with no change. In step 4006, if yes, the procedure ignores the current detection and reset the track flag to false in step 4010. In step 4012, the procedure outputs a random tap within desired range while avoiding high power taps.

An alternative embodiment that takes a different approach than those described so far is to skip Step 2, 3, and 4 (2504, 2506, and 2508 as illustrated in FIG. 25), by outputting the extracting the features from the range Doppler map directly without any detection. This approach is based on the premise that the background or other interfering sources are negligible, and the range Doppler map contains mainly the desired target response. The approach is to take the maximum for each Doppler bin across the delay tap (or range) dimension, which squeezes the 2D range Doppler map into a 1D signal.

The benefit of this method is that it may not mis-detect any target within the range in the range Doppler map. The downside is that it could increase the noise level due to the maximum operation. Also, if there is any strong background (including other undesired targets), the maximum operation may pick up those undesired responses. This approach also does not provide any information of the detection, and the detection could be implemented on the extracted features. A diagram of this embodiment is shown in FIG. 41.

FIG. 41 illustrates an example extracting features 4100 from the range Doppler map according to embodiments of this disclosure. An embodiment of the extracting features 4100 shown in FIG. 41 is for illustration only. One or more of the components illustrated in FIG. 41 can be implemented in specialized circuitry configured to perform the noted functions or one or more of the components can be implemented by one or more processors executing instructions to perform the noted functions. Other embodiments are used without departing from the scope of the present disclosure.

Note that the "prepare input" block is assumed to output the range Doppler map after some elimination of known and unwanted response (e.g., such as nulling out the low Doppler bins as described earlier.)

FIG. 41 illustrates embodiment that extracts features directly from the range Doppler map without any detection.

Comparison results of this low complexity method and an embodiment using the selection method are provided. A comparison of the extracted features for a waving gesture is shown in FIG. 42A and FIG. 42B.

Figure 42A:
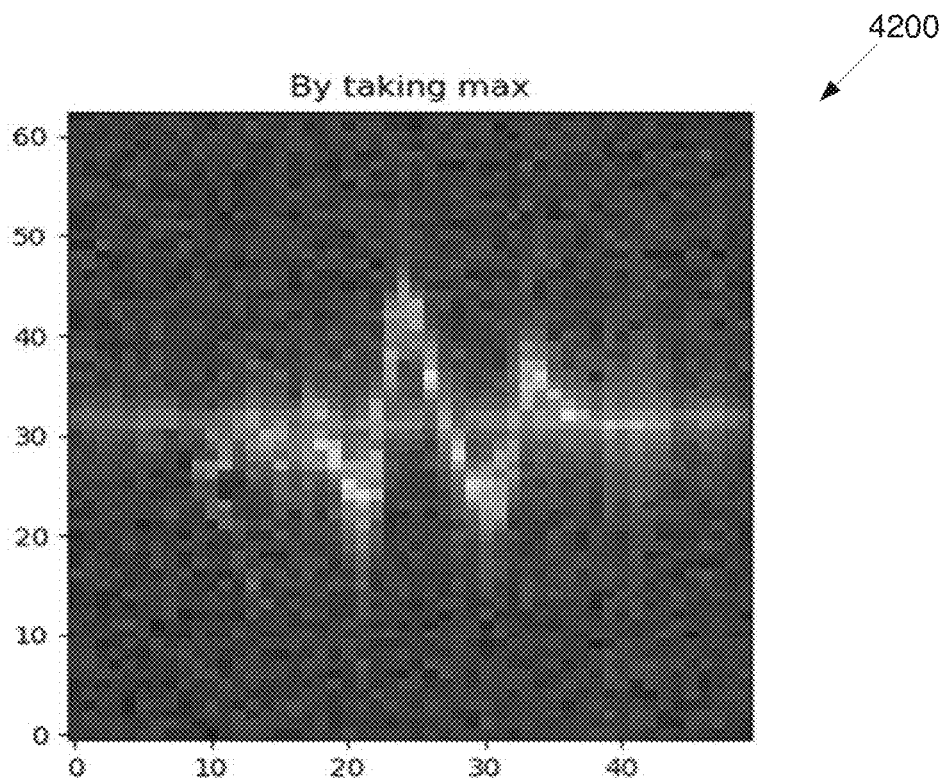
FIG. 42A illustrates an example extracted features from a waving gesture according to embodiments of this disclosure.

FIG. 42A illustrates an example extracted features 4200 from a waving gesture according to embodiments of this disclosure. An embodiment of the extracted features 4200 shown in FIG. 42A is for illustration only. One or more of the components illustrated in FIG. 42A can be implemented in specialized circuitry configured to perform the noted functions or one or more of the components can be implemented by one or more processors executing instructions to perform the noted functions. Other embodiments are used without departing from the scope of the present disclosure.

Figure 42B:
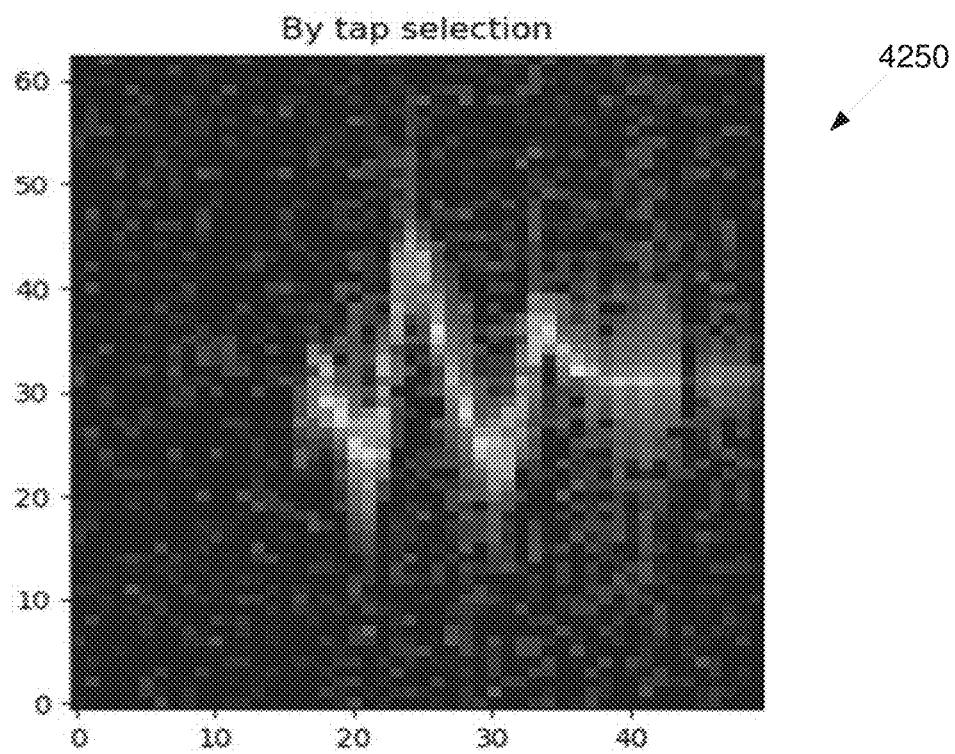
FIG. 42B illustrates an example extracted features from a waving gesture according to embodiments of this disclosure.

FIG. 42B illustrates an example extracted features 4250 from a waving gesture according to embodiments of this disclosure. An embodiment of the extracted features 4250 shown in FIG. 42B is for illustration only. One or more of the components illustrated in FIG. 42B can be implemented in specialized circuitry configured to perform the noted functions or one or more of the components can be implemented by one or more processors executing instructions to perform the noted functions. Other embodiments are used without departing from the scope of the present disclosure.

It can be seen that the embodiment with tap selection can help reject some undesired response and reduce the noise level.

FIG. 42A and 42 B illustrate comparison results between using the embodiment described in FIG. 41 (using the max operator) and with the tap selection. This example is the extracted features from a waving gesture. The x-axis is the frame index (i.e., time), and the y-axis is the Doppler (index 32 corresponding to the 0-Doppler has been removed from the plots). In the plots, darker pixels are weak, and brighter ones are strong.

It can be seen that the embodiment with tap selection can reject some undesired target response resulting in a cleaner signal after the feature extraction. Also, notice the noise level difference. The embodiment with the tap selection has a lower noise level (darker background).

In one embodiment, a solution to track multiple targets in the context of gesture recognition/control is provided. With this capability, multiple gestures can be detected simultaneously and thus can expand the application area such as allowing multiple users to play games with gesture control. Another use of this capability is to provide a cleaner detection of the feature of the gesture. This is because the multiple target tracking may allow the separation between desired target (hand) and other movements such as due to body parts.

The first the case may be considered without the ability to separate in the angle domain. In this case, everything may be conducted in the range Doppler domain. An illustration of the procedure is shown in FIG. 43.

Figure 43:
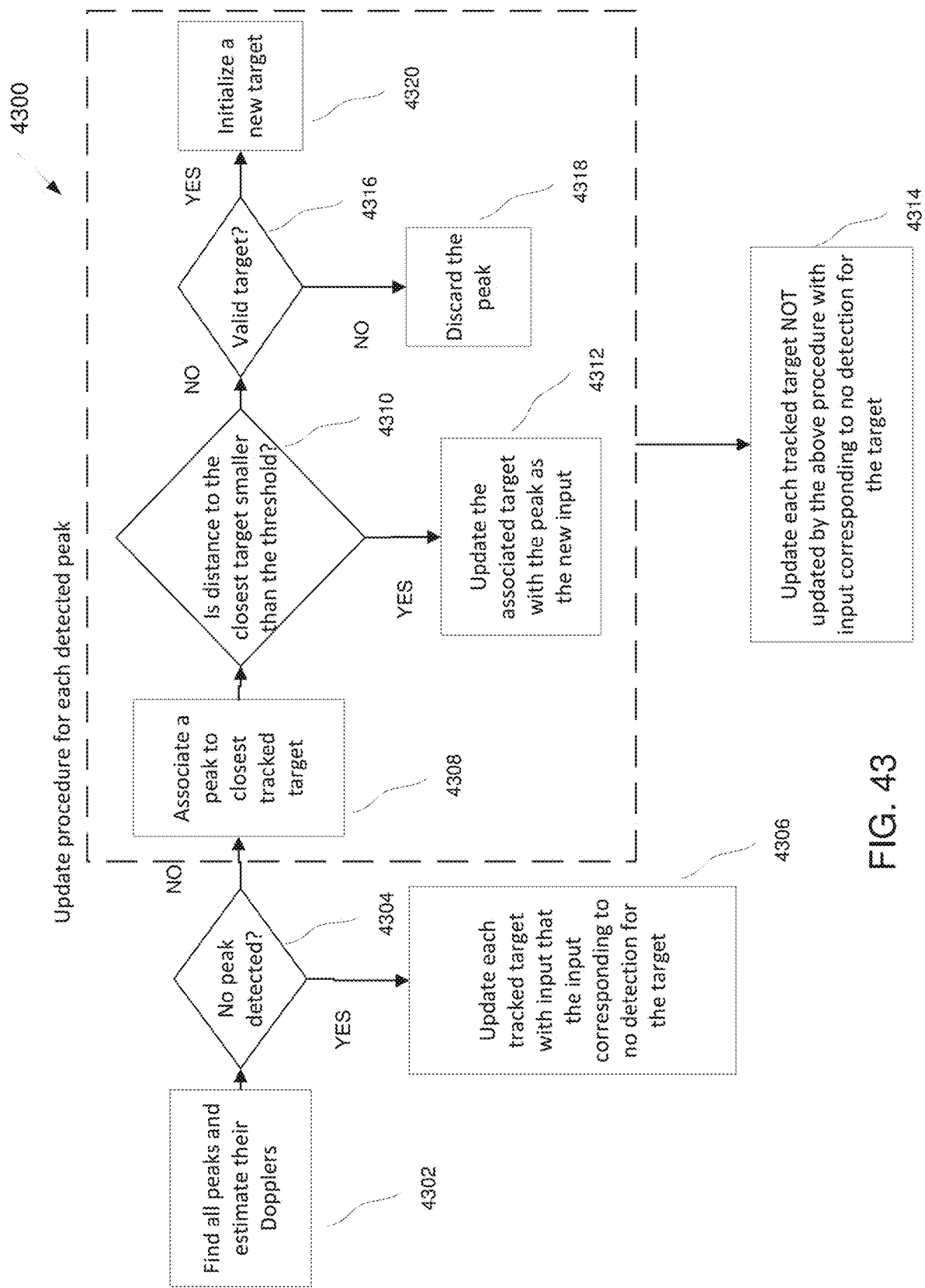
FIG. 43 illustrates a flow chart of a method for multiple targets tracking according to embodiments of this disclosure.

FIG. 43 illustrates a flow chart of a method 4300 for multiple targets tracking according to embodiments of this disclosure. An embodiment of the method 4300 shown in FIG. 43 is for illustration only. One or more of the components illustrated in FIG. 43 can be implemented in specialized circuitry configured to perform the noted functions or one or more of the components can be implemented by one or more processors executing instructions to perform the noted functions. Other embodiments are used without departing from the scope of the present disclosure.

Step 1 to step 3, as illustrated in FIG. 25 (e.g., 2502 and 2506), can be done as described in earlier embodiments, but instead of finding just the first peak, all peaks may be detected and their Doppler estimated. Then, for the tracking part, first the results of the detection are checked so far. If no peak was detected then, it may update each tracked target with the input indicating no detection of the target in the current time slot.

The update procedure can use one of the embodiments for updating the tracking for single target as described earlier. If there are at least one peak detected, then the peak may be associated with a tracked target using the closest distance as the criterion. If the distance is larger than the threshold (this is a selection in a similar approach as discussed so far such as using the assumed maximum speed of the target), the association is considered invalid and the peak may be identified as a potentially new target. Then, the procedure may determine if the peak qualifies as a valid target. This can be done similarly to the condition for turning on the track flag as described earlier.

If the peak is valid, a new target may be initialized into the list of tracked target, otherwise it could be ignored. It may be noted that if the list of the tracked target is empty, a distance may be set to the nearest target in the list (which is empty) as infinity. This leads to the peak being processed as a potentially new valid target. If the distance of the associated peak is below the threshold, then the association is valid and the tracking status may be updated accordingly following the same procedure as in one of the update tracking procedures discussed so far.

This sequence of procedures may be applied to each of the detected peaks. If all detected peaks have been processed and there are still tracked targets in the list that have not been updated, those targets may be updated with the input that no peak was detected in the current time slot. In a tested embodiment, it may be observed that the closeness association rule works well for the gesture and it can help avoid interference in the extracted features from other body parts. It can also help in avoiding wrongly tracking the residual of the radar direct path at close proximity to the radar.

As illustrated in FIG. 43, the procedures, as may be performed by an electronic device, finds in step 4302 all peaks and estimates their Dopplers. In step 4304, the procedure determines if peak is detected. In step 4304, if detected, the procedure updates each tracked target with input corresponding to no detection for the target in step 4306. In step 4304, if not detected, the procedure associates a peak to closest tracked target in step 4308. In step 4310, the procedure determines whether a distance to the closest target is smaller than the threshold. In 4310, if yes, the procedure updates the associated target with the peak as the new input in step 4312. In step 4310, if no, the procedure determines the target is valid in step 4316. In step 4316, if no, the procedure discards the peak in step 4318. In step 4316, if yes, the procedure initializes a new target in step 4320. As illustrated in FIG. 4300, steps 4308, 4310, 4312, 4316, and 4320 are configured to update the procedure for each detected peak. In step 4314, the procedure updates each tracked target not updated by the update procedure (e.g., through steps 4308, 4310, 4312, 4316, and 4320) with input corresponding to no detection for the target.

Another embodiment for the multiple targets tracking is when the radar is capable to detect the angles of the target. An example scenario is when multiple users play games using gesture control. In this scenario, the users may position themselves at similar distances to the device but at different angles to the device. Thus, the detection in the angular domain allows the separation among these users and the tracking to produce the features for the gesture recognition can be done for each user separately. An example embodiment is shown in FIG. 44, where it is assumed that the radar performs the beamforming in the digital domain.

Figure 44:
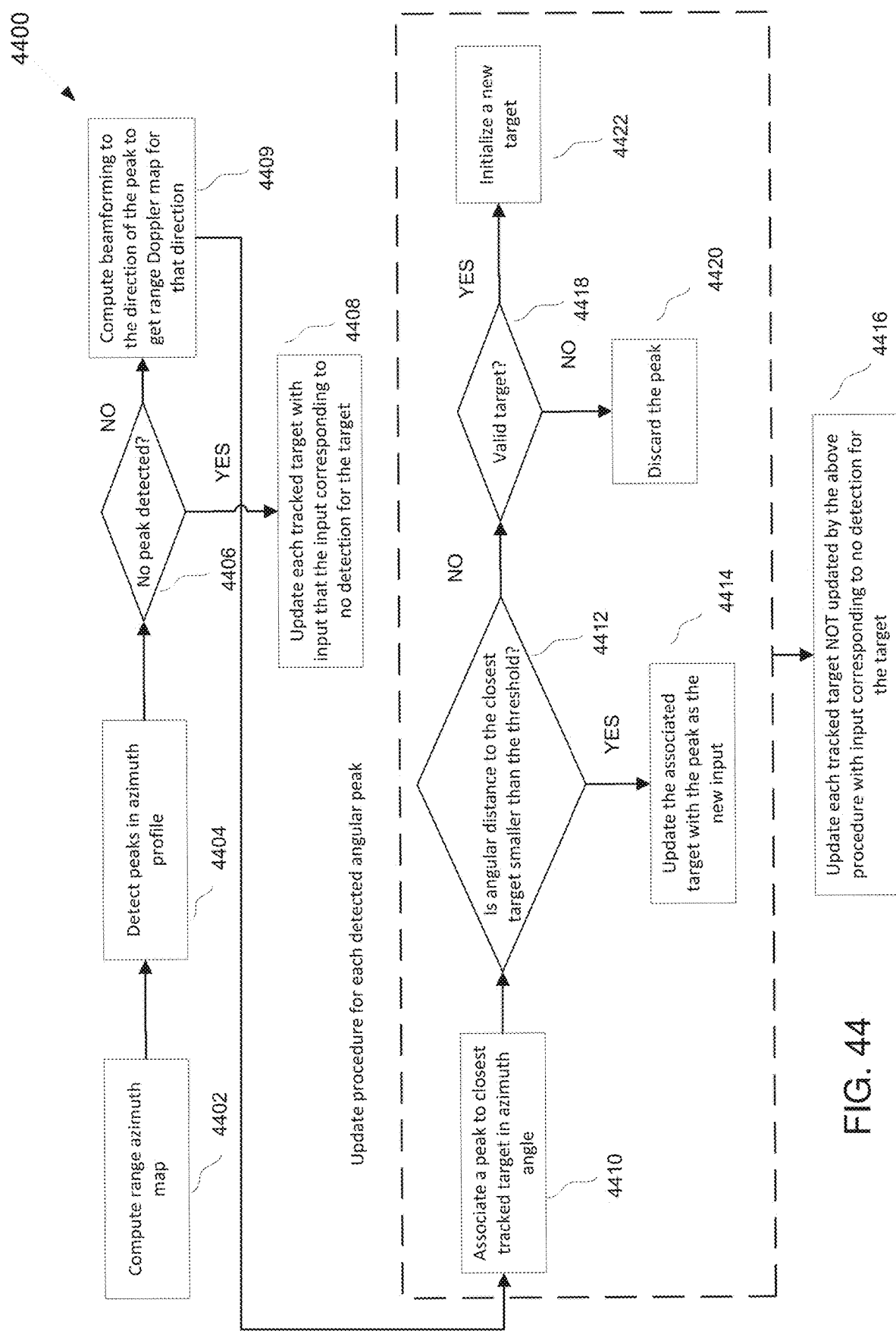
FIG. 44 illustrates another flow chart of a method for multiple targets tracking according to embodiments of this disclosure.

FIG. 44 illustrates another flow chart of a method 4400 for multiple targets tracking according to embodiments of this disclosure. An embodiment of the method 4400 shown in FIG. 44 is for illustration only. One or more of the components illustrated in FIG. 44 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 44, first the radar signals are processed to produce a range azimuth map. Note that it is not required to use all measurements in this step (not all measurements along the slow time or burst domain), only one or a few bursts of measurements corresponding to one or a few bins in the slow time domain could be enough. The range azimuth map may be squeezed along the range domain (e.g., by computing the average energy along the range Domain to reduce the 2D map into a 1D signal) to get an azimuth profile. Then, a peak detection is conducted on the azimuth profile. This peak detection method can be the same as the one a method that is used for detecting peaks in the range profile.

Once the peaks have been detected, for each peak, the procedure can compute the beamforming toward the direction of the peak to produce radar measurement input as used in tracking procedures described earlier. That is, instead of the raw radar signal, the radar signal is used after the beamforming in this case, where the beamform directions correspond to the detected peaks.

After obtaining the beamformed radar signals and computing the range Doppler map for that direction, other processing is similar to the previous embodiment. The only exception is that now the distance for peak to target association is the angular distance between the detected peaks in the azimuth profile. It is noted that this embodiment can be readily applied to the case where the radar uses analog beamforming to scan the environment. In that case, the total energy for each analog beamforming direction can be used instead of the azimuth profile.

Once the peaks have been detected, then only selecting the appropriate measurement data is needed from the analog beamforming direction corresponding to the peak. That is there is no need to compute the beamforming explicitly for the direction as in the digital beamforming case. The computation of the range Doppler map onward can stay the same.

As illustrated in FIG. 44, the procedure, as may be performed by an electronic device, computes, in step 4402, a range Azimuth map. In step 4404, the procedure detects peaks in Azimuth profile. In step 4406, the procedure determines whether peak is detected. In step 4406, if yes, the procedure updates each tracked target with input that the input corresponding to no detection for the target in step 4408. In step 4406, if no, the procedure computes beamforming to the direction of the peak to get range Doppler map for that direction in step 4409. In step 4410, the procedure associates a peak to closest tracked target in Azimuth angle. In step 4412, the procedure determines whether angular distance to the closest target is smaller than the threshold. If yes, in step 4412, the procedure updates the associated target with the peaks as the new input in step 4414. In step 4412, if no, the procedure determines whether a target is valid in step 4418. In step 4418, if no, the procedure discards the peak in step 4420. In step 4418, if yes, the procedure initializes a new target in step 4422. Steps 4410, 4412, 4414, 4418, 4420, and 4422 are configured to update the procedures for each detected angular peak. In step 4416, the procedure updates each tracked target no updated by the update procedures (through steps 4410, 4412, 4414, 4418, 4420, and 4422) with input corresponding to no detection for the target.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. None of the description in this application should be read as implying that any particular element, step, or function is an essential element that must be included in the claims scope.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, the electronic device comprising:
a radar transceiver configured to switch between operation modes; and
a processor operably connected to the radar transceiver, the processor configured to:
identify, based on a movement detection, a measurement sampling rate for the operation modes,
identify, based on signals received through the radar transceiver and a range of a tap, a peak of the received signals in a current time slot, wherein an amplitude of the tap is used for identifying a reference tap that is used to determine a compensation coefficient as a ratio of complex impulse response (CIR), wherein a variation of the compensation coefficient is used for determining a validity of compensation,
determine whether the peak in the current time slot corresponds to a tracked target based on comparing a location of the peak in the current time slot with a location of the peak corresponding to the tracked target in a previous time slot as a function of a movement speed threshold, in response to a determination that the peak in the current time slot corresponds to the tracked target, update tracking information for the tracked target associated with the peak in the current time slot, and identify, based on the peak in the received signals, an operation mode of the radar transceiver.

2. The electronic device of claim 1, wherein the processor is further configured to:

obtain, based on the range of the tap, the received signals to detect the tracked target;

compute, based on the received signals, a range Doppler map including a two-dimensional (2D) map comprising a distance and a speed associated with the tap; and null, based on the computed range Doppler map, low Doppler bins as a function of a cancelation threshold to cancel background signals.

3. The electronic device of claim 2, wherein the processor is further configured to:

determine a compensation coefficient based on the tap; and compensate, based on the determined compensation coefficient, for signal artifacts in the received signals before computing the range Doppler map.

4. The electronic device of claim 3, wherein the processor is further configured to:

identify the tap as the reference tap at a vicinity of leakage tap based on comparison of the amplitude of the tap with an amplitude of an adjacent tap, wherein, to compensate for the signal artifacts, the processor is further configured to apply the compensation coefficient to the CIR to generate a compensated CIR.

5. The electronic device of claim 1, the processor is further configured to:

compute a range profile from a range Doppler map based on a threshold that is determined based on a noise floor estimation;

null a set of taps in the computed range profile based on the threshold; and obtain the peak from remaining set of taps in the computed range profile.

6. The electronic device of claim 5, the processor is further configured to:

compute a median of the range profile that is a one-dimensional signal; and perform, based on the computed median of the range profile, the noise floor estimation.

7. The electronic device of claim 1, wherein the processor is further configured to:

identify, based on an iteration to null out positive and negative indices of Doppler bin, an index of Doppler bin that includes a higher power than other Doppler bins in a range Doppler map at an index of the identified peak; and generate the index of Doppler.

8. The electronic device of claim 1, wherein:

the processor is further configured to switch the operation mode between the operation modes for an operation of the radar transceiver based on the peak in the received signals within a predetermined time period and a Doppler criterion; and the operation modes include a first mode and a second mode including a higher measurement sampling rate than the first mode.

9. The electronic device of claim 1, wherein the processor is further configured to:

identify, based on the received signal through the radar transceiver, a plurality of peaks in the received signals to detect a plurality of targets;

perform Doppler estimation based on the identified peaks of the received signals to identify corresponding locations of the detected targets, respectively;

identify, based on a threshold, a closest moving target that includes a shortest distance among others of the detected targets; and determine the closest moving target for tracking in the received signals.

10. The electronic device of claim 9, wherein the processor is further configured to:

perform a beam forming operation on the received signals to obtain a range Azimuth map;

estimate, based on the range Azimuth map, corresponding angles of the detected targets, respectively;

identify, based on the threshold, the closest moving target that includes a shortest angular distance the other detected targets; and determine to track the closest moving target.

11. A method of operating an electronic device, the method comprising:

identifying, based on a movement detection, a measurement sampling rate for operation modes, wherein a radar transceiver of the electronic device is switchable between the operation modes;

identifying, based on signals received through the radar transceiver and a range of a tap, a peak of the received signals in a current time slot, wherein an amplitude of the tap is used for identifying a reference tap that is used for determining a compensation coefficient as a ratio of complex impulse response (CIR), wherein a variation of the compensation coefficient is used for determining a validity of compensation;

determining whether the peak in the current time slot corresponds to a tracked target based on comparing a location of the peak in the current time slot with a location of the peak corresponding to the tracked target in a previous time slot as a function of a movement speed threshold;

in response to a determination that the peak in the current time slot corresponds to the tracked target, updating tracking information for the tracked target associated with the peak in the current time slot; and identifying, based on the peak in the received signals, an operation mode of the radar transceiver.

12. The method of claim 11, further comprising:

obtaining, based on the range of the tap, the received signals to detect the tracked target;

computing, based on the received signals, a range Doppler map including a two-dimensional (2D) map comprising a distance and a speed associated with the tap; and nulling, based on the computed range Doppler map, low Doppler bins as a function of a cancelation threshold to cancel background signals.

13. The method of claim 12, further comprising:

determining a compensation coefficient based on the tap; and compensating, based on the determined compensation coefficient, for signal artifacts in the received signals before computing the range Doppler map.

14. The method of claim 13, further comprising:

identifying the tap as the reference tap at a vicinity of leakage tap based on comparison of the amplitude of the tap with an amplitude of an adjacent tap, wherein compensating for the signal artifacts further comprises applying the compensation coefficient to the CIR to generate a compensated CIR.

15. The method of claim 11, further comprising:

computing a range profile from a range Doppler map based on a threshold that is determined based on a noise floor estimation;

nulling a set of taps in the computed range profile based on the threshold; and obtaining the peak from remaining set of taps in the computed range profile.

16. The method of claim 15, further comprising:

computing a median of the range profile that is a one-dimensional signal; and performing, based on the computed median of the range profile, the noise floor estimation.

17. The method of claim 11, further comprising:

identifying, based on an iteration to null out positive and negative indices of Doppler bin, an index of Doppler bin that includes a higher power than other Doppler bins in a range Doppler map at an index of the identified peak; and generating the index of Doppler.

18. The method of claim 11, further comprising switching the operation mode between the operation modes for an operation of the radar transceiver based on the peak in the received signals within a predetermined time period and a Doppler criterion, wherein the operation modes include a first mode and a second mode including a higher measurement sampling rate than the first mode.

19. The method of claim 11, further comprising:

identifying, based on the received signal through the radar transceiver, a plurality of peaks in the received signals to detect a plurality of targets;

performing Doppler estimation based on the identified peaks of the received signals to identify corresponding locations of the detected targets, respectively;

identifying, based on a threshold, a closest moving target that includes a shortest distance among others of the detected targets; and determining to track the closest moving target.

20. The method of claim 19, wherein:

performing Doppler estimation to identify the corresponding locations of the detected targets comprises:

performing a beam forming operation on the received signals to obtain a range Azimuth map; and estimating, based on the range Azimuth map, corresponding angles of the detected targets, respectively; and wherein identifying the closest moving target comprises identifying, based on the threshold, the closest moving target that includes a shortest angular distance the other detected targets.

* * * * *